US012712701B2

(12) United States Patent
Zhang

(10) Patent No.: US 12,712,701 B2
(45) **Date of Patent: *Aug. 18, 2026**

(54) METHOD AND DEVICE FOR SELECTING ANTENNA CONFIGURATION IN UNLICENSED SPECTRUM OF WIRELESS COMMUNICATION

(71) Applicant: APOGEE NETWORKS, LLC, Dallas, TX (US)

(72) Inventor: Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,263

(22) Filed: Nov. 2, 2023

(65) Prior Publication Data

US 2024/0063987 A1 Feb. 22, 2024

Related U.S. Application Data

(63) Continuation of application No. 16/882,786, filed on May 26, 2020, now Pat. No. 11,848,894, which is a (Continued)

(51) Int. Cl.
*H04L 5/00* (2006.01)
*H04L 27/26* (2006.01)

(Continued)

(52) U.S. Cl.
CPC ........ *H04L 5/0094* (2013.01); *H04L 27/2602* (2013.01); *H04W 24/08* (2013.01); *H04W 72/12* (2013.01); *H04W 72/20* (2023.01)

(58) Field of Classification Search
CPC ..... H04W 72/20; H04W 24/08; H04W 72/12; H04L 5/0094; H04L 27/2602
See application file for complete search history.

(56) References Cited

U.S. PATENT DOCUMENTS 9,722,748 B2 * 8/2017 Kim .................... H04B 7/0691
2012/0275400 A1 11/2012 Chen et al.

(Continued)

FOREIGN PATENT DOCUMENTS

CN 104255053 A 12/2014
CN 106160804 A 11/2016

(Continued)

OTHER PUBLICATIONS

«3GPP TSG RAN WG1 Meeting #90:R1-1712159» Huawei 等 On data channel scrambling dated Aug. 25, 2017.

(Continued)

*Primary Examiner* — Rhonda L Murphy
(74) *Attorney, Agent, or Firm* — Volpe Koenig

(57) ABSTRACT

The present disclosure provides a method and a device in a UE and a base station used for wireless communications. The UE receives N groups of first configuration information, Q piece(s) of indication information and first control information. Herein, the first control information is associated with first information, the first information is one of the Q piece(s) of indication information, the first information is used for determining first target configuration information out of the N groups of first configuration information; the first target configuration information is used for determining a first antenna port group set. By using the above method, the effective management of control information transmissions for a plurality of beam-based Unlicensed Spectrum access detections can be realized and a variety of requirements arising therefrom can be met.

20 Claims, 22 Drawing Sheets

Related U.S. Application Data continuation of application No. PCT/CN2017/115345, filed on Dec. 8, 2017.

(51) Int. Cl.

| | |
|---|---|
| ***H04W 24/08*** | (2009.01) |
| ***H04W 72/12*** | (2023.01) |
| ***H04W 72/20*** | (2023.01) |

(56) References Cited

U.S. PATENT DOCUMENTS

| | | | | |
|---|---|---|---|---|
| 2016/0006549 | A1 | 1/2016 | Kim et al. | |
| 2016/0143055 | A1 | 5/2016 | Nammi et al. | |
| 2017/0288743 | A1 | 10/2017 | Nam et al. | |
| 2019/0081753 | A1* | 3/2019 | Jung | H04L 1/1854 |

FOREIGN PATENT DOCUMENTS

| | | | |
|---|---|---|---|
| CN | 106656292 | A | 5/2017 |
| CN | 107231223 | A | 10/2017 |
| CN | 107306146 | A | 10/2017 |
| CN | 107371194 | A | 11/2017 |
| JP | 2014241475 | A | 12/2014 |
| WO | 2008122103 | A1 | 10/2008 |

OTHER PUBLICATIONS

«3GPP TSG RAN WG1 Meeting #88bits: R1-1704691» Intel Corporation Control signaling enhancement for NC-JT dated Apr. 7, 2017.

«3GPP TSG RAN WG1 Meeting #88bis: R1-1704449» MediaTek Inc. CQI acquisition for multi-panel antenna systems dated Apr. 7, 2017.

First Search Report of Chinese patent application No. 201780094915.5 dated Jul. 23, 2021.

First Office Action of Chinese patent application No. CN201780094915.5 dated Aug. 13, 2021.

Notification to Grant Patent Right for Invention of Chinese patent application No. CN201780094915.5 dated Nov. 25, 2021.

3GPP. "Technical Specification 3rd Generation Partnership Project; Technical Specification Group Radio Access Network; Evolved Universal Terrestrial Radio Access (E-UTRA); Radio Resource Control (RRC); Protocol Specification (Release 14)" 3GPPTS 36.331 V14.5.0 (Dec. 2017), Dec. 31, 2017 (Dec. 31, 2017).

ISR received in application No. PCT/CN2017/115345 dated Aug. 7, 2018.

First Search Report of Chinese patent application No. CN202210008721.1 dated Jan. 29, 2024.

Notification to Grant Patent Right for Invention of Chinese patent application No. CN202210008721.1 dated Feb. 1, 2024.

Third Generation Partnership Project, "Technical Specification Group Radio Access Network; Evolved Universal Terrestrial Radio Access (E-UTRA); Physical layer procedures (Release 14)," 3GPP TS 36.213 V14.4.0 (Sep. 2017).

Third Generation Partnership Project, "Technical Specification Group Radio Access Network; Study on Licensed-Assisted Access to Unlicensed Spectrum; (Release 13)," 3GPP TR 36.889 V13.0.0 (Jun. 2015).

Third Generation Partnership Project, "Technical Specification Group Radio Access Network; NR; Physical channels and modulation (Release 15)," 3GPP TS 38.211 V1.0.0 (Sep. 2017).

Third Generation Partnership Project, "Technical Specification Group Radio Access Network; NR; Multiplexing and channel coding (Release 15)," 3GPP TS 38.212 V1.2.0 (Nov. 2017).

Third Generation Partnership Project, "Technical Specification Group Radio Access Network; NR; Physical layer procedures for control (Release 15)," 3GPP TS 38.213 V1.2.0 (Nov. 2017).

Third Generation Partnership Project, "Technical Specification Group Radio Access Network; NR; Physical layer procedures for data (Release 15)," 3GPP TS 38.214 V1.2.0 (Nov. 2017).

Third Generation Partnership Project, "Technical Specification Group Radio Access Network; NR; Medium Access Control (MAC) protocol specification (Release 15)," 3GPP TS 38.321 V1.1.0 (Nov. 2017).

Third Generation Partnership Project, "Technical Specification Group Radio Access Network; NR; Radio Resource Control (RRC); Protocol specification (Release 15)," 3GPP TS 38.331 V0.1.0 (Oct. 2017).

* cited by examiner

METHOD AND DEVICE FOR SELECTING ANTENNA CONFIGURATION IN UNLICENSED SPECTRUM OF WIRELESS COMMUNICATION

CROSS REFERENCE TO RELATED APPLICATIONS

This application is the continuation of the U.S. patent application Ser. No. 16/882,786, filed on May 26, 2020, which is a continuation of International Application No. PCT/CN2017/115345, filed on Dec. 8, 2017, claiming the priority benefit of International Application PCT/CN2017/115345, filed on Dec. 8, 2017, the full disclosure of which is incorporated herein by reference.

BACKGROUND

Technical Field

The present disclosure relates to methods and devices of radio signal transmission in wireless communication systems, and in particular to a method and device of radio signal transmission in a wireless communication system that supports cellular networks.

Related Art

In a traditional 3rd Generation Partner Project (3GPP) Long-term Evolution (LTE) system, data transmission only occurs on Licensed Spectrum. However, as traffic flow began to skyrocket, particularly in some urban areas, the Licensed Spectrum may hardly meet growing demands for traffic, therefore, in Release 13 and Release 14 communications on Unlicensed Spectrum is introduced into a cellular system and used for downlink and uplink data transmissions. To ensure compatibility with other access technologies on Unlicensed Spectrum, the technique of Listen Before Talk (LBT) is adopted by Licensed Assisted Access (LAA) so as to prevent interference caused by multiple transmitters occupying a same frequency resource at the same time. A transmitter in LTE system adopts quasi-omnidirectional antennas in performing LBT.

At present, technical discussions about 5G New Radio (NR) are in progress, which include Massive Multi-Input-Multi-Output (MIMO), a new hot topic of study on next generation mobile communications. In Massive MIMO, a plurality of antennas form through beamforming a beam pointing in a specific spatial direction to improve communication quality. When considering characteristics of coverage brought about by beamforming, a traditional LAA technology needs to be reconsidered, such as an LBT scheme.

SUMMARY

Inventors find through researches that beamforming will be applied in large-scale in 5G systems, and beamforming-based LBT scheme will influence the transmission of control information and data. Since measurements on a plurality of beams will lead to more than one LBT process, and these LBT processes correspond to multiple transmissions of control information and data, how to manage the control information and data transmissions corresponding to the multiple LBTs with high efficiency becomes a key issue to be solved.

To address the above problem, the present disclosure provides a solution. It should be noted that the embodiments of a User Equipment (UE) in the present disclosure and characteristics in the embodiments may be applied to a base station if there is no conflict, and vice versa. Further, the embodiments of the present disclosure and the characteristics in the embodiments may be mutually combined if no conflict is incurred.

The present disclosure provides a method in a UE for wireless communications, comprising:

- receiving N groups of first configuration information, each group of the N groups of first configuration information being used for determining a corresponding antenna port group set, N being a positive integer greater than 1;
- receiving Q piece(s) of indication information, Q being a positive integer; and
- receiving first control information, the first control information being associated with first information, the first information being one of the Q piece(s) of indication information;
- herein, the first information is used for determining first target configuration information out of the N groups of first configuration information; the first target configuration information is one group of the N groups of first configuration information; the first target configuration information is used for determining a first antenna port group set, the first antenna port group set is composed of one or more antenna port groups, of which each antenna port group is composed of one or more antenna ports; a first reference antenna port group is an antenna port group in the first antenna port group set, a measurement on the first reference antenna port group is used for receiving the first control information.

In one embodiment, the essence of the above method lies in that N groups of first configuration information respectively correspond to N LBTs, and different LBTs may employ different beams for listening; Q piece(s) of indication information respectively correspond to Q LBT(s) out of the N LBTs, first information is one of the Q piece(s) of indication information, and the first information and first control information correspond to a same LBT, the first information indicates configuration information relevant to the first control information, such as a receiving beam. An advantage of the above method is that different LBTs may correspond to a variety of control-information-related configurations, such as a transmitting/receiving beam, so that configuring multiple groups of configuration information relevant to control information can help satisfy varying requirements of control information transmission corresponding to each LBT. Relevant configuration of first control information can be acquired through first information, thereby receiving the first control information.

According to one aspect of the present disclosure, the above method is characterized in that the Q piece(s) of indication information respectively indicates(indicate) that Q multicarrier symbol group(s) is(are) occupied, any multicarrier symbol group of the Q multicarrier symbol group(s) comprises a positive integer number of multicarrier symbol(s).

In one embodiment, the essence of the above method lies in that the Q piece(s) of indication information is(are) cell-common or terminal group-common and used to indicate which multicarrier symbol(s) shall be occupied by the cell or the terminal group. The above method is advantageous in cutting down a large amount of signaling overhead incurred by employing terminal-specific signaling indication, if any.

According to one aspect of the present disclosure, the above method is characterized in comprising:

first operating a first radio signal in a first frequency-domain resource;

herein, the first control information comprises scheduling information of the first radio signal, the Q is a positive integer greater than 1; the scheduling information of the first radio signal is used for determining a second reference antenna port group out of a second antenna port group set, the second antenna port group set is composed of at least two antenna port groups, each of the antenna port groups is composed of one or more antenna ports; a measurement on the second reference antenna port group is used for first operating the first radio signal; the first operating is receiving, or, the first operating is transmitting.

In one embodiment, the essence of the above method lies in that a first radio signal, first control information and first information all correspond to a same LBT. An advantage of the above method is that highly-efficient management can be guaranteed for transmissions of control information and radio signals corresponding to a plurality of LBTs.

According to one aspect of the present disclosure, the above method is characterized in comprising:

receiving M groups of second configuration information, each group of the M groups of second configuration information is used for determining a corresponding antenna port group set, the M is a positive integer greater than 1;

herein, the first information is also used for determining second target configuration information out of the M groups of second configuration information; the second target configuration information is one group of the M groups of second configuration information; the second target configuration information is used for determining the second antenna port group set.

In one embodiment, an advantage of the above method is that a variety of beams are used by different LBTs for listening, and respective configurations for radio signal transmissions corresponding to the different LBTs may vary, such as a transmitting/receiving beam for a radio signal, so that demands on radio signal transmissions corresponding to different LBTs can be met with agility by configuring multiple groups of configuration information relevant to the radio signals.

According to one aspect of the present disclosure, the above method is characterized in comprising:

performing a first access detection;

herein, the first operating is transmitting, performing of the first access detection is prior to transmission of the first radio signal; the first access detection comprises:

performing T energy detection(s) respectively in T time sub-pool(s) to obtain T detection value(s);

herein, each of T1 detection value(s) out of the T detection value(s) is lower than a first threshold, the T is a positive integer, the T1 is a positive integer no greater than the T.

According to one aspect of the present disclosure, the above method is characterized in that the Q is a positive integer greater than 1, time-domain resources occupied by any two of the Q pieces of indication information are orthogonal, or, time-domain resources occupied by at least two of the Q pieces of indication information are overlapped; each multicarrier symbol between time-domain resources occupied by the first information and time-domain resources occupied by the first control information is occupied.

In one embodiment, the essence of the above method lies in that Q pieces of indication information respectively correspond to Q LBTs. If transmitting beams respectively employed by two of the Q pieces of indication information cannot be transmitted simultaneously, then time-frequency resources occupied by the two pieces of indication information are orthogonal; otherwise, the two pieces of indication information may be overlapped. The above method is advantageous in that capabilities vary from one transmitter to another, such as a number of radio frequency channels, the selection of transmitting beams corresponding to the Q pieces of indication information may be dependent on the implementation of a transmitter.

According to one aspect of the present disclosure, the above method is characterized in that the first control information and the first information belong to a same time slice in time domain, the time slice comprises a positive integer number of contiguous multicarrier symbols.

According to one aspect of the present disclosure, the above method is characterized in that the first control information is transmitted in a resource element subset of a first resource element set, the first resource element set comprises multiple of resource element subsets, each of the resource element subsets is composed of a positive integer number of resource element(s); the N groups of first configuration information are respectively used for determining N resource element sets and the first resource element set is a resource element set out of the N resource element sets corresponding to the first target configuration information, or, the N groups of first configuration information all correspond to the first resource element set; the resource element occupies a multicarrier symbol in time domain and a subcarrier in frequency domain.

According to one aspect of the present disclosure, the above method is characterized in comprising:

receiving second information;

herein, the second information is used for determining the first resource element set, and each of the N groups of first configuration information corresponds to the first resource element set.

According to one aspect of the present disclosure, the above method is characterized in comprising:

receiving Q indication information group(s), each of the Q indication information group(s) comprises a positive integer number of piece(s) of indication information;

herein, the Q piece(s) of indication information respectively belongs(belong) to the Q indication information group(s), each multicarrier symbol between any adjacent two pieces of information out of each of the Q indication information group(s) is occupied.

The present disclosure provides a method in a base station for wireless communications, comprising:

transmitting N groups of first configuration information, each group of the N groups of first configuration information being used for determining a corresponding antenna port group set, N being a positive integer greater than 1;

transmitting Q piece(s) of indication information, Q being a positive integer; and transmitting first control information, the first control information being associated with first information, the first information being one of the Q piece(s) of indication information;

herein, the first information is used for determining first target configuration information out of the N groups of first configuration information; the first target configuration information is one group of the N groups of first configuration information; the first target configuration information is used for determining a first antenna port group set, the first antenna port group set is composed of one or more antenna port groups, of which each antenna port group is composed of one or more antenna ports; a first reference antenna port group is an antenna port group in the first antenna port group set, a measurement on the first reference antenna port group is used for receiving the first control information.

According to one aspect of the present disclosure, the above method is characterized in that the Q piece(s) of indication information respectively indicates(indicate) that Q multicarrier symbol group(s) is(are) occupied, any multicarrier symbol group of the Q multicarrier symbol group(s) comprises a positive integer number of multicarrier symbol(s).

According to one aspect of the present disclosure, the above method is characterized in comprising:

second operating a first radio signal in a first frequency-domain resource;

herein, the first control information comprises scheduling information of the first radio signal, the Q is a positive integer greater than 1; the scheduling information of the first radio signal is used for determining a second reference antenna port group out of a second antenna port group set, the second antenna port group set is composed of at least two antenna port groups, each of the antenna port groups is composed of one or more antenna ports; a measurement on the second reference antenna port group is used for first operating the first radio signal; the first operating is transmitting and the second operating is receiving, or, the first operating is receiving and the second operating is transmitting.

According to one aspect of the present disclosure, the above method is characterized in comprising:

transmitting M groups of second configuration information, each group of the M groups of second configuration information is used for determining a corresponding antenna port group set, the M is a positive integer greater than 1;

herein, the first information is also used for determining second target configuration information out of the M groups of second configuration information; the second target configuration information is one group of the M groups of second configuration information; the second target configuration information is used for determining the second antenna port group set.

According to one aspect of the present disclosure, the above method is characterized in comprising:

performing a second access detection;

performing of the second access detection is prior to transmission of the first radio signal, the second operating is transmitting, the second access detection comprises:

performing S energy detection(s) respectively in S time sub-pool(s) to obtain S detection value(s);

herein, each of S1 detection value(s) out of the S detection value(s) is lower than a second threshold, the S is a positive integer, the S1 is a positive integer no greater than the S.

According to one aspect of the present disclosure, the above method is characterized in that the Q is a positive integer greater than 1, time-domain resources occupied by any two of the Q pieces of indication information are orthogonal, or, time-domain resources occupied by at least two of the Q pieces of indication information are overlapped; each multicarrier symbol between time-domain resources occupied by the first information and time-domain resources occupied by the first control information is occupied.

According to one aspect of the present disclosure, the above method is characterized in that the first control information and the first information belong to a same time slice in time domain, the time slice comprises a positive integer number of contiguous multicarrier symbols.

According to one aspect of the present disclosure, the above method is characterized in that the first control information is transmitted in a resource element subset of a first resource element set, the first resource element set comprises multiple of resource element subsets, each of the resource element subsets is composed of a positive integer number of resource element(s); the N groups of first configuration information are respectively used for determining N resource element sets and the first resource element set is a resource element set out of the N resource element sets corresponding to the first target configuration information, or, the N groups of first configuration information all correspond to the first resource element set; the resource element occupies a multicarrier symbol in time domain and a subcarrier in frequency domain.

According to one aspect of the present disclosure, the above method is characterized in comprising:

transmitting second information;

herein, the second information is used for determining the first resource element set, and each of the N groups of first configuration information corresponds to the first resource element set.

According to one aspect of the present disclosure, the above method is characterized in comprising:

transmitting Q indication information group(s), each of the Q indication information group(s) comprises a positive integer number of piece(s) of indication information;

herein, the Q piece(s) of indication information respectively belongs(belong) to the Q indication information group(s), each multicarrier symbol between any adjacent two pieces of information out of each of the Q indication information group(s) is occupied.

The present disclosure provides a UE for wireless communications, comprising:

a first receiver, receiving N groups of first configuration information, each group of the N groups of first configuration information is used for determining a corresponding antenna port group set, the N is a positive integer greater than 1; receiving Q piece(s) of indication information, Q being a positive integer; receiving first control information, the first control information being associated with first information, the first information being one of the Q piece(s) of indication information;

herein, the first information is used for determining first target configuration information out of the N groups of first configuration information; the first target configuration information is one group of the N groups of first configuration information; the first target configuration information is used for determining a first antenna port group set, the first antenna port group set is composed of one or more antenna port groups, of which each antenna port group is composed of one or more antenna ports; a first reference antenna port group is an antenna port group in the first antenna port group set, a measurement on the first reference antenna port group is used for receiving the first control information.

In one embodiment, the above UE is characterized in that the Q piece(s) of indication information respectively indicates(indicate) that Q multicarrier symbol group(s) is(are) occupied, any multicarrier symbol group of the Q multicarrier symbol group(s) comprises a positive integer number of multicarrier symbol(s).

In one embodiment, the above UE is characterized in comprising:

a first transceiver, first operating a first radio signal in a first frequency-domain resource;

herein, the first control information comprises scheduling information of the first radio signal, the Q is a positive integer greater than 1; the scheduling information of the first radio signal is used for determining a second reference antenna port group out of a second antenna port group set, the second antenna port group set is composed of at least two antenna port groups, each of the antenna port groups is composed of one or more antenna ports; a measurement on the second reference antenna port group is used for first operating the first radio signal; the first operating is receiving, or, the first operating is transmitting.

In one embodiment, the above UE is characterized in that the first receiver also receives M groups of second configuration information, each group of the M groups of second configuration information is used for determining a corresponding antenna port group set, the M is a positive integer greater than 1; herein, the first information is also used for determining second target configuration information out of the M groups of second configuration information, the second target configuration information is one group of the M groups of second configuration information, the second target configuration information is used for determining the second antenna port group set.

In one embodiment, the above UE is characterized in that the first receiver also performs a first access detection; wherein the first operating is transmitting, performing of the first access detection is prior to transmission of the first radio signal; the first access detection comprises:

performing T energy detection(s) respectively in T time sub-pool(s) to obtain T detection value(s); wherein each of T1 detection value(s) out of the T detection value(s) is lower than a first threshold, the T is a positive integer, the T1 is a positive integer no greater than the T.

In one embodiment, the above UE is characterized in that the Q is a positive integer greater than 1, time-domain resources occupied by any two of the Q pieces of indication information are orthogonal, or, time-domain resources occupied by at least two of the Q pieces of indication information are overlapped; each multicarrier symbol between time-domain resources occupied by the first information and time-domain resources occupied by the first control information is occupied.

In one embodiment, the above UE is characterized in that the first control information and the first information belong to a same time slice in time domain, the time slice comprises a positive integer number of contiguous multicarrier symbols.

In one embodiment, the above UE is characterized in that the first control information is transmitted in a resource element subset of a first resource element set, the first resource element set comprises multiple of resource element subsets, each of the resource element subsets is composed of a positive integer number of resource element(s); the N groups of first configuration information are respectively used for determining N resource element sets and the first resource element set is a resource element set out of the N resource element sets corresponding to the first target configuration information, or, the N groups of first configuration information all correspond to the first resource element set; the resource element occupies a multicarrier symbol in time domain and a subcarrier in frequency domain.

In one embodiment, the above UE is characterized in that the first receiver also receives second information; herein, the second information is used for determining the first resource element set, and each of the N groups of first configuration information corresponds to the first resource element set.

In one embodiment, the above UE is characterized in that the first receiver also receives Q indication information group(s), each multicarrier symbol between any adjacent two pieces of information out of each of the Q indication information group(s) is occupied.

The present disclosure provides a base station for wireless communications, comprising:

a second transmitter, transmitting N groups of first configuration information, each group of the N groups of first configuration information being used for determining a corresponding antenna port group set, N being a positive integer greater than 1; transmitting Q piece(s) of indication information, Q being a positive integer; and transmitting first control information, the first control information being associated with first information, the first information being one of the Q piece(s) of indication information;

herein, the first information is used for determining first target configuration information out of the N groups of first configuration information; the first target configuration information is one group of the N groups of first configuration information; the first target configuration information is used for determining a first antenna port group set, the first antenna port group set is composed of one or more antenna port groups, of which each antenna port group is composed of one or more antenna ports; a first reference antenna port group is an antenna port group in the first antenna port group set, a measurement on the first reference antenna port group is used for receiving the first control information.

In one embodiment, the above base station is characterized in that the Q piece(s) of indication information respectively indicates(indicate) that Q multicarrier symbol group(s) is(are) occupied, any multicarrier symbol group of the Q multicarrier symbol group(s) comprises a positive integer number of multicarrier symbol(s).

In one embodiment, the above base station is characterized in comprising:

a second transceiver, second operating a first radio signal in a first frequency-domain resource;

herein, the first control information comprises scheduling information of the first radio signal, the Q is a positive integer greater than 1; the scheduling information of the first radio signal is used for determining a second reference antenna port group out of a second antenna port group set, the second antenna port group set is composed of at least two antenna port groups, each of the antenna port groups is composed of one or more antenna ports; a measurement on the second reference antenna port group is used for first operating the first radio signal; the first operating is transmitting and the second operating is receiving, or, the first operating is receiving and the second operating is transmitting.

In one embodiment, the above base station is characterized in that the second transmitter also transmits M groups of second configuration information, each group of the M groups of second configuration information is used for determining a corresponding antenna port group set, the M is a positive integer greater than 1; herein, the first information is also used for determining second target configuration information out of the M groups of second configuration information; the second target configuration information is one group of the M groups of second configuration information; the second target configuration information is used for determining the second antenna port group set.

In one embodiment, the above base station is characterized in comprising:

a second receiver, performing a second access detection;

herein, performing of the second access detection is prior to transmission of the first radio signal, the second operating is transmitting, the second access detection comprises:

performing S energy detection(s) respectively in S time sub-pool(s) to obtain S detection value(s);

herein, each of S1 detection value(s) out of the S detection value(s) is lower than a second threshold, the S is a positive integer, the S1 is a positive integer no greater than the S.

In one embodiment, the above base station is characterized in that the Q is a positive integer greater than 1, time-domain resources occupied by any two of the Q pieces of indication information are orthogonal, or, time-domain resources occupied by at least two of the Q pieces of indication information are overlapped; each multicarrier symbol between time-domain resources occupied by the first information and time-domain resources occupied by the first control information is occupied.

In one embodiment, the above base station is characterized in that the first control information and the first information belong to a same time slice in time domain, the time slice comprises a positive integer number of contiguous multicarrier symbols.

In one embodiment, the above base station is characterized in that the first control information is transmitted in a resource element subset of a first resource element set, the first resource element set comprises multiple of resource element subsets, each of the resource element subsets is composed of a positive integer number of resource element(s); the N groups of first configuration information are respectively used for determining N resource element sets and the first resource element set is a resource element set out of the N resource element sets corresponding to the first target configuration information, or, the N groups of first configuration information all correspond to the first resource element set; the resource element occupies a multicarrier symbol in time domain and a subcarrier in frequency domain.

In one embodiment, the above base station is characterized in that the second transmitter also transmits second information; herein, the second information is used for determining the first resource element set, and each of the N groups of first configuration information corresponds to the first resource element set.

In one embodiment, the above base station is characterized in that the second transmitter also transmits Q indication information group(s), each of the Q indication information group(s) comprises a positive integer number of piece(s) of indication information; herein, the Q piece(s) of indication information respectively belongs(belong) to the Q indication information group(s), each multicarrier symbol between any adjacent two pieces of information out of each of the Q indication information group(s) is occupied.

In one embodiment, the present disclosure has the following technical edges over prior art:

In the application of beam-based LBT, different LBTs may employ different receiving beams in listening; multiple receiving beams correspond to multiple LBTs, and there is a one-to-one correspondence relationship between transmission of control information corresponding to the multiple LBTs and transmission of radio signals corresponding to the multiple LBTs. In this way an efficient management of the multiple control information and radio signal transmissions that correspond to the LBTs can be achieved.

Relevant configurations of control information corresponding to different LBTs may be varied, such as in transmitting/receiving beams, therefore, configuring a plurality of groups of configuration information relevant to control information will contribute to flexible adjustments to control information transmissions corresponding to the different LBTs.

Different LBTs employ different beams for listening, and respective configurations of radio signal transmissions corresponding to the LBTs may vary, such as a transmitting/receiving beam for a radio signal. By configuring multiple groups of configuration information related to the radio signals, different requirements of radio signal transmissions posed by LBTs can be satisfied flexibly.

LBT beams are selected by transmitters in a flexible manner in accordance with their capabilities. Since each transmitter has its own unique capability, such as the number of radio frequency channels, if two LBT beams cannot be utilized together, then these LBT beams are orthogonal, and corresponding control information and radio signal transmissions are also orthogonal in time domain, otherwise these two beams and corresponding control information and radio signal transmissions may be overlapped.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
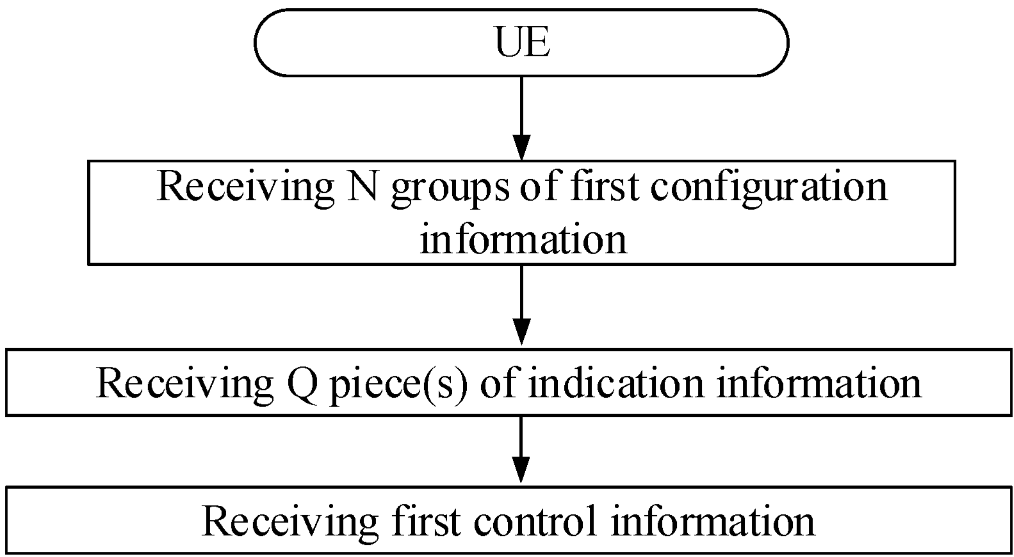
FIG. 1 illustrates a flowchart of N groups of first configuration information, Q piece(s) of indication information and first control information according to one embodiment of the present disclosure.

Embodiment 1 illustrates a flowchart of N groups of first configuration information, Q piece(s) of indication information and first control information, as shown in FIG. 1.

In Embodiment 1, the UE of the present disclosure receives N groups of first configuration information, each group of the N groups of first configuration information being used for determining a corresponding antenna port group set, N being a positive integer greater than 1; receives Q piece(s) of indication information, Q being a positive integer; and receives first control information, the first control information being associated with first information, the first information being one of the Q piece(s) of indication information; herein, the first information is used for determining first target configuration information out of the N groups of first configuration information; the first target configuration information is one group of the N groups of first configuration information; the first target configuration information is used for determining a first antenna port group set, the first antenna port group set is composed of one or more antenna port groups, of which each antenna port group is composed of one or more antenna ports; a first reference antenna port group is an antenna port group in the first antenna port group set, a measurement on the first reference antenna port group is used for receiving the first control information.

In one embodiment, the N groups of first configuration information are semi-statically configured.

In one embodiment, the N groups of first configuration information are carried by a higher signaling.

In one embodiment, the N groups of first configuration information are carried by a Radio Resource Control (RRC) signaling.

In one embodiment, the N groups of first configuration information are all or part of an Information Element (IE) in an RRC signaling.

In one embodiment, the N groups of first configuration information are carried by a Medium Access Control (MAC) Control Element (CE) signaling.

In one embodiment, the N groups of first configuration information are transmitted in a System Information Block (SIB).

In one embodiment, the Q piece(s) of indication information is(are) dynamically configured.

In one embodiment, the Q piece(s) of indication information is(are) respectively carried by Q physical layer signaling(s).

In one embodiment, the Q piece(s) of indication information respectively belongs(belong) to Q piece(s) of Downlink Control Information (DCI).

In one embodiment, one of the Q piece(s) of indication information belongs to a field in a DCI signaling, and the field comprises a positive integer number of bit(s).

In one embodiment, the Q piece(s) of indication information is(are) respectively carried by Q downlink physical layer control channel(s) (i.e., downlink channel(s) only capable of carrying physical layer signaling(s)).

In one embodiment, the Q piece(s) of indication information is(are) respectively carried by Q Physical Downlink Control Channel(s) (PDCCH).

In one embodiment, the Q piece(s) of indication information is(are) respectively carried by Q short PDCCH(s) (sPDCCH).

In one embodiment, the Q piece(s) of indication information is(are) respectively carried by Q New Radio PDCCH(s) (NR-PDCCH).

In one embodiment, the Q piece(s) of indication information is(are) respectively carried by Q Narrow Band PDCCH(s) (NB-PDCCH).

In one embodiment, a signaling identifier of each of the Q piece(s) of indication information is a Component Carrier (CC)-Radio Network Temporary Identifier (RNTI).

In one embodiment, the Q piece(s) of indication information respectively belongs(belong) to Q piece(s) of DCI identified by CC-RNTI(s).

In one embodiment, the CC-RNTI(s) is(are) used to generate RS sequence(s) of DeModulation Reference Signals (DMRS) respectively corresponding to the Q piece(s) of indication information.

In one embodiment, Cyclic Redundancy Check (CRC) bit sequence(s) of the Q piece(s) of indication information is(are) scrambled by CC-RNTI(s).

In one embodiment, the Q piece(s) of indication information respectively belongs(belong) to Q piece(s) of terminal group-specific DCI, the UE is one terminal from the Q terminal group(s).

In one embodiment, the Q piece(s) of indication information respectively belongs(belong) to Q piece(s) of cell-common DCI.

In one embodiment, the Q piece(s) of indication information is(are) terminal group-specific, and the UE is a terminal from the terminal group.

In one embodiment, the Q piece(s) of indication information is(are) cell-common.

In one embodiment, each of signaling identifier(s) of the Q piece(s) of indication information is a cell-Radio Network Temporary Identifier (C-RNTI).

In one embodiment, the Q piece(s) of indication information respectively belongs(belong) to Q piece(s) of DCI identified by C-RNTI(s).

In one embodiment, the C-RNTI(s) is(are) used to generate RS sequence(s) of DMRS respectively corresponding to the Q piece(s) of indication information.

In one embodiment, CRC bit sequence(s) of the Q piece(s) of indication information is(are) scrambled by C-RNTI(s).

In one embodiment, the Q piece(s) of indication information respectively belongs(belong) to Q piece(s) of UE-specific DCI.

In one embodiment, the first control information is dynamically configured.

In one embodiment, the first control information is carried by a physical layer signaling.

In one embodiment, the first control information is carried by a dynamic signaling used for Downlink Grant.

In one embodiment, the first control information is carried by a dynamic signaling used for Uplink Grant.

In one embodiment, the first control information belongs to DCI.

In one embodiment, the first control information is a piece of UE-specific DCI.

In one embodiment, the first control information is a piece of terminal group-specific DCI, and the UE is one terminal in the terminal group.

In one embodiment, the first control information is a piece of cell-common DCI.

In one embodiment, the first control information is Downlink Grant DCI.

In one embodiment, the first control information is Uplink Grant DCI.

In one embodiment, the first control information is a field of a DCI signaling, the field comprises a positive integer number of bit(s).

In one embodiment, the first control information is carried by a downlink physical layer control channel.

In one embodiment, the first control information is carried by a PDCCH.

In one embodiment, the first control information is carried by an sPDCCH.

In one embodiment, the first control information is carried by an NR-PDCCH.

In one embodiment, the first control information is carried by an NB-PDCCH.

In one embodiment, a signaling identifier of the first control information is a C-RNTI.

In one embodiment, the first control information is DCI identified by C-RNTI.

In one embodiment, the C-RNTI is used to generate an RS sequence of DMRS corresponding to the first control information.

In one embodiment, a CRC bit sequence of the first control information is scrambled by C-RNTI.

In one embodiment, a signaling identifier of the first control information is a CC-RNTI.

In one embodiment, the first control information is DCI identified by CC-RNTI.

In one embodiment, the CC-RNTI is used to generate an RS sequence of DMRS corresponding to the first control information.

In one embodiment, a CRC bit sequence of the first control information is scrambled by CC-RNTI.

In one embodiment, the first information and the first control information respectively belong to two pieces of DCI.

In one embodiment, the first information and the first control information belong to a same piece of DCI.

In one embodiment, the first information and the first control information belong to a same piece of DCI identified by CC-RNTI.

In one embodiment, the first information and the first control information belong to a same piece of cell-common DCI.

In one embodiment, the first information and the first control information belong to a same piece of terminal group-specific DCI, and the UE is one terminal in the terminal group.

In one embodiment, the first information and the first control information belong to a same piece of DCI identified by C-RNTI.

In one embodiment, the first information and the first control information belong to a same piece of UE-specific DCI.

In one embodiment, the first information and the first control information belong to a first field and a second field of a same piece of DCI identified by CC-RNTI.

In one embodiment, the first information and the first control information belong to a first field and a second field of a same piece of cell-common DCI.

In one embodiment, the first information and the first control information belong to a first field and a second field of a same piece of terminal group-specific DCI, and the UE is one terminal in the terminal group.

In one embodiment, the first information and the first control information belong to a first field and a second field of a same piece of DCI identified by C-RNTI.

In one embodiment, the first information and the first control information belong to a first field and a second field of a same piece of UE-specific DCI.

In one embodiment, the first target configuration information explicitly indicates a first antenna port group set.

In one embodiment, the first target configuration information implicitly indicates a first antenna port group set.

In one embodiment, the first target configuration information indicates a set of indexes of radio signals transmitted on the first antenna port group set.

In one embodiment, a radio signal transmitted on any antenna port group among the first antenna port group set comprises at least one of an uplink radio signal or a downlink radio signal.

In one embodiment, a radio signal transmitted on any antenna port group among the first antenna port group set comprises at least one of a Channel-state information reference signal (CSI-RS), a Sounding Reference Signal (SRS), a downlink Demodulation Reference Signal (DMRS), an uplink DMRS, a synchronization signal, a downlink Phase-Tracking Reference Signal (PTRS), an uplink PTRS or a Tracking Reference Signal (TRS).

In one embodiment, a radio signal transmitted on the first reference antenna port group comprises at least one of an uplink radio signal or a downlink radio signal.

In one embodiment, a radio signal transmitted on the first reference antenna port group comprises at least one of a CSI-RS, an SRS, a downlink DMRS, an uplink DMRS, a synchronization signal, a downlink PTRS, an uplink PTRS or a TRS.

In one embodiment, the phrase that a measurement on a given antenna port group is used for receiving given information or a given radio signal means that the UE is able to infer all or part of large-scale properties of a radio signal of the given information or the given radio signal from all or part of large-scale properties of a radio signal transmitted on the given antenna port group.

In one embodiment, the phrase that a measurement on a given antenna port group is used for receiving given information or a given radio signal means that the UE is able to infer multi-antenna related reception corresponding to the given information or the given radio signal from multi-antenna reception corresponding to a radio signal transmitted on the given antenna port group, the radio signal transmitted on the given antenna port group is received by the UE.

In one embodiment, the phrase that a measurement on a given antenna port group is used for receiving given information or a given radio signal means that the UE is able to infer multi-antenna related reception corresponding to the given information or the given radio signal from multi-antenna transmission corresponding to a radio signal transmitted on the given antenna port group, the radio signal transmitted on the given antenna port group is transmitted by the UE.

In one embodiment, large-scale properties of the given radio signal comprise one or more of delay spread, Doppler spread, Doppler shift, path loss, average gain, average delay, angle of arrival, angle of departure, spatial correlation, multi-antenna related transmission or multi-antenna related reception.

In one embodiment, the multi-antenna related reception refers to Spatial Rx parameters.

In one embodiment, the multi-antenna related reception refers to a receiving beam.

In one embodiment, the multi-antenna related reception refers to a receive beamforming matrix.

In one embodiment, the multi-antenna related reception refers to a receive analog beamforming matrix.

In one embodiment, the multi-antenna related reception refers to a receive beamforming vector.

In one embodiment, the multi-antenna related reception refers to a receive spatial filtering.

In one embodiment, the multi-antenna related transmission refers to Spatial Tx parameters.

In one embodiment, the multi-antenna related transmission refers to a transmitting beam.

In one embodiment, the multi-antenna related transmission refers to a transmit beamforming matrix.

In one embodiment, the multi-antenna related transmission refers to a transmit analog beamforming matrix.

In one embodiment, the multi-antenna related transmission refers to a transmit beamforming vector.

In one embodiment, the multi-antenna related transmission refers to a transmit spatial filtering.

Embodiment 2

Figure 2:
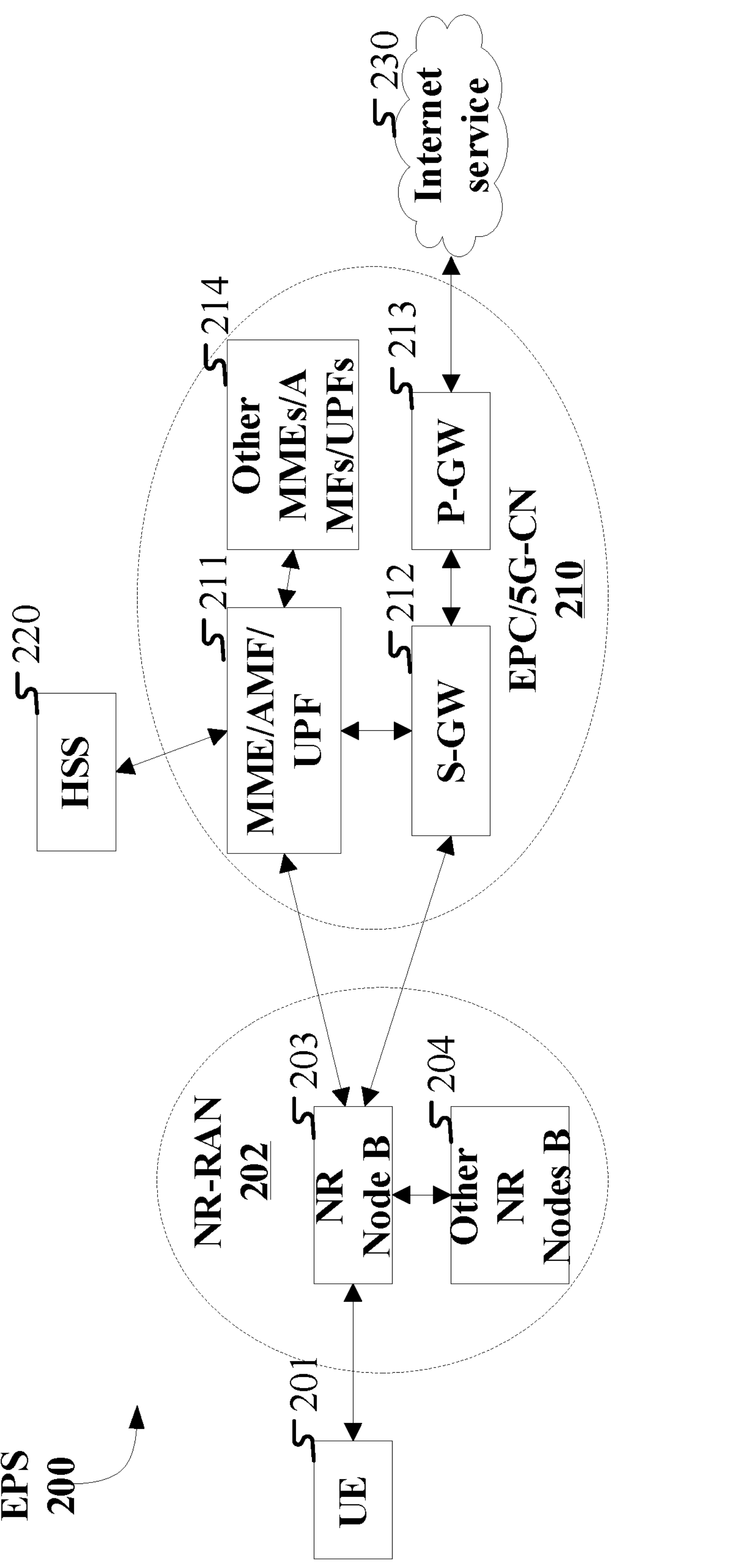
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, as well as a UE 241 in sidelink communication with the UE 201 and a UE 242 in sidelink communication with the UE 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a vehicle terminal, V2X equipment or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the UE in the present disclosure.

In one embodiment, the gNB 203 corresponds to the base station in the present disclosure.

In one embodiment, the UE 201 supports wireless communications where data is transmitted on Unlicensed Spectrum.

In one embodiment, the gNB 203 supports wireless communications where data is transmitted on Unlicensed Spectrum.

In one embodiment, the UE 201 supports massive MIMO-based wireless communications.

In one embodiment, the gNB 203 supports massive MIMO-based wireless communications.

Embodiment 3

Figure 3:
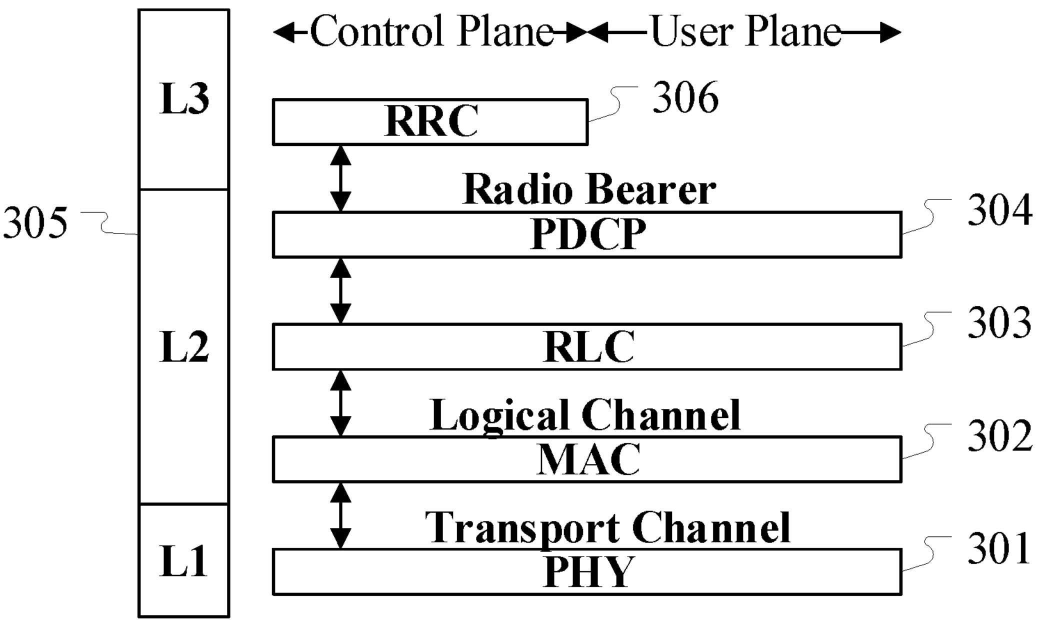
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a base station (gNB, eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the N groups of first configuration information of the present disclosure are generated by the RRC sublayer 306.

In one embodiment, the N groups of second configuration information of the present disclosure are generated by the RRC sublayer 306.

In one embodiment, the N groups of first configuration information of the present disclosure are generated by the MAC sublayer 302.

In one embodiment, the N groups of second configuration information of the present disclosure are generated by the MAC sublayer 302.

In one embodiment, the second information of the present disclosure is generated by the RRC sublayer 306.

In one embodiment, the second information of the present disclosure is generated by the MAC sublayer 302.

In one embodiment, the Q indication information group(s) of the present disclosure is(are) generated by the PHY 301.

In one embodiment, the Q piece(s) of indication information of the present disclosure is(are) generated by the PHY 301.

In one embodiment, the first control information of the present disclosure is generated by the PHY 301.

In one embodiment, the first radio signal of the present disclosure is generated by the PHY 301.

In one embodiment, the first access detection of the present disclosure is generated by the PHY 301.

In one embodiment, the second access detection of the present disclosure is generated by the PHY 301.

Embodiment 4

Figure 4:
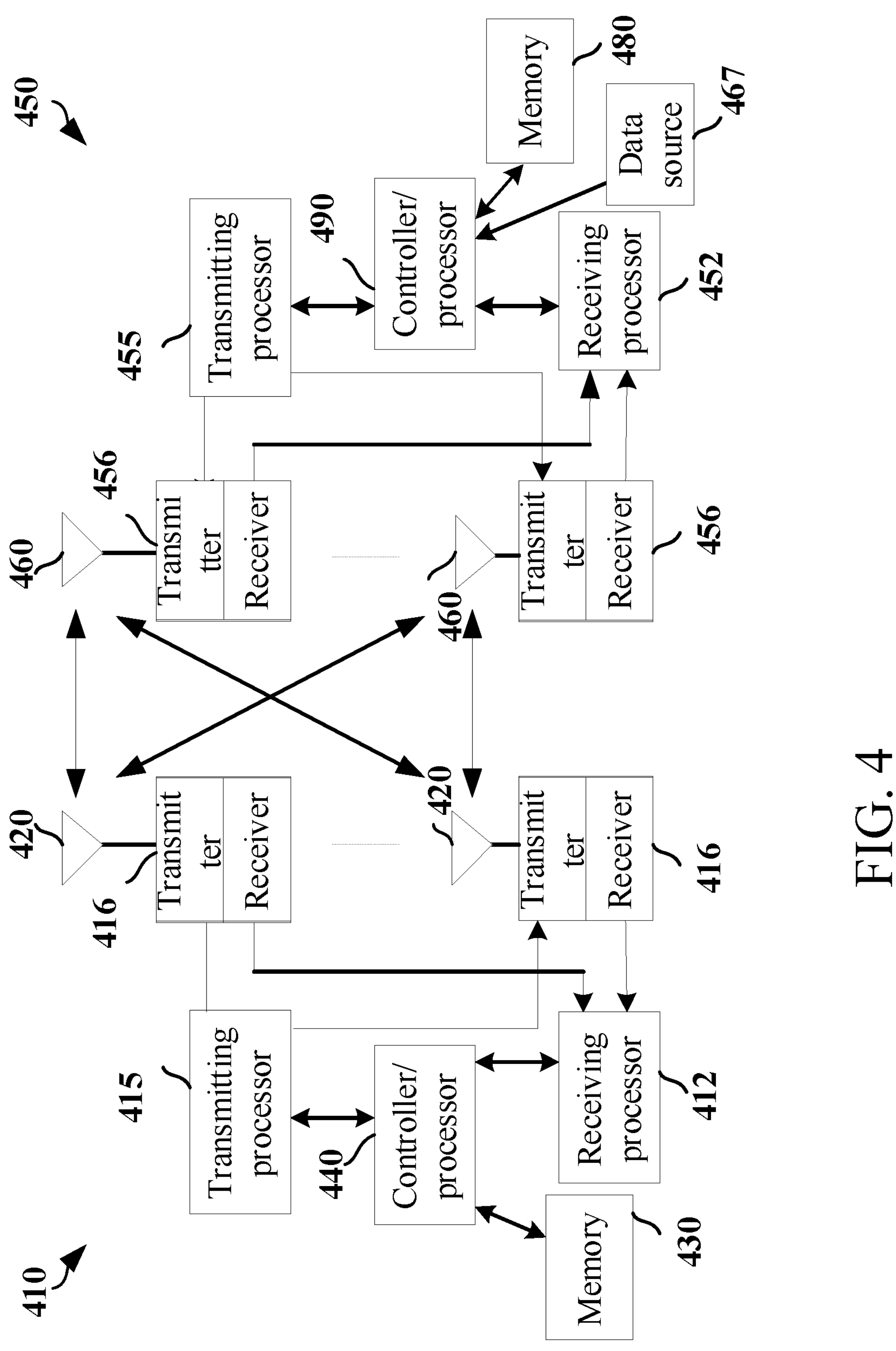
FIG. 4 illustrates a schematic diagram of an evolved node and a UE according to one embodiment of the present disclosure.

Embodiment 4 illustrates a schematic diagram of a base station (an evolved node) and a UE, as shown in FIG. 4. FIG. 4 is a block diagram of a gNB 410 in communication with UE 450 in an access network.

A base station (410) comprises a controller/processor 440, a memory 430, a receiving processor 412, a transmitting processor 415, a transmitter/receiver 416 and an antenna 420.

A UE (450) comprises a controller/processor 490, a memory 480, a data source 467, a transmitting processor 455, a receiving processor 452, a transmitter/receiver 456 and antenna 460.

In downlink transmission, processes relevant to the base station 410 comprise the following:

A higher-layer packet is provided to the controller/processor 440, and the controller/processor 440 provides header compression, encryption, packet segmentation and reordering as well as multiplexing and demultiplexing between a logical channel and a transport channel so as to implement the L2 layer protocols used for the user plane and the control plane; the higher-layer packet may comprise data or control information, such as a Downlink Shared Channel (DL-SCH).

The controller/processor 440 is associated with the memory 430 that stores program code and data; the memory 430 can be a computer readable medium.

The controller/processor 440 comprises a scheduling unit for transmission requests, where the scheduling unit is used to schedule radio resources corresponding to transmission requests.

The controller/processor 440 determines first configuration information, the Q piece(s) of indication information and the first control information.

The transmitting processor 415 receives bit flows output from the controller/processor 440 and provides various signal transmitting processing functions used for the L1 layer (that is PHY), including coding, interleaving, scrambling, modulating, power control/allocation and generation of physical layer control signaling (such as PBCH, PDCCH, PHICH, PCFICH and a reference signal).

The transmitter 416 is configured to convert a baseband signal provided from the transmitting processor 415 into a radio frequency signal which is to be transmitted via the antenna 420; each transmitter 416 performs sampling processing on respectively input symbol stream to acquire respective sampled signal stream. And each transmitter 416 further processes respectively sampled stream, for instance, by digital-to-analogue conversion, amplification, filtering and upconversion, to obtain a downlink signal.

In downlink transmission, processes relevant to the UE 450 may comprise the following:

- The receiver 456 is used to convert a radio frequency signal received via the antenna 460 into a baseband signal to be provided to the receiving processor 452;
- The receiving processor 452 provides various signal receiving processing functions used for the L1 layer (that is PHY), including decoding, de-interleaving, descrambling, demodulating and extraction of physical layer control signaling.

The controller/processor 490 determines first configuration information, the Q piece(s) of indication information and the first control information.

The controller/processor 490 receives bit flows output from the receiving processor 452, and provides header decompression, decryption, packet segmentation and reordering as well as multiplexing and demultiplexing between a logical channel and a transport channel so as to implement the L2 layer protocols used for the user plane and the control plane.

The controller/processor 490 is associated with the memory 480 that stores program code and data; the memory 480 may be called a computer readable medium.

In uplink (UL) transmission, processes relevant to the base station 410 comprise the following:

- The receiver 416 receives a radio frequency signal via a corresponding antenna 420, converting the radio frequency signal into a baseband signal and providing the baseband signal to the receiving processor 412.

The receiving processor 412 provides various signal receiving processing functions used for the L1 layer (that is PHY), including decoding, de-interleaving, descrambling, demodulation and extraction of physical layer control signaling.

The controller/processor 440 implements the functions of the L2 layer, and is associated with the memory 430 that stores program code and data.

The controller/processor 440 provides demultiplexing between a transport channel and a logical channel, packet reassembling, decryption, header decompression and control signal processing so as to recover a higher-layer packet from the UE 450; the higher-layer packet may be provided to a core network.

The controller/processor 440 determine first configuration, the Q piece(s) of indication information and the first control information.

In UL, processes relevant to the UE 450 comprise the following:

The data source 467 provides a higher-layer packet to the controller/processor 490. The data source 467 represents all protocol layers above the L2 layer.

The transmitter 456 transmits a radio frequency signal via a corresponding antenna 460, converting a baseband signal into a radio frequency signal and providing the radio frequency signal to the corresponding antenna 460.

The transmitting processor 455 provides various signal receiving processing functions used for the L1 layer (i.e., PHY), including decoding, de-interleaving, descrambling, demodulation and extraction of physical layer control signaling.

The controller/processor 490 performs header compression, encryption, packet segmentation and reordering as well as multiplexing between a logical channel and a transport channel based on radio resources allocation of the gNB 410, thereby implementing the L2 layer functions used for the user plane and the control plane.

The controller/processor 490 is also in charge of HARQ operation, retransmission of a lost packet and a signaling to the gNB 410.

The controller/processor 490 determine first configuration information, the Q piece(s) of indication information and the first control information.

In one subembodiment, the UE 450 comprises at least one processor and at least one memory. The at least one memory includes computer program codes. The at least one memory and the computer program codes are configured to be used in collaboration with the at least one processor. The UE 450 at least receives N groups of first configuration information, each group of the N groups of first configuration information being used for determining a corresponding antenna port group set, N being a positive integer greater than 1; receives Q piece(s) of indication information, Q being a positive integer; and receives first control information, the first control information being associated with first information, the first information being one of the Q piece(s) of indication information; the first information is used for determining first target configuration information out of the N groups of first configuration information; the first target configuration information is one group of the N groups of first configuration information; the first target configuration information is used for determining a first antenna port group set, the first antenna port group set is composed of one or more antenna port groups, of which each antenna port group is composed of one or more antenna ports; a first reference antenna port group is an antenna port group in the first antenna port group set, a measurement on the first reference antenna port group is used for receiving the first control information.

In one subembodiment, the UE 450 comprises a memory that stores a computer readable instruction program. The computer readable instruction program generates an action when executed by at least one processor. The action includes: receiving N groups of first configuration information, each group of the N groups of first configuration information being used for determining a corresponding antenna port group set, N being a positive integer greater than 1; receiving Q piece(s) of indication information, Q being a positive integer; and receiving first control information, the first control information being associated with first information, the first information being one of the Q piece(s) of indication information; the first information is used for determining first target configuration information out of the N groups of first configuration information; the first target configuration information is one group of the N groups of first configuration information; the first target configuration information is used for determining a first antenna port group set, the first antenna port group set is composed of one or more antenna port groups, of which each antenna port group is composed of one or more antenna ports; a first reference antenna port group is an antenna port group in the first antenna port group set, a measurement on the first reference antenna port group is used for receiving the first control information.

In one subembodiment, the gNB 410 comprises at least one processor and at least one memory. The at least one memory includes computer program codes. The at least one memory and the computer program codes are configured to be used in collaboration with the at least one processor. The gNB 410 at least transmits N groups of first configuration information, each group of the N groups of first configuration information being used for determining a corresponding antenna port group set, N being a positive integer greater than 1; transmits Q piece(s) of indication information, Q being a positive integer; and transmits first control information, the first control information being associated with first information, the first information being one of the Q piece(s) of indication information; the first information is used for determining first target configuration information out of the N groups of first configuration information; the first target configuration information is one group of the N groups of first configuration information; the first target configuration information is used for determining a first antenna port group set, the first antenna port group set is composed of one or more antenna port groups, of which each antenna port group is composed of one or more antenna ports; a first reference antenna port group is an antenna port group in the first antenna port group set, a measurement on the first reference antenna port group is used for receiving the first control information.

In one subembodiment, the gNB 410 comprises a memory that stores a computer readable instruction program. The computer readable instruction program generates an action when executed by at least one processor. The action includes: transmitting N groups of first configuration information, each group of the N groups of first configuration information being used for determining a corresponding antenna port group set, N being a positive integer greater than 1; transmitting Q piece(s) of indication information, Q being a positive integer; and transmitting first control information, the first control information being associated with first information, the first information being one of the Q piece(s) of indication information; the first information is used for determining first target configuration information out of the N groups of first configuration information; the first target configuration information is one group of the N groups of first configuration information; the first target configuration information is used for determining a first antenna port group set, the first antenna port group set is composed of one or more antenna port groups, of which each antenna port group is composed of one or more antenna ports; a first reference antenna port group is an antenna port group in the first antenna port group set, a measurement on the first reference antenna port group is used for receiving the first control information.

In one subembodiment, the UE 450 corresponds to the UE of the present disclosure.

In one subembodiment, the gNB 410 corresponds to the base station of the present disclosure.

In one subembodiment, the controller/processor 490 is used for determining at least one of the first configuration information, the Q piece(s) of indication information, or the first control information of the present disclosure.

In one subembodiment, at least the first two of the receiver 456, the receiving processor 452 and the controller/processor 490 are used for receiving the N groups of first configuration information.

In one subembodiment, at least the first two of the transmitter 416, the transmitting processor 415 and the controller/processor 440 are used for transmitting the N groups of first configuration information.

In one subembodiment, at least the first two of the receiver 456, the receiving processor 452 and the controller/processor 490 are used for receiving the Q piece(s) of indication information.

In one subembodiment, at least the first two of the transmitter 416, the transmitting processor 415 and the controller/processor 440 are used for transmitting the Q piece(s) of indication information.

In one subembodiment, at least the first two of the receiver 456, the receiving processor 452 and the controller/processor 490 are used for receiving the first control information.

In one subembodiment, at least the first two of the transmitter 416, the transmitting processor 415 and the controller/processor 440 are used for transmitting the first control information.

In one subembodiment, at least the first two of the receiver 456, the receiving processor 452 and the controller/processor 490 are used for receiving the first radio signal.

In one subembodiment, at least the first two of the transmitter 416, the transmitting processor 415 and the controller/processor 440 are used for transmitting the first radio signal.

In one subembodiment, at least the first two of the receiver 456, the receiving processor 452 and the controller/processor 490 are used for receiving the M groups of second configuration information.

In one subembodiment, at least the first two of the transmitter 416, the transmitting processor 415 and the controller/processor 440 are used for transmitting the M groups of second configuration information.

In one subembodiment, at least the first two of the receiver 456, the receiving processor 452 and the controller/processor 490 are used for receiving the second information.

In one subembodiment, at least the first two of the transmitter 416, the transmitting processor 415 and the controller/processor 440 are used for transmitting the second information.

In one subembodiment, at least the first two of the receiver 456, the receiving processor 452 and the controller/processor 490 are used for receiving the Q indication information group(s).

In one subembodiment, at least the first two of the transmitter 416, the transmitting processor 415 and the controller/processor 440 are used for transmitting the Q indication information group(s).

In one subembodiment, at least the first two of the receiver 456, the receiving processor 452 and the controller/processor 490 are used for performing the first access detection of the present disclosure.

In one subembodiment, at least the first two of the receiver 416, the receiving processor 412 and the controller/processor 440 are used for performing the second access detection of the present disclosure.

In one subembodiment, at least the first two of the transmitter 456, the transmitting processor 455 and the controller/processor 490 are used for transmitting the first radio signal of the present disclosure.

In one subembodiment, at least the first two of the receiver 416, the receiving processor 412 and the controller/processor 440 are used for receiving the first radio signal of the present disclosure.

Embodiment 5

Figure 5:
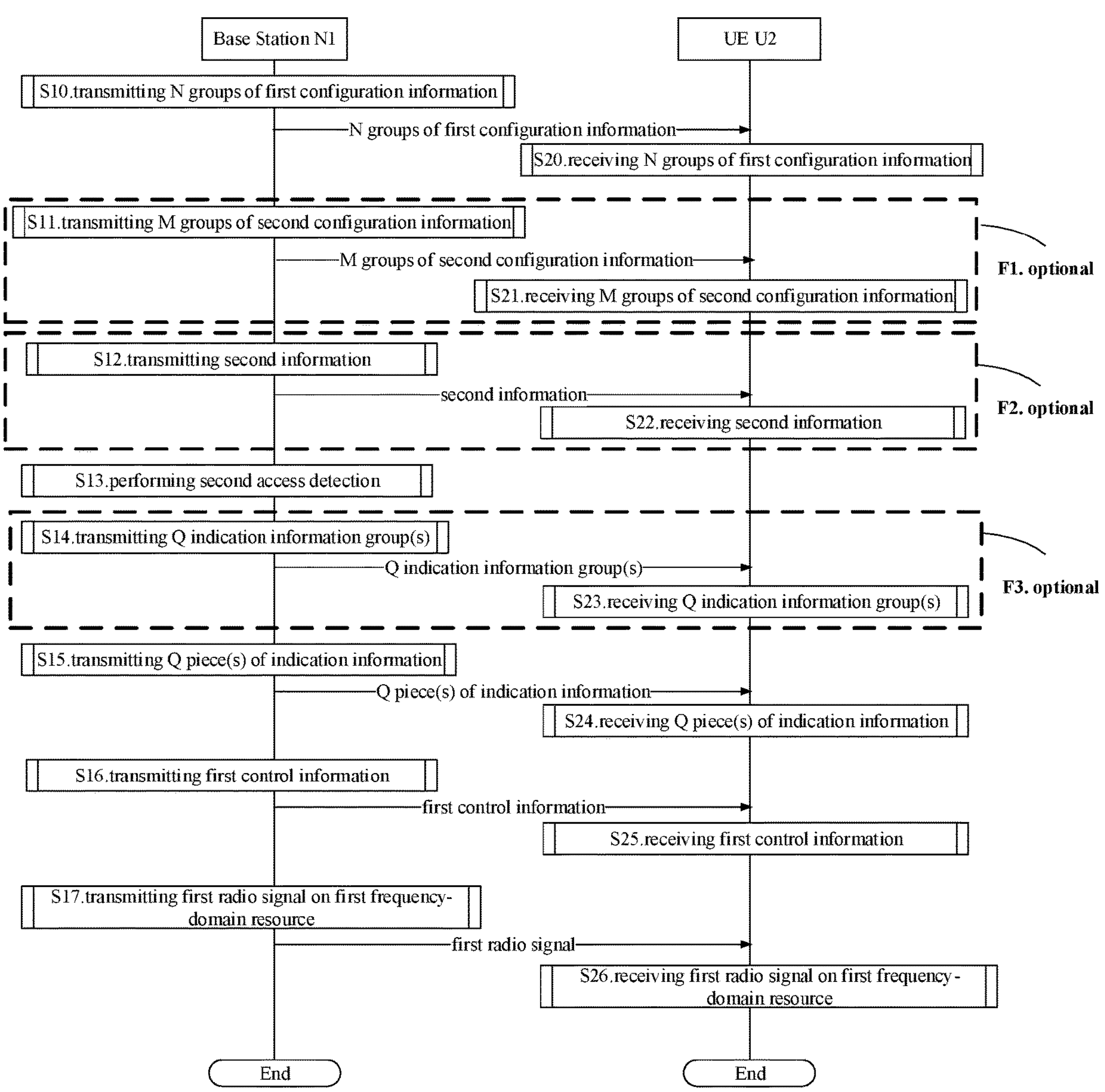
FIG. 5 illustrates a flowchart of wireless transmission according to one embodiment of the present disclosure.

Embodiment 5 illustrates a flowchart of wireless transmission, as shown in FIG. 5. In FIG. 5, a base station N1 is a maintenance base station for a serving cell of a UE U2. In FIG. 5, boxes F1, F2 and F3 are optional.

The N1 transmits N groups of first configuration information in step S10; transmits M groups of second configuration information in step S11; transmits second information in step S12; performs a second access detection in step S13; transmits Q indication information group(s) in step S14; transmits Q piece(s) of indication information in step S15; transmits first control information in step S16; and transmits a first radio signal on a first frequency-domain resource in step S17.

The U2 receives N groups of first configuration information in step S20; receives M groups of second configuration information in step S21; transmits second information in step S22; receives Q indication information group(s) in step S23; receives Q piece(s) of indication information in step S24; receives first control information in step S25; and receives a first radio signal on a first frequency-domain resource in step S26.

In Embodiment 5, the first information is used by the U2 for determining first target configuration information out of the N groups of first configuration information; the first target configuration information is one group of the N groups of first configuration information; the first target configuration information is used by the U2 for determining a first antenna port group set, the first antenna port group set is composed of one or more antenna port groups, of which each antenna port group is composed of one or more antenna ports; a first reference antenna port group is an antenna port group in the first antenna port group set, a measurement on the first reference antenna port group is used by the U2 for receiving the first control information. The first control information comprises scheduling information of the first radio signal, the Q is a positive integer greater than 1; the scheduling information of the first radio signal is used by the U2 for determining a second reference antenna port group out of a second antenna port group set, the second antenna port group set is composed of at least two antenna port groups, each of the antenna port groups is composed of one or more antenna ports; a measurement on the second reference antenna port group is used by the U2 for first operating the first radio signal; the first operating is receiving. The first information is also used by the U2 for determining second target configuration information out of the M groups of second configuration information; the second target configuration information is one group of the M groups of second configuration information; the second target configuration information is used by the U2 for determining the second antenna port group set. The second information is used by the U2 for determining the first resource element set, and each of the N groups of first configuration information corresponds to the first resource element set. The Q piece(s) of indication information respectively belongs(belong) to the Q indication information group(s), each multicarrier symbol between any adjacent two pieces of information out of each of the Q indication information group(s) is occupied.

In one embodiment, the scheduling information of the first radio signal comprises at least one of resources allocation, Modulation and Coding Scheme (MCS), configuration information of DMRS, Hybrid Automatic Repeat reQuest (HARQ) process number, Redundancy Version (RV), New Data Indicator (NDI), antenna port identifier, carrier index or transmitting power control.

In one subembodiment of the above embodiment, the antenna port identifier indicates the second reference antenna port group.

In one subembodiment of the above embodiment, the antenna port identifier indicates an index of a radio signal transmitted on the second reference antenna port group.

In one subembodiment of the above embodiment, the configuration information of the DMRS comprises one or more of occupied antenna ports, occupied time-domain resource, occupied frequency-domain resources, occupied code-domain resources, cyclic shift, or Orthogonal Cover Code (OCC).

In one embodiment, the first operating is receiving, the first radio signal comprises at least one of downlink data or a downlink reference signal.

In one subembodiment, the downlink reference signal comprises one or more of CSI-RS, downlink DMRS, downlink PTRS or TRS.

In one embodiment, the first frequency-domain resource is deployed at Unlicensed Spectrum.

In one embodiment, the first frequency-domain resource is a carrier.

In one embodiment, the first frequency-domain resource is a Bandwidth Part (BWP).

In one embodiment, the first frequency-domain resource comprises a positive integer number of Physical Resource Block(s) (PRB) in frequency domain.

In one embodiment, the first frequency-domain resource comprises a positive integer number of contiguous PRBs in frequency domain.

In one embodiment, the first frequency-domain resource comprises a positive integer number of Resource Block(s) (RB) in frequency domain.

In one embodiment, the first frequency-domain resource comprises a positive integer number of contiguous RBs in frequency domain.

In one embodiment, the first frequency-domain resource comprises a positive integer number of contiguous subcarriers in frequency domain.

In one embodiment, the number of contiguous subcarriers comprised by the first frequency-domain resource in frequency domain is a positive integral multiple of 12.

In one embodiment, the first frequency-domain resource and a frequency-domain resource occupied by the first information belong to a same carrier.

In one embodiment, the first frequency-domain resource and a frequency-domain resource occupied by the first information belong to different carriers.

In one embodiment, the first frequency-domain resource and a frequency-domain resource occupied by the first information belong to a same BWP.

In one embodiment, the first frequency-domain resource and a frequency-domain resource occupied by the first information belong to different BWPs.

In one embodiment, the first frequency-domain resource and a frequency-domain resource occupied by the first control information belong to a same carrier.

In one embodiment, the first frequency-domain resource and a frequency-domain resource occupied by the first control information belong to different carriers.

In one embodiment, the first frequency-domain resource and a frequency-domain resource occupied by the first control information belong to a same BWP.

In one embodiment, the first frequency-domain resource and a frequency-domain resource occupied by the first control information belong to different BWPs.

In one embodiment, the multicarrier symbol is an Orthogonal Frequency-Division Multiplexing (OFDM) symbol.

In one embodiment, the multicarrier symbol is a Single-Carrier Frequency-Division Multiple Access (SC-FDMA) symbol.

In one embodiment, the multicarrier symbol is a Filter Bank Multi Carrier (FBMC) symbol.

In one embodiment, the multicarrier symbol comprises a Cyclic Prefix (CP).

In one embodiment, the first operating is receiving, each multicarrier symbol between time-domain resources occupied by the first information and time-domain resources occupied by the first radio signal is occupied.

In one embodiment, the first operating is receiving, all multicarrier symbols for downlink transmission between time-domain resources occupied by the first information and time-domain resources occupied by the first radio signal are occupied.

In one embodiment, the first operating is receiving, each multicarrier symbol between time-domain resources occupied by the first information and time-domain resources occupied by the first radio signal is occupied by a transmitter of the first information and the first radio signal.

In one embodiment, the first operating is receiving, all multicarrier symbols for downlink transmission between time-domain resources occupied by the first information and time-domain resources occupied by the first radio signal are occupied by a transmitter of the first information and the first radio signal.

In one embodiment, the first operating is receiving, the first information is the only one of the Q piece(s) of indication information that meets the following condition: each multicarrier symbol between time-domain resources occupied by the first information and time-domain resources occupied by the first radio signal is occupied.

In one embodiment, the first operating is receiving, the first information is the only one of the Q piece(s) of indication information that meets the following condition: each multicarrier symbol between time-domain resources occupied by the first information and time-domain resources occupied by the first radio signal is occupied by a transmitter of the first information and the first radio signal.

In one embodiment, the first operating is receiving, at least two of the Q pieces of indication information meet the following condition: each multicarrier symbol between time-domain resources occupied by the indication information and time-domain resources occupied by the first radio signal is occupied.

In one embodiment, the first operating is receiving, at least two of the Q pieces of indication information meet the following condition: each multicarrier symbol between time-domain resources occupied by the indication information and time-domain resources occupied by the first radio signal is occupied by a transmitter of the Q pieces of indication information and the first radio signal.

In one embodiment, the first operating is receiving, at least one of the Q piece(s) of indication information doesn't meet the following condition: each multicarrier symbol between time-domain resources occupied by the indication information and time-domain resources occupied by the first radio signal is occupied.

In one embodiment, the first operating is receiving, at least one of the Q piece(s) of indication information doesn't meet the following condition: each multicarrier symbol between time-domain resources occupied by the indication information and time-domain resources occupied by the first radio signal is occupied by a transmitter of the Q piece(s) of indication information and the first radio signal.

In one embodiment, the first operating is receiving, each multicarrier symbol between time-domain resources occupied by the first information and time-domain resources occupied by the first radio signal belongs to one of the Q multicarrier symbol group(s).

In one embodiment, the second reference antenna port group is the same as the first reference antenna port group.

In one embodiment, the second reference antenna port group is different from the first reference antenna port group.

In one embodiment, the second antenna port group set is the same as the first antenna port group set.

In one embodiment, the second antenna port group set is different from the first antenna port group set.

In one embodiment, a radio signal transmitted on any antenna port group of the second antenna port group set comprises at least one of an uplink radio signal or a downlink radio signal.

In one embodiment, a radio signal transmitted on any antenna port group of the second antenna port group set comprises at least one of a CSI-RS, an SRS, a downlink DMRS, an uplink DMRS, a synchronization signal, a downlink PTRS, an uplink PTRS or a TRS.

In one embodiment, a radio signal transmitted on the second reference antenna port group comprises at least one of an uplink radio signal or a downlink radio signal.

In one embodiment, a radio signal transmitted on the second reference antenna port group comprises at least one of a CSI-RS, an SRS, a downlink DMRS, an uplink DMRS, a synchronization signal, a downlink PTRS, an uplink PTRS or a TRS.

In one embodiment, the phrase that a measurement on a given antenna port group is used for transmitting a given radio signal means that any antenna port in a transmission antenna port group for the given radio signal is Quasi Co-Located (QCL) with any antenna port in the given antenna port group.

In one embodiment, the phrase that a measurement on a given antenna port group is used for transmitting a given radio signal means that any antenna port in a transmission antenna port group for the given radio signal is Quasi Co-Located (QCL) with at least one antenna port in the given antenna port group.

In one embodiment, the phrase that a measurement on a given antenna port group is used for transmitting a given radio signal means that an antenna port in a transmission antenna port group for the given radio signal is Quasi Co-Located (QCL) with at least one antenna port in the given antenna port group.

In one embodiment, the phrase that a measurement on a given antenna port group is used for transmitting a given radio signal means that any antenna port in a transmission antenna port group for the given radio signal is spatial QCL with any antenna port in the given antenna port group.

In one embodiment, the phrase that a measurement on a given antenna port group is used for transmitting a given radio signal means that any antenna port in a transmission antenna port group for the given radio signal is spatial QCL with at least one antenna port in the given antenna port group.

In one embodiment, the phrase that a measurement on a given antenna port group is used for transmitting a given radio signal means that an antenna port in a transmission antenna port group for the given radio signal is spatial QCL with at least one antenna port in the given antenna port group.

In one embodiment, two antenna ports being QCL means that all or part of large-scale properties of a radio signal transmitted on one of the two antenna ports can be used to infer all or part of large-scale properties of a radio signal transmitted on the other of the two antenna ports.

In one embodiment, two antenna ports being QCL means that the two antenna ports at least share a same QCL parameter, and the QCL parameter comprises both multi-antenna related QCL parameter and multi-antenna unrelated QCL parameter.

In one embodiment, two antenna ports being QCL means that at least one QCL parameter of one of the two antenna ports can be used to infer at least one QCL parameter of the other of the two antenna ports.

In one embodiment, two antenna ports being QCL means that multi-antenna related reception of a radio signal transmitted on one of the two antenna ports can be used to infer multi-antenna related reception of a radio signal transmitted on the other of the two antenna ports.

In one embodiment, two antenna ports being QCL means that multi-antenna related transmission of a radio signal transmitted on one of the two antenna ports can be used to infer multi-antenna related transmission of a radio signal transmitted on the other of the two antenna ports.

In one embodiment, two antenna ports being QCL means that multi-antenna related reception of a radio signal transmitted on one of the two antenna ports can be used to infer multi-antenna related transmission of a radio signal transmitted on the other of the two antenna ports; a receiver of the radio signal transmitted on the one of the two antenna ports is the same as a transmitter of the radio signal transmitted on the other of the two antenna ports.

In one embodiment, two antenna ports being non-QCL means that all or part of large-scale properties of a radio signal transmitted on one of the two antenna ports cannot be used to infer all or part of large-scale properties of a radio signal transmitted on the other of the two antenna ports.

In one embodiment, two antenna ports being non-QCL means that the two antenna ports are different from each other in at least one QCL parameter, and the at least one QCL parameter comprises both multi-antenna related QCL parameter and multi-antenna unrelated QCL parameter.

In one embodiment, two antenna ports being non-QCL means that at least one QCL parameter of one of the two antenna ports cannot be used to infer at least one QCL parameter of the other of the two antenna ports.

In one embodiment, two antenna ports being non-QCL means that multi-antenna related reception of a radio signal transmitted on one of the two antenna ports cannot be used to infer multi-antenna related reception of a radio signal transmitted on the other of the two antenna ports.

In one embodiment, two antenna ports being non-QCL means that multi-antenna related transmission of a radio signal transmitted on one of the two antenna ports can be used to infer multi-antenna related transmission of a radio signal transmitted on the other of the two antenna ports.

In one embodiment, two antenna ports being non-QCL means that multi-antenna related reception of a radio signal transmitted on one of the two antenna ports cannot be used to infer multi-antenna related transmission of a radio signal transmitted on the other of the two antenna ports; a receiver of the radio signal transmitted on the one of the two antenna ports is the same as a transmitter of the radio signal transmitted on the other of the two antenna ports.

In one embodiment, multi-antenna related QCL parameters include one or more of angle of arrival, angle of departure, spatial correlation, multi-antenna related transmission and multi-antenna related reception.

In one embodiment, multi-antenna unrelated QCL parameters include one or more of delay spread, Doppler spread, Doppler shift, path loss and average gain.

In one embodiment, any two antenna ports in an antenna port group are QCL.

In one embodiment, at least two antenna ports in an antenna port group are QCL.

In one embodiment, at least two antenna ports in an antenna port group are non-QCL.

In one embodiment, two antenna ports being spatial QCL means that all or part of multi-antenna related large-scale properties of a radio signal transmitted on one of the two antenna ports can be used to infer all or part of multi-antenna related large-scale properties of a radio signal transmitted on the other of the two antenna ports.

In one embodiment, two antenna ports being spatial QCL means that the two antenna ports share at least one same multi-antenna related QCL parameter (spatial QCL parameter).

In one embodiment, two antenna ports being spatial QCL means that at least one multi-antenna related QCL parameter of one of the two antenna ports can be used to infer at least one multi-antenna related QCL parameter of the other of the two antenna ports.

In one embodiment, two antenna ports being spatial QCL means that multi-antenna related reception of a radio signal transmitted on one of the two antenna ports can be used to infer multi-antenna related reception of a radio signal transmitted on the other of the two antenna ports.

In one embodiment, two antenna ports being spatial QCL means that multi-antenna related transmission of a radio signal transmitted on one of the two antenna ports can be used to infer multi-antenna related transmission of a radio signal transmitted on the other of the two antenna ports.

In one embodiment, two antenna ports being spatial QCL means that multi-antenna related reception of a radio signal transmitted on one of the two antenna ports can be used to infer multi-antenna related transmission of a radio signal transmitted on the other of the two antenna ports; a receiver of the radio signal transmitted on the one of the two antenna ports is the same as a transmitter of the radio signal transmitted on the other of the two antenna ports.

In one embodiment, two antenna ports not being spatial QCL means that all or part of multi-antenna related large-scale properties of a radio signal transmitted on one of the two antenna ports cannot be used to infer all or part of multi-antenna related large-scale properties of a radio signal transmitted on the other of the two antenna ports.

In one embodiment, two antenna ports not being spatial QCL means that the two antenna ports are different from each other in at least one multi-antenna related QCL parameter (spatial QCL parameter).

In one embodiment, two antenna ports not being spatial QCL means that at least one multi-antenna related QCL parameter of one of the two antenna ports cannot be used to infer at least one multi-antenna related QCL parameter of the other of the two antenna ports.

In one embodiment, two antenna ports not being spatial QCL means that multi-antenna related reception of a radio signal transmitted on one of the two antenna ports cannot be used to infer multi-antenna related reception of a radio signal transmitted on the other of the two antenna ports.

In one embodiment, two antenna ports not being spatial QCL means that multi-antenna related transmission of a radio signal transmitted on one of the two antenna ports cannot be used to infer multi-antenna related transmission of a radio signal transmitted on the other of the two antenna ports.

In one embodiment, two antenna ports not being spatial QCL means that multi-antenna related reception of a radio signal transmitted on one of the two antenna ports cannot be used to infer multi-antenna related transmission of a radio signal transmitted on the other of the two antenna ports; a receiver of the radio signal transmitted on the one of the two antenna ports is the same as a transmitter of the radio signal transmitted on the other of the two antenna ports.

In one embodiment, multi-antenna related large-scale properties of a given radio signal comprise one or more of angle of arrival, angle of departure, spatial correlation, multi-antenna related transmission and multi-antenna related reception.

In one embodiment, any two antenna ports in an antenna port group are spatial QCL.

In one embodiment, at least two antenna ports in an antenna port group are spatial QCL.

In one embodiment, at least two antenna ports in an antenna port group are not spatial QCL.

In one embodiment, the M groups of second configuration information are semi-statically configured.

In one embodiment, the M groups of second configuration information are carried by a higher-layer signaling.

In one embodiment, the M groups of second configuration information are carried by a Radio Resource Control (RRC) signaling.

In one embodiment, the M groups of second configuration information are all or part of an Information Element (IE) in an RRC signaling.

In one embodiment, the M groups of second configuration information are carried by a Medium Access Control (MAC) Control Element (CE) signaling.

In one embodiment, the M groups of second configuration information are transmitted in a System Information Block (SIB).

In one embodiment, each group of the M groups of second configuration information explicitly indicates a corresponding antenna port group set.

In one embodiment, each group of the M groups of second configuration information implicitly indicates a corresponding antenna port group set.

In one embodiment, the second target configuration information explicitly indicates the second antenna port group set.

In one embodiment, the second target configuration information implicitly indicates the second antenna port group set.

In one subembodiment of the above embodiment, the second target configuration information indicated a set of indexes of radio signals transmitted on the second antenna port group set.

In one embodiment, the M is equal to the N.

In one embodiment, the M is unequal to the N.

In one embodiment, the second information is semi-statically configured.

In one embodiment, the second information is carried by a higher-layer signaling.

In one embodiment, the second information is carried by an RRC signaling.

In one embodiment, the second information is all or part of an IE in an RRC signaling.

In one embodiment, the second information is carried by a MAC CE.

In one embodiment, the second information is transmitted in a SIB.

In one embodiment, the second information comprises configuration information of the first resource element set and period configuration parameters, where the configuration information of the first resource element set comprises at least one of a number of resource element subsets comprised therein or configuration parameters of each resource element subset; the configuration parameters of the each resource element subset comprise at least one of time-domain resources occupied, frequency-domain resources occupied, mapping of CCE to REG, REG bundle size or antenna port identifier; and each of the period configuration parameters comprises either periodicity and time offset or a time-domain position of occurrence, in which the time-domain position of occurrence indicates time-domain resources occupied by each period.

In one subembodiment of the above embodiment, the antenna port identifier indicates an antenna port group in the first antenna port group set.

In one subembodiment of the above embodiment, the antenna port identifier indicates an index of a radio signal transmitted on an antenna port group in the first antenna port group set.

In one embodiment, the UE assumes that each piece of indication information in any of the Q indication information group(s) indicates a same group of configuration information out of the N groups of first configuration information.

In one embodiment, the UE assumes that each piece of indication information in any of the Q indication information group(s) indicates a same group of configuration information out of the M groups of second configuration information.

In one embodiment, each piece of indication information in any of the Q indication information group(s) indicates a same group of configuration information out of the N groups of first configuration information.

In one embodiment, each piece of indication information in any of the Q indication information group(s) indicates a same group of configuration information out of the M groups of second configuration information.

Embodiment 6

Figure 6:
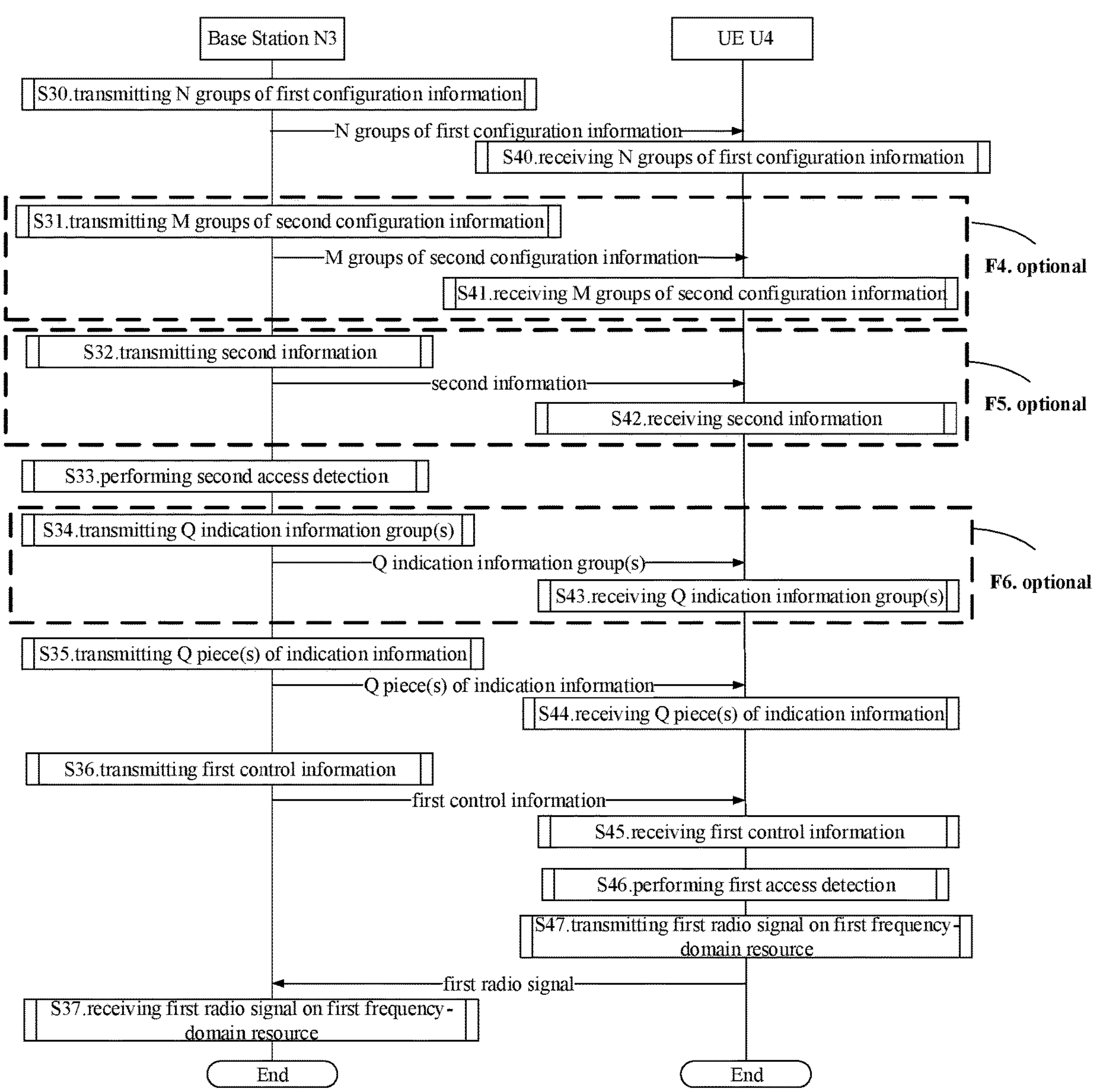
FIG. 6 illustrates a flowchart of wireless transmission according to another embodiment of the present disclosure.
Figure 7A:
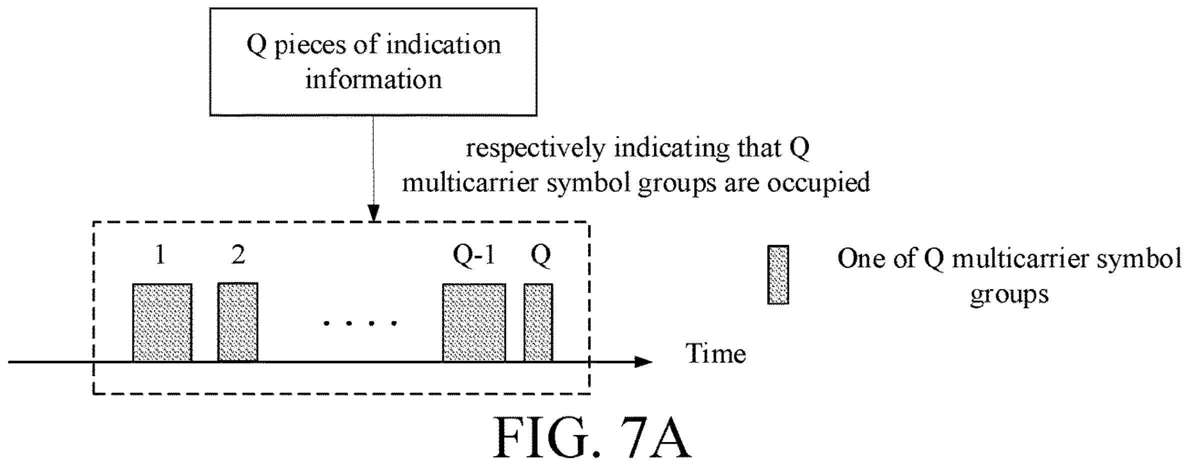
FIG. 7A-7C respectively illustrate a schematic diagram of relation(s) between Q piece(s) of indication information and Q multicarrier symbol group(s) according to one embodiment of the present disclosure.
Figure 7B:
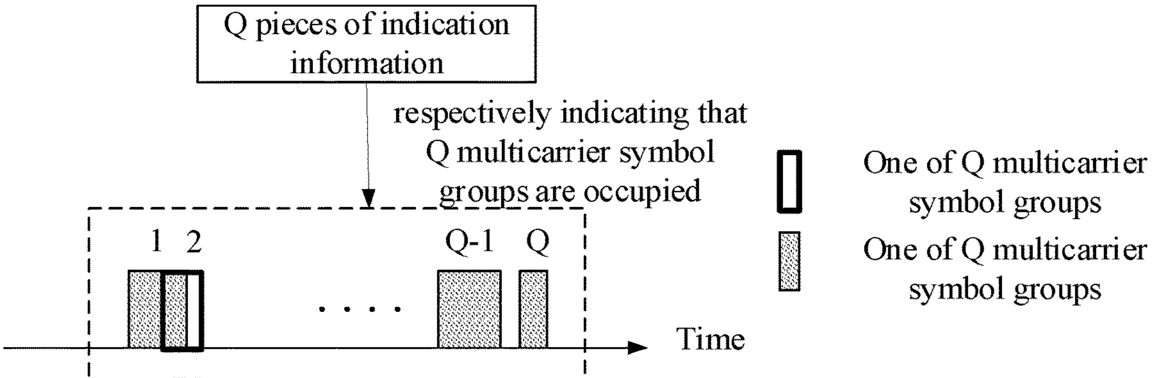
Figure 7C:
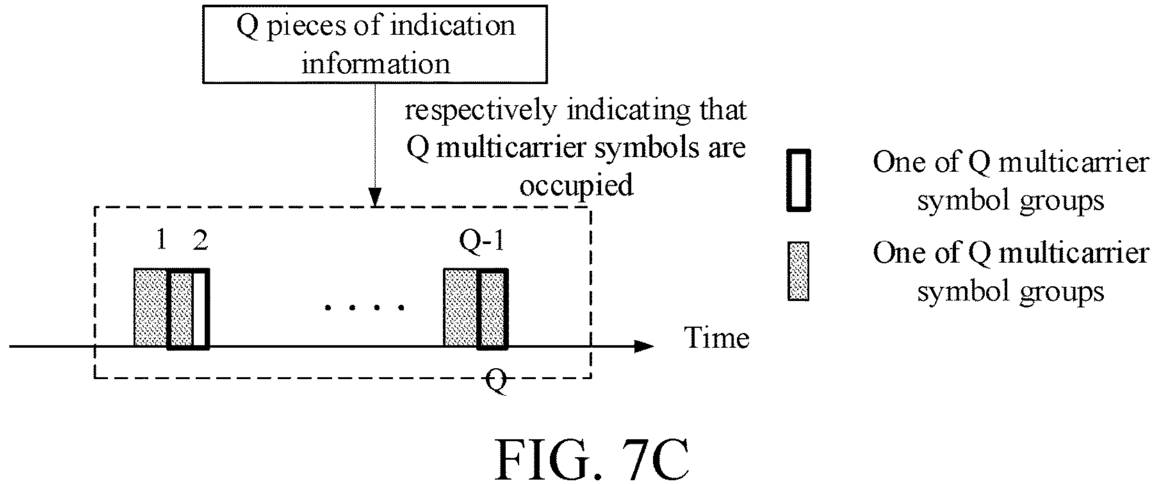
Figure 8A:
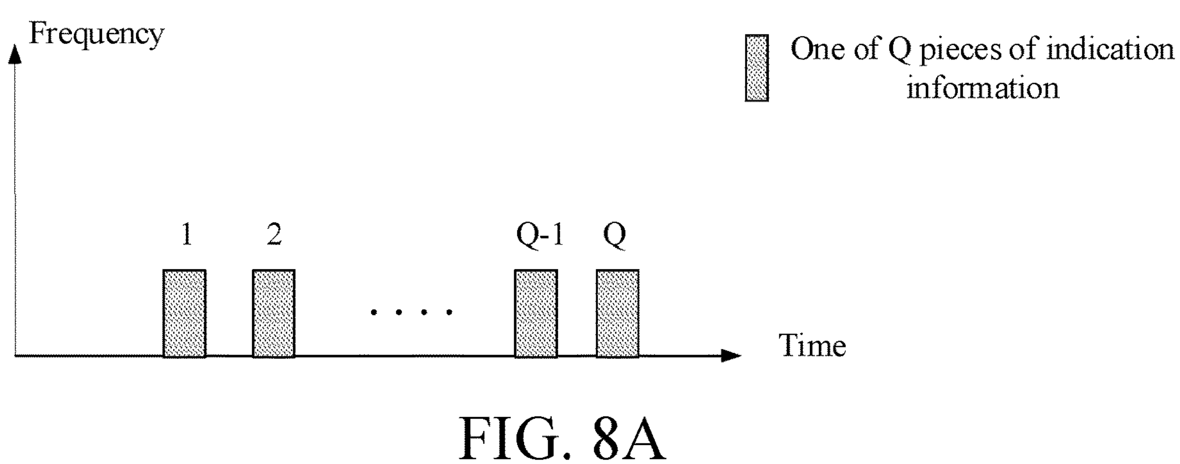
FIG. 8A-8C respectively illustrate a schematic diagram of relations between Q pieces of indication information according to one embodiment of the present disclosure.
Figure 8B:
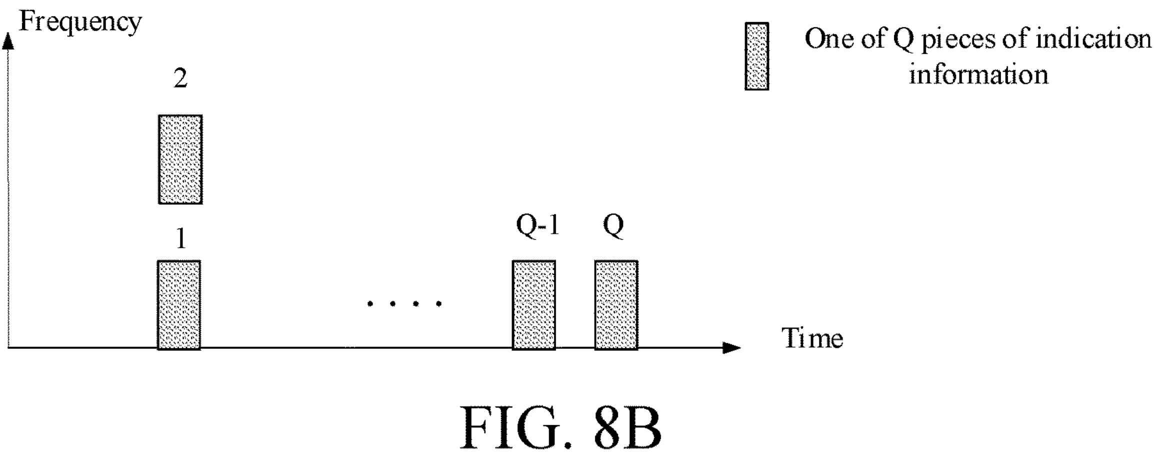
Figure 8C:
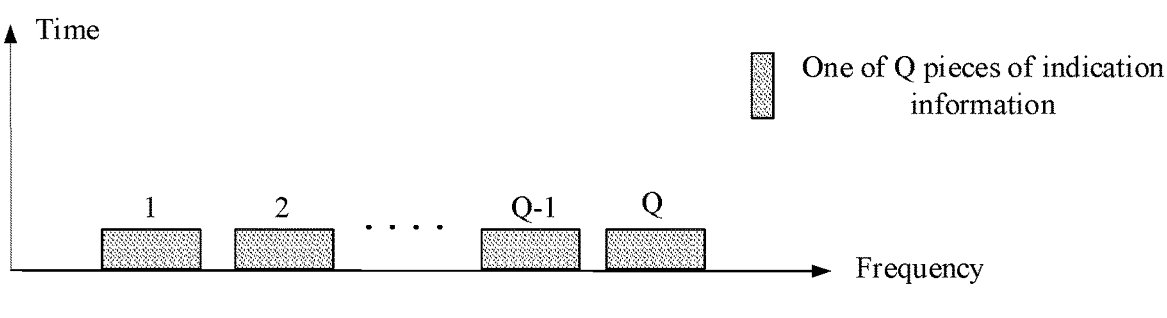
Figures 9A, 9B, 9C:
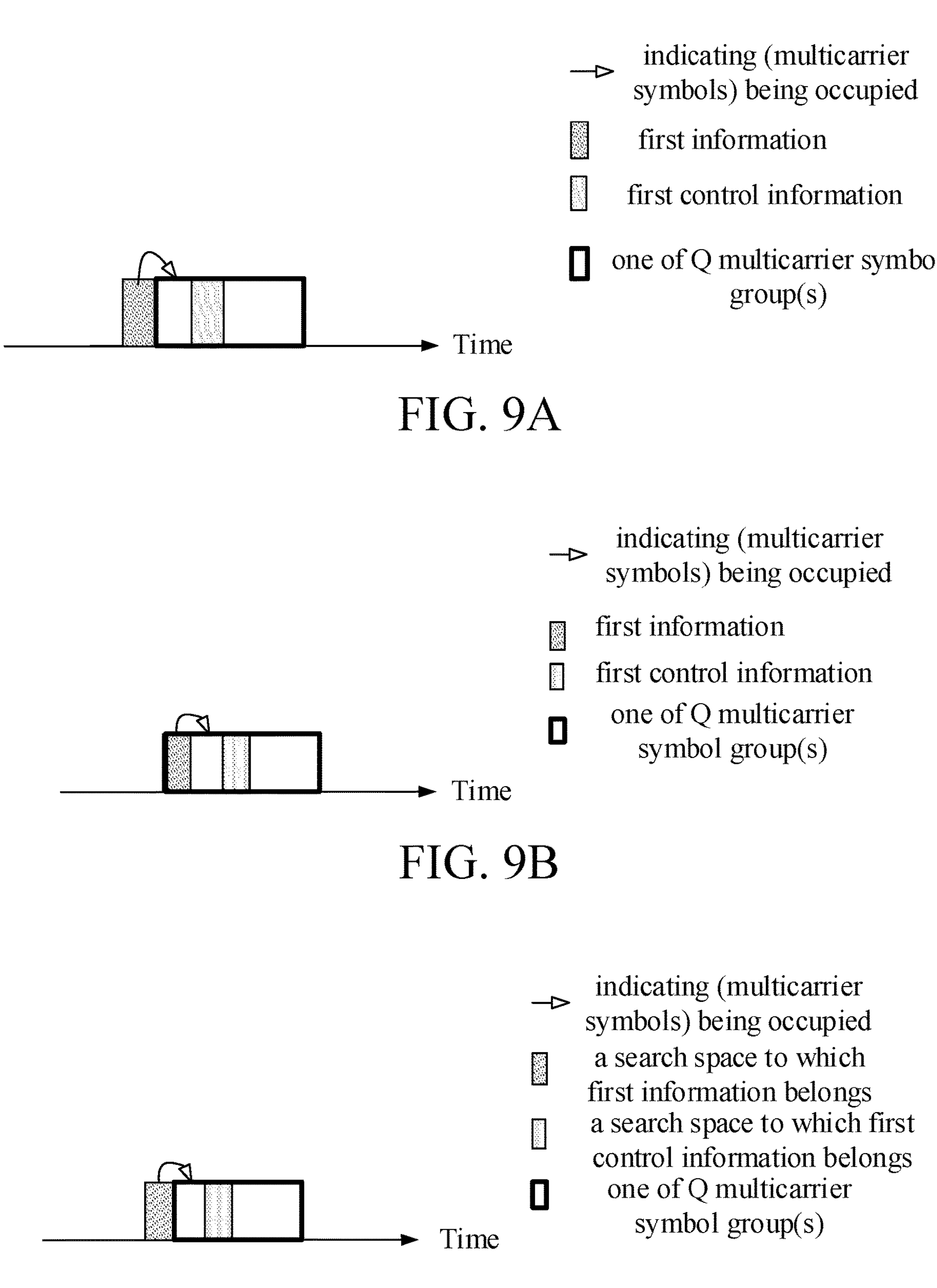
FIG. 9A-9D respectively illustrate a schematic diagram of a relationship between time-domain resources occupied by first information and time-domain resources occupied by first control information according to one embodiment of the present disclosure.
Figure 9D:
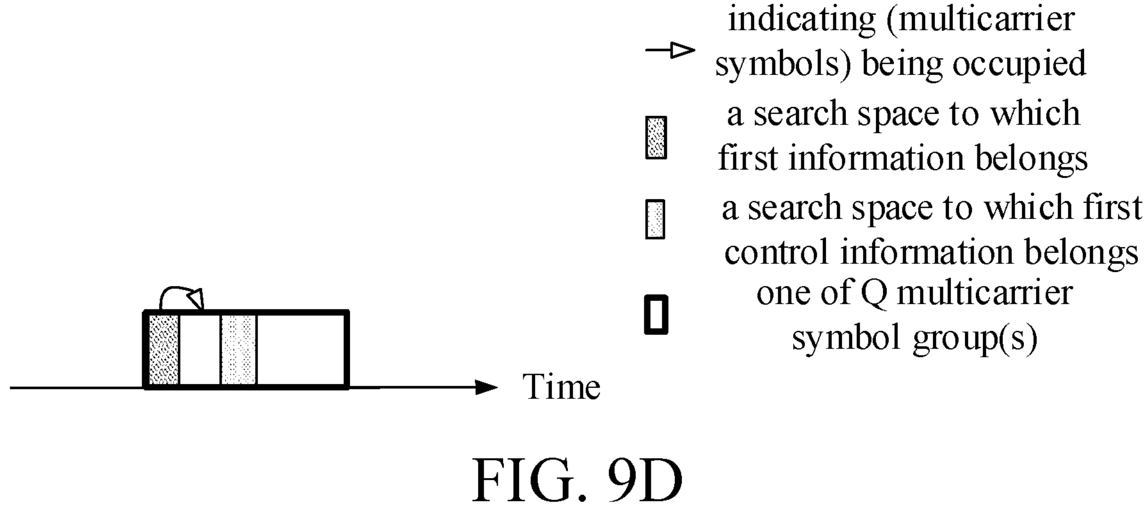

Embodiment 6 illustrates another flowchart of wireless transmission, as shown in FIG. 6. In FIG. 6, a base station N3 is a maintenance base station for a serving cell of a UE U4. Boxes F4, F5 and F6 of FIG. 6 are optional.

The N3 transmits N groups of first configuration information in step S30; transmits M groups of second configuration information in step S31; transmits second information in step S32; performs a second access detection in step S33; transmits Q indication information group(s) in step S34; transmits Q piece(s) of indication information in step S35; transmits first control information in step S36; and receives a first radio signal on a first frequency-domain resource in step S37.

The U4 receives N groups of first configuration information in step S40; receives M groups of second configuration information in step S41; receives second information in step S42; receives Q indication information group(s) in step S43; receives Q piece(s) of indication information in step S44; receives first control information in step S45; performs a first access detection in step S46; and transmits a first radio signal on a first frequency-domain resource in step S47.

In Embodiment 6, the first information is used by the U4 for determining first target configuration information out of the N groups of first configuration information; the first target configuration information is one group of the N groups of first configuration information; the first target configuration information is used by the U4 for determining a first antenna port group set, the first antenna port group set is composed of one or more antenna port groups, of which each antenna port group is composed of one or more antenna ports; a first reference antenna port group is an antenna port group in the first antenna port group set, a measurement on the first reference antenna port group is used by the U4 for receiving the first control information. The first control information comprises scheduling information of the first radio signal, the Q is a positive integer greater than 1; the scheduling information of the first radio signal is used by the U4 for determining a second reference antenna port group out of a second antenna port group set, the second antenna port group set is composed of at least two antenna port groups, each of the antenna port groups is composed of one or more antenna ports; a measurement on the second reference antenna port group is used by the U4 for first operating the first radio signal; the first operating is transmitting. The first information is also used by the U4 for determining second target configuration information out of the M groups of second configuration information; the second target configuration information is one group of the M groups of second configuration information; the second target configuration information is used by the U4 for determining the second antenna port group set. Performing of the first access detection is prior to transmission of the first radio signal; the first access detection comprises: performing T energy detection(s) respectively in T time sub-pool(s) to obtain T detection value(s); wherein each of T1 detection value(s) out of the T detection value(s) is lower than a first threshold, the T is a positive integer, the T1 is a positive integer no greater than the T. The second information is used by the U4 for determining the first resource element set, and each of the N groups of first configuration information corresponds to the first resource element set. The Q piece(s) of indication information respectively belongs(belong) to the Q indication information group(s), each multicarrier symbol between any adjacent two pieces of information out of each of the Q indication information group(s) is occupied.

In one embodiment, the first operating is transmitting, the first radio signal comprises at least one of uplink data or an uplink reference signal.

In one subembodiment, the uplink reference signal comprises one or more of SRS or uplink PTRS.

Embodiment 7

Embodiment 7A-7C respectively illustrate a schematic diagram of relation(s) between Q piece(s) of indication information and Q multicarrier symbol group(s).

In Embodiment 7, the Q piece(s) of indication information in the present disclosure respectively indicates(indicate) that Q multicarrier symbol group(s) is(are) occupied, and any one of the Q multicarrier symbol group(s) comprises a positive integer number of multicarrier symbol(s).

In one embodiment, the phrase that the Q multicarrier symbol group(s) is(are) occupied means that the Q multicarrier symbol group(s) is(are) occupied by a transmitter of the Q piece(s) of indication information.

In one embodiment, a given multicarrier symbol being occupied means that the given multicarrier symbol is used for transmitting a radio signal.

In one embodiment, a given multicarrier symbol not being occupied means that the given multicarrier symbol isn't used for transmitting a radio signal.

In one embodiment, the phrase that a given multicarrier symbol is occupied by a transmitter of given information or a given radio signal means that the given multicarrier symbol is used by the transmitter of the given information or the given radio signal for transmitting a radio signal.

In one embodiment, the phrase that a given multicarrier symbol is not occupied by a transmitter of given information or a given radio signal means that the given multicarrier symbol is not used by the transmitter of the given information or the given radio signal for transmitting a radio signal.

In one embodiment, the Q multicarrier symbol groups respectively comprise different numbers of multicarrier symbols.

In one embodiment, the Q multicarrier symbol groups respectively comprise the same number of multicarrier symbols.

In one embodiment, at least two multicarrier symbol groups among the Q multicarrier symbol groups comprise different numbers of multicarrier symbols respectively.

In one embodiment, at least two multicarrier symbol groups among the Q multicarrier symbol groups comprise the same number of multicarrier symbols respectively.

In one embodiment, all multicarrier symbols comprised in any of the Q multicarrier symbol groups are consecutive.

In one embodiment, any two of the Q multicarrier symbol groups do not comprise overlapped multicarrier symbols.

In one embodiment, there does not exist any multicarrier symbol that belongs to any two of the Q multicarrier symbol groups simultaneously.

In one embodiment, at least two of the Q multicarrier symbol groups comprise overlapped multicarrier symbols.

In one embodiment, at least one multicarrier symbol belongs to at least two of the Q multicarrier symbol groups simultaneously.

In one embodiment, any two consecutive multicarrier symbol groups of the Q multicarrier symbol groups comprise overlapped multicarrier symbols.

In one embodiment, at least one multicarrier symbol belongs to any two consecutive multicarrier symbol groups of the Q multicarrier symbol groups simultaneously.

In one embodiment, there is at least one multicarrier symbol not being occupied between any two pieces of contiguous indication information among the Q pieces of indication information.

In one embodiment, there is at least one multicarrier symbol not being occupied by a transmitter of the Q pieces of indication information between any two pieces of contiguous indication information among the Q pieces of indication information.

In one embodiment, there is at least one multicarrier symbol not being occupied between two pieces of contiguous indication information among the Q pieces of indication information.

In one embodiment, there is at least one multicarrier symbol not being occupied by a transmitter of the Q pieces of indication information between two pieces of contiguous indication information among the Q pieces of indication information.

In one embodiment, there are two pieces of contiguous indication information among the Q pieces of indication information between which all multicarrier symbols are occupied.

In one embodiment, there are two pieces of contiguous indication information among the Q pieces of indication information between which all multicarrier symbols are occupied by a transmitter of the Q pieces of indication information.

In one embodiment, the Embodiment 7A corresponds to a schematic diagram illustrating that any two of the Q multicarrier symbol groups do not comprise overlapped multicarrier symbols.

In one embodiment, the Embodiment 7B corresponds to a schematic diagram illustrating that any two of the Q multicarrier symbol groups do not comprise overlapped multicarrier symbols and at least other two of the Q multicarrier symbol groups comprise overlapped multicarrier symbols.

In one embodiment, the Embodiment 7C corresponds to a schematic diagram illustrating that at least two consecutive multicarrier symbol groups of the Q multicarrier symbol groups comprise overlapped multicarrier symbols.

Embodiment 8

Embodiment 8A-8C respectively illustrate a schematic diagram of relations between Q pieces of indication information.

In Embodiment 8, the Q in the present disclosure is a positive integer greater than 1. Time-domain resources respectively occupied by any two of the Q pieces of indication information are orthogonal, or, time-domain resources respectively occupied by at least two of the Q pieces of indication information are overlapped.

In one embodiment, a search space is a group of Physical Downlink Control Channel (PDCCH) candidates corresponding to Aggregation Level L, wherein the L is a positive integer.

In one embodiment, a search space is a group of New Radio Physical Downlink Control Channel (NR-PDCCH) candidates corresponding to Aggregation Level L, wherein the L is a positive integer.

In one embodiment, the search space belongs to a COntrol REsource SET (CORESET).

In one embodiment, the search space belongs to a BWP.

In one embodiment, the search space belongs to a Carrier.

In one embodiment, the Q pieces of indication information are transmitted on a second frequency-domain resource.

In one subembodiment, the second frequency-domain resource is deployed at Unlicensed Spectrum.

In one subembodiment, the second frequency-domain resource is a Carrier.

In one subembodiment, the second frequency-domain resource is a BWP.

In one subembodiment, the second frequency-domain resource is a CORESET.

In one reference embodiment of the above subembodiment, a CORESET comprises a positive integer number of search space(s).

In one subembodiment, the second frequency-domain resource is a search space.

In one subembodiment, the second frequency-domain resource comprises a positive integer number of Physical Resource Block(s) (PRB) in frequency domain.

In one subembodiment, the second frequency-domain resource comprises a positive integer number of consecutive PRBs in frequency domain.

In one subembodiment, the second frequency-domain resource comprises a positive integer number of Resource Block(s) (RB) in frequency domain.

In one subembodiment, the second frequency-domain resource comprises a positive integer number of consecutive RBs in frequency domain.

In one subembodiment, the second frequency-domain resource comprises a positive integer number of consecutive subcarriers in frequency domain.

In one subembodiment, a number of the consecutive subcarriers comprised by the second frequency-domain resource in frequency domain is a positive integral multiple of 12.

In one embodiment, any two antenna port groups among transmission antenna port groups that respectively transmit radio signals of at least two of the Q pieces of indication information are not QCL.

In one embodiment, any two antenna port groups among transmission antenna port groups that respectively transmit radio signals of the Q pieces of indication information are not QCL.

In one embodiment, given two antenna port not being QCL means that any antenna port in one of the two antenna port groups is non-QCL with any antenna port in the other of the two antenna port groups.

In one embodiment, given two antenna port not being QCL means that any antenna port in one of the two antenna port groups is non-QCL with at least one antenna port in the other of the two antenna port groups.

In one embodiment, given two antenna port not being QCL means that an antenna port in one of the two antenna port groups is non-QCL with at least one antenna port in the other of the two antenna port groups.

In one embodiment, given two antenna port not being QCL means that an antenna port in one of the two antenna port groups is non-QCL with any antenna port in the other of the two antenna port groups.

In one embodiment, transmission antenna port groups that respectively transmit radio signals of at least two of the Q pieces of indication information are QCL.

In one embodiment, transmission antenna port groups that respectively transmit radio signals of the Q pieces of indication information are QCL.

In one embodiment, given two antenna port groups being QCL means that any antenna port in one of the two antenna port groups is QCL with any antenna port in the other of the two antenna port groups.

In one embodiment, given two antenna port groups being QCL means that any antenna port in one of the two antenna port groups is QCL with at least one antenna port in the other of the two antenna port groups.

In one embodiment, given two antenna port groups being QCL means that an antenna port in one of the two antenna port groups is QCL with at least one antenna port in the other of the two antenna port groups.

In one embodiment, given two antenna port groups being QCL means that an antenna port in one of the two antenna port groups is QCL with any antenna port in the other of the two antenna port groups.

In one embodiment, at least two of the Q pieces of indication information are transmitted on a same BWP.

In one embodiment, at least two of the Q pieces of indication information belong to a same CORESET.

In one subembodiment, a CORESET comprises a positive integer number of search space(s).

In one embodiment, at least two of the Q pieces of indication information belong to different CORESETs.

In one subembodiment, a CORESET comprises a positive integer number of search space(s).

In one embodiment, at least two of the Q pieces of indication information belong to a same search space.

In one embodiment, at least two of the Q pieces of indication information belong to different search spaces.

In one embodiment, the Q piece(s) of indication information respectively belongs(belong) to Q CORESET(s).

In one embodiment, the Q piece(s) of indication information respectively belongs(belong) to Q search space(s).

In one embodiment, the Q piece(s) of indication information is(are) PDCCH candidate(s) respectively comprised in the Q search space(s).

In one embodiment, the Q piece(s) of indication information is(are) NR-PDCCH candidate(s) respectively comprised in the Q search space(s).

In one embodiment, at least two of the Q pieces of indication information are respectively at least two PDCCH candidates comprised in a same search space.

In one embodiment, at least two of the Q pieces of indication information are respectively at least two NR-PDCCH candidates comprised in a same search space.

In one embodiment, the Embodiment 8A corresponds to a schematic diagram illustrating that time-domain resources occupied by any two of the Q pieces of indication information are orthogonal.

In one embodiment, the Embodiment 8B corresponds to a schematic diagram illustrating that time-domain resources occupied by at least two of the Q pieces of indication information are overlapped.

In one embodiment, the Embodiment 8C corresponds to a schematic diagram illustrating that time-domain resources occupied by any two of the Q pieces of indication information are overlapped.

Embodiment 9

Embodiment 9A-9D respectively illustrate a schematic diagram of a relationship between time-domain resources occupied by first information and time-domain resources occupied by first control information.

In Embodiment 9, each multicarrier symbol between time-domain resources occupied by the first information of the present disclosure and time-domain resources occupied by the first control information is occupied.

In one embodiment, the first information is the only one of the Q piece(s) of indication information that meets the following condition: each multicarrier symbol between time-domain resources occupied by the first information and time-domain resources occupied by the first control information is occupied.

In one embodiment, at least one of the Q piece(s) of indication information does not meet the following condition: each multicarrier symbol between time-domain resources occupied by the at least one of the Q piece(s) of indication information and time-domain resources occupied by the first control information is occupied.

In one embodiment, at least two of the Q pieces of indication information meet the following condition: each multicarrier symbol between time-domain resources occupied by the at least two of the Q pieces of indication information and time-domain resources occupied by the first control information is occupied.

In one embodiment, each multicarrier symbol between time-domain resources occupied by the first information and time-domain resources occupied by the first control information belongs to a multicarrier symbol group of the Q multicarrier symbol group(s).

In one embodiment, each multicarrier symbol between time-domain resources occupied by a search space to which the first information belongs and time-domain resources occupied by a search space to which the first control information belongs is a part of a multicarrier symbol group of the Q multicarrier symbol group(s).

In one embodiment, time-domain resources occupied by the first information belong to one of the Q multicarrier symbol group(s) indicated by the first information.

In one embodiment, time-domain resources occupied by a search space to which the first information belongs are a part of a multicarrier symbol group of the Q multicarrier symbol group(s).

In one embodiment, time-domain resources occupied by the first information do not belong to one of the Q multicarrier symbol group(s) indicated by the first information.

In one embodiment, time-domain resources occupied by a search space to which the first information belongs are not a part of a multicarrier symbol group of the Q multicarrier symbol group(s).

In one embodiment, the first information is a PDCCH candidate in a search space.

In one embodiment, the first information is an NR-PDCCH candidate in a search space.

In one embodiment, the Embodiment 9A corresponds to a schematic diagram illustrating that each multicarrier symbol between time-domain resources occupied by the first information and time-domain resources occupied by the first control information belongs to a multicarrier symbol group of the Q multicarrier symbol group(s) and that time-domain resources occupied by the first information do not belong to one of the Q multicarrier symbol group(s) indicated by the first information.

In one embodiment, the Embodiment 9B corresponds to a schematic diagram illustrating that each multicarrier symbol between time-domain resources occupied by the first information and time-domain resources occupied by the first control information belongs to a multicarrier symbol group of the Q multicarrier symbol group(s) and that time-domain resources occupied by the first information belong to one of the Q multicarrier symbol group(s) indicated by the first information.

In one embodiment, the Embodiment 9C corresponds to a schematic diagram illustrating that each multicarrier symbol between time-domain resources occupied by a search space to which the first information belongs and time-domain resources occupied by a search space to which the first control information belongs is a part of one of the Q multicarrier symbol group(s), and that time-domain resources occupied by the search space to which the first information belongs are not a part of one of the Q multicarrier symbol group(s) indicated by the first information.

In one embodiment, the Embodiment 9D corresponds to a schematic diagram illustrating that each multicarrier symbol between time-domain resources occupied by a search space to which the first information belongs and time-domain resources occupied by a search space to which the first control information belongs is a part of one of the Q multicarrier symbol group(s), and that time-domain resources occupied by the search space to which the first information belongs are a part of one of the Q multicarrier symbol group(s) indicated by the first information.

Embodiment 10

Figure 10:
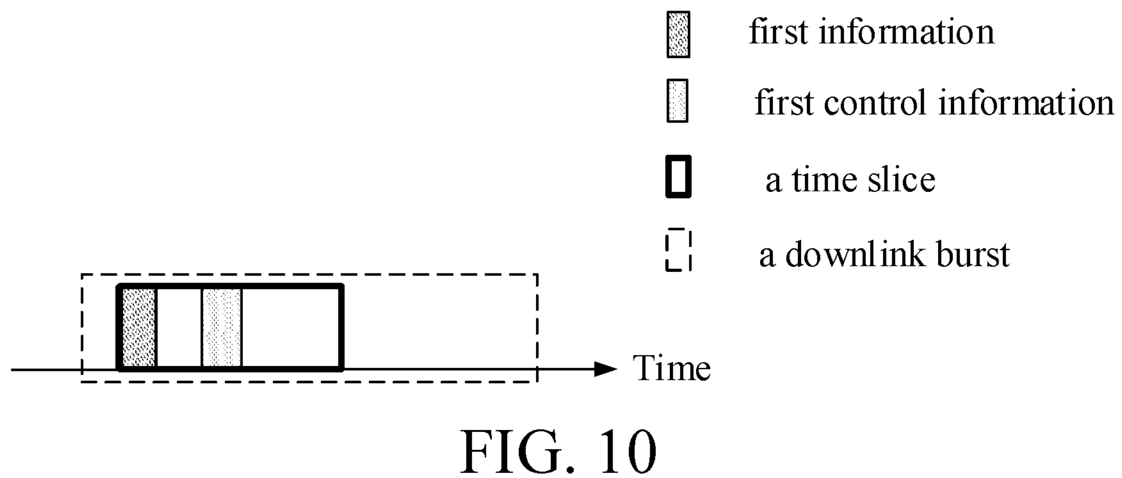
FIG. 10 illustrates a schematic diagram of a relationship between time-domain resources occupied by first information and time-domain resources occupied by first control information according to another embodiment of the present disclosure.

Embodiment 10 illustrates a schematic diagram of a relationship between time-domain resources occupied by first information and time-domain resources occupied by first control information, as shown in FIG. 10.

In Embodiment 10, the first control information and the first information of the present disclosure belong to a same time slice in time domain, the time slice comprises a positive integer number of contiguous multicarrier symbol(s).

In one embodiment, the same time slice comprises up to 28 contiguous multicarrier symbols.

In one embodiment, the same time slice comprises up to 14 contiguous multicarrier symbols.

In one embodiment, the same time slice comprises 28 contiguous multicarrier symbols.

In one embodiment, the same time slice comprises 14 contiguous multicarrier symbols.

In one embodiment, the same time slice belongs to two subframes.

In one embodiment, the same time slice belongs to two slots.

In one embodiment, the same time slice belongs to one subframe.

In one embodiment, the same time slice belongs to one slot.

In one embodiment, the same time slice belongs to a downlink burst.

In one subembodiment, the downlink burst is composed of a group of contiguous multicarrier symbols.

In one embodiment, the same time slice belongs to one of the Q multicarrier symbol group(s).

In one embodiment, the same time slice comprises one of the Q multicarrier symbol group(s).

In one embodiment, the same time slice and one of the Q multicarrier symbol group(s) respectively belong to adjacent subframes.

In one embodiment, the same time slice and one of the Q multicarrier symbol group(s) respectively belong to adjacent slots.

In one embodiment, frequency-domain resources occupied by the first control information and frequency-domain resources occupied by the first information belong to a same carrier.

In one embodiment, frequency-domain resources occupied by the first control information and frequency-domain resources occupied by the first information belong to different carriers.

In one embodiment, frequency-domain resources occupied by the first control information and frequency-domain resources occupied by the first information belong to a same BWP.

In one embodiment, frequency-domain resources occupied by the first control information and frequency-domain resources occupied by the first information belong to different BWPs.

In one embodiment, frequency-domain resources occupied by the first control information and frequency-domain resources occupied by the first information belong to a same CORESET.

In one subembodiment, a CORESET comprises a positive integer number of search space(s).

In one embodiment, frequency-domain resources occupied by the first control information and frequency-domain resources occupied by the first information belong to different CORESETs.

In one subembodiment, a CORESET comprises a positive integer number of search space(s).

In one embodiment, the first control information is a PDCCH candidate in a search space.

In one embodiment, the first control information is an NR-PDCCH candidate in a search space.

In one embodiment, the first control information and the first information belong to a same search space.

In one embodiment, the first control information and the first information belong to different search spaces.

Embodiment 11

Figure 11A:
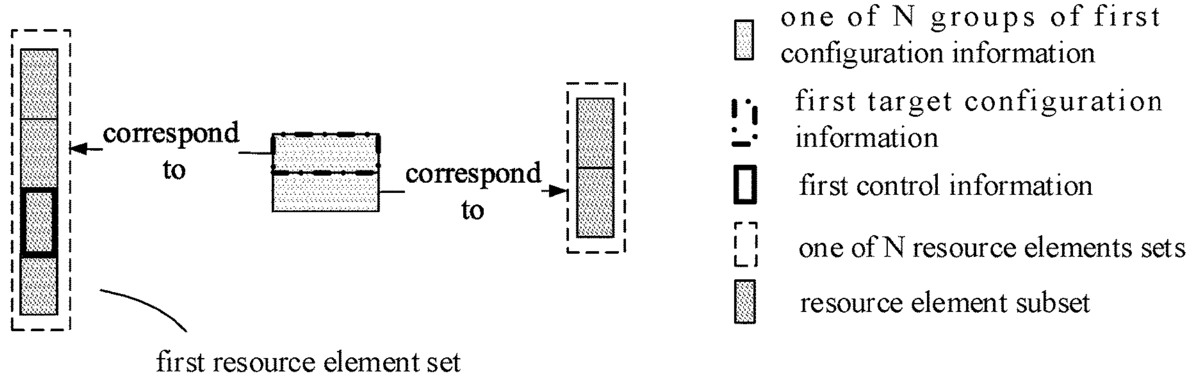
FIG. 11A-11B respectively illustrate a schematic diagram of relations among first control information, a first resource element set and first target configuration information according to one embodiment of the present disclosure.
Figure 11B:
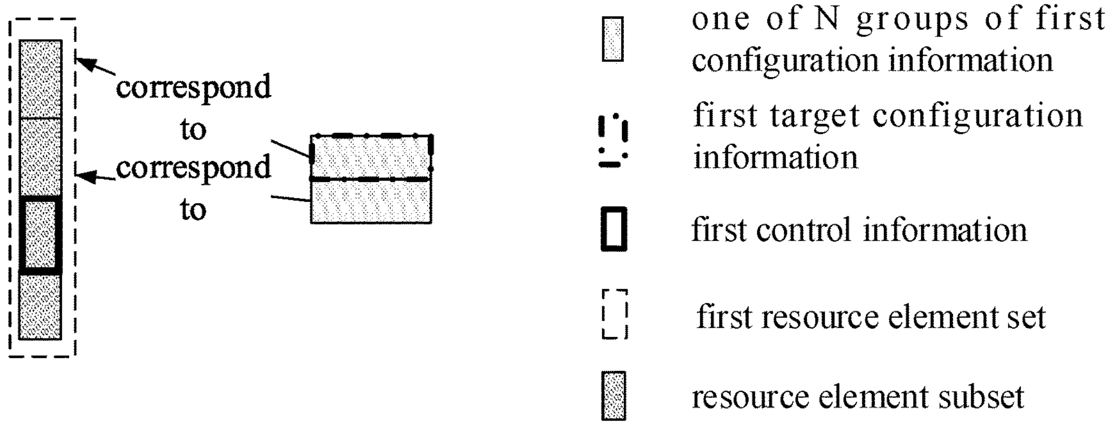
Figures 12A, 12B, 12C:
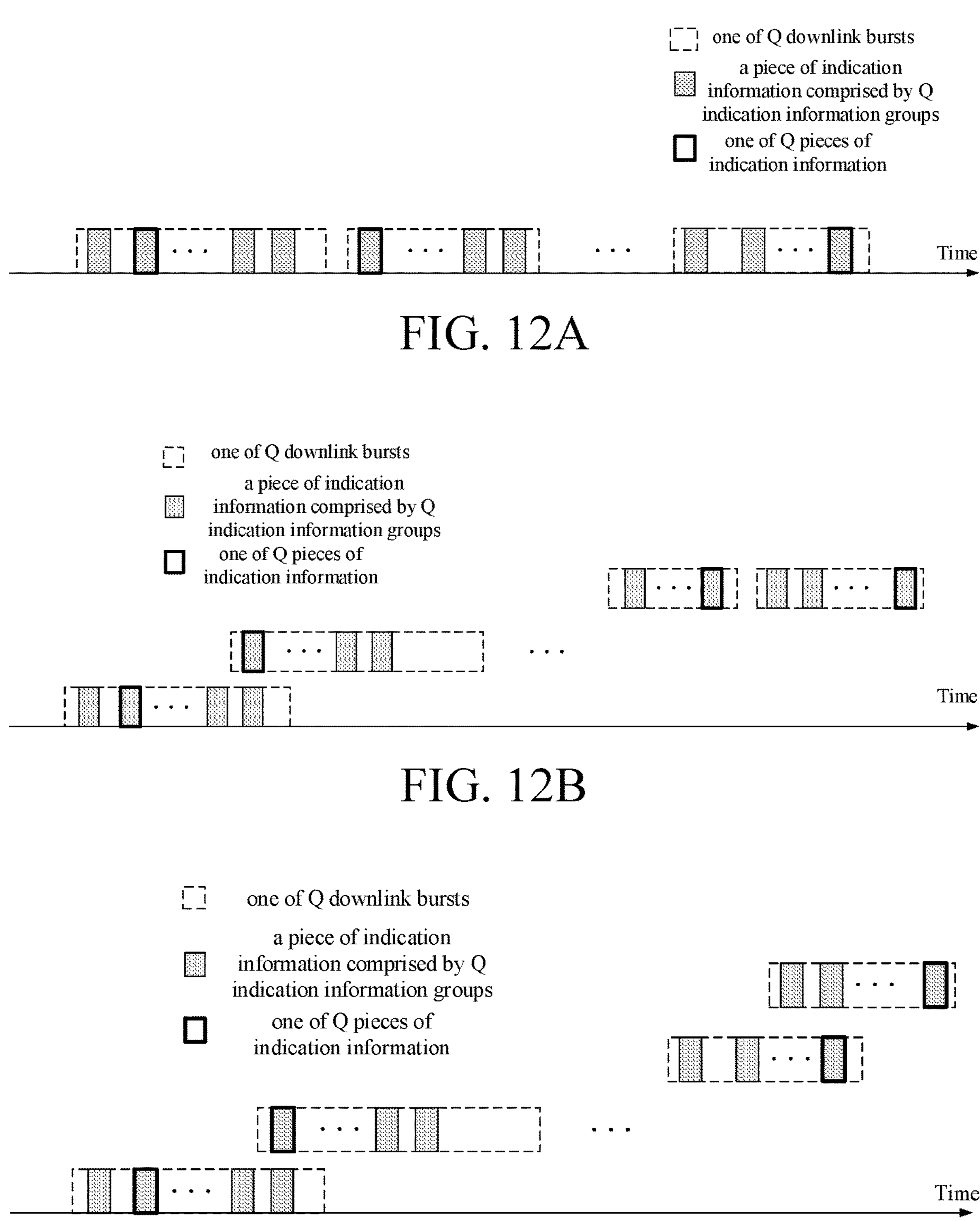
FIG. 12A-12C respectively illustrate a schematic diagram of relations among Q indication information groups, Q pieces of indication information and Q downlink bursts according to one embodiment of the present disclosure.
Figure 13A:
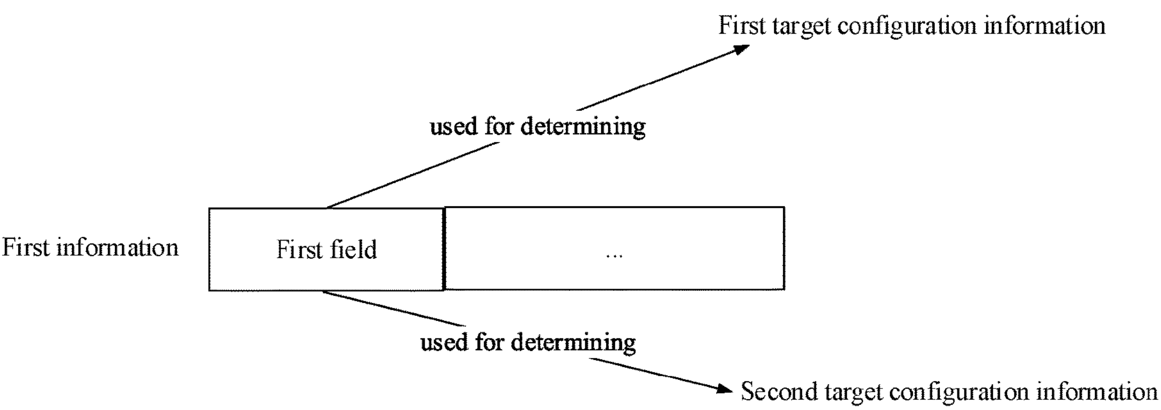
FIG. 13A-13D respectively illustrate a schematic diagram of first information according to one embodiment of the present disclosure.
Figure 13B:
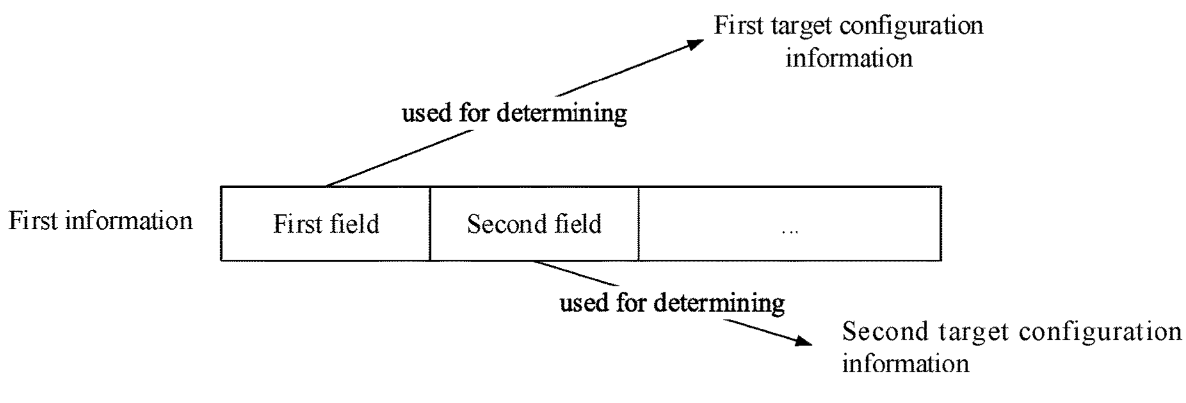
Figure 13C:
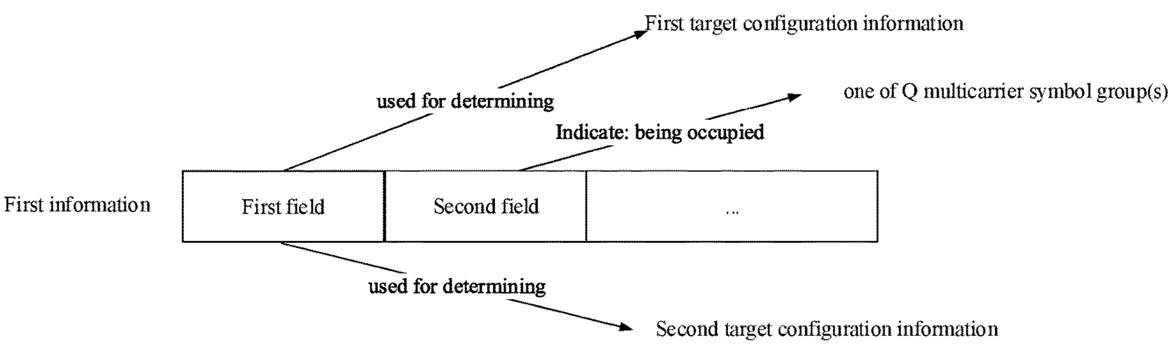
Figure 13D:
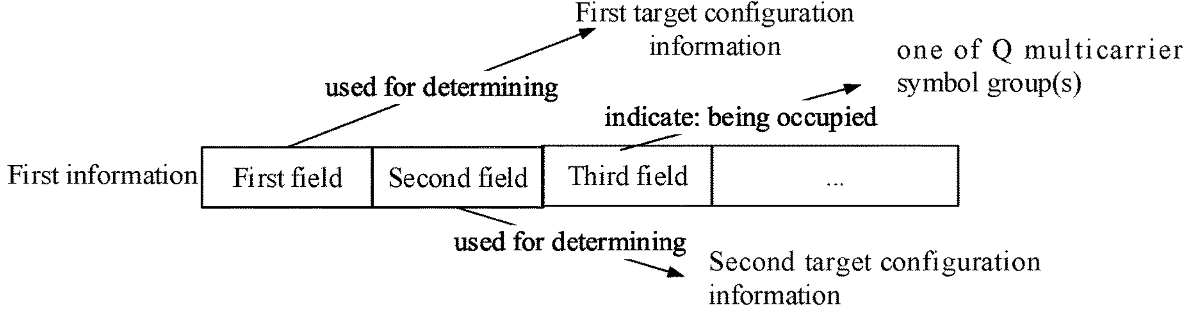
Figure 14A:
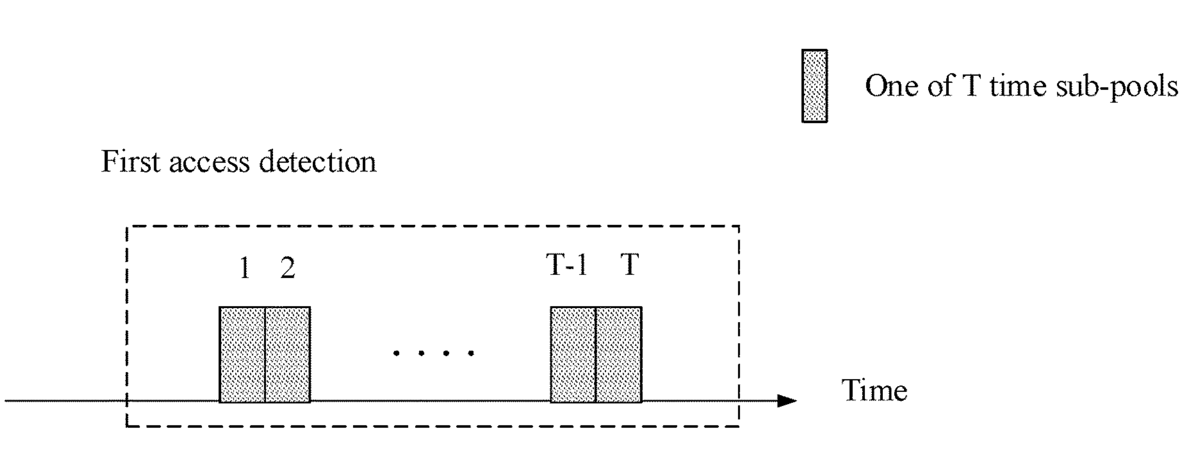
FIG. 14A-14C respectively illustrate a schematic diagram of a first access detection according to one embodiment of the present disclosure.
Figure 14B:
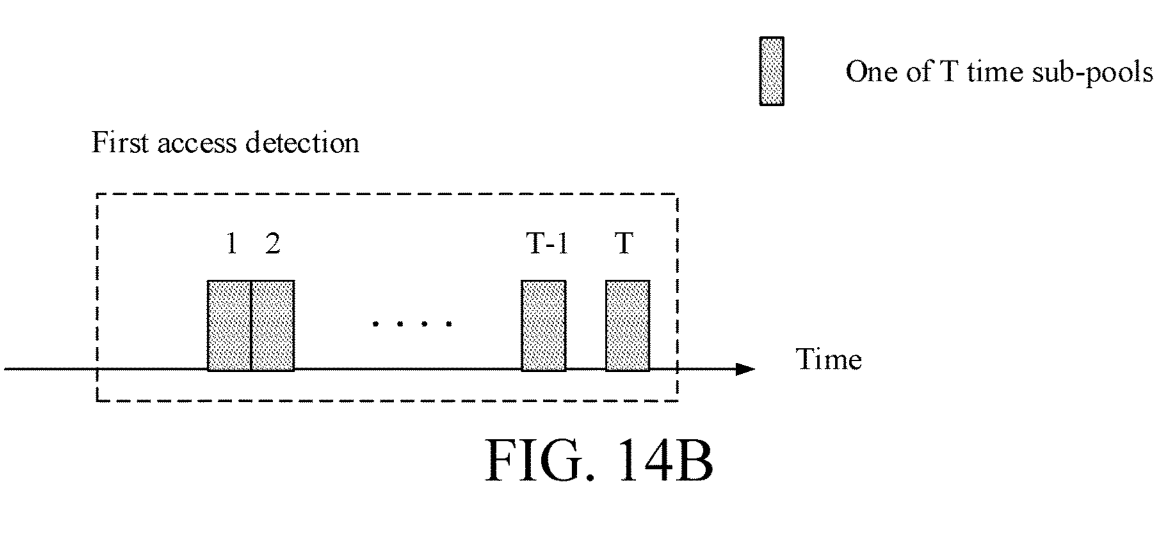
Figure 14C:
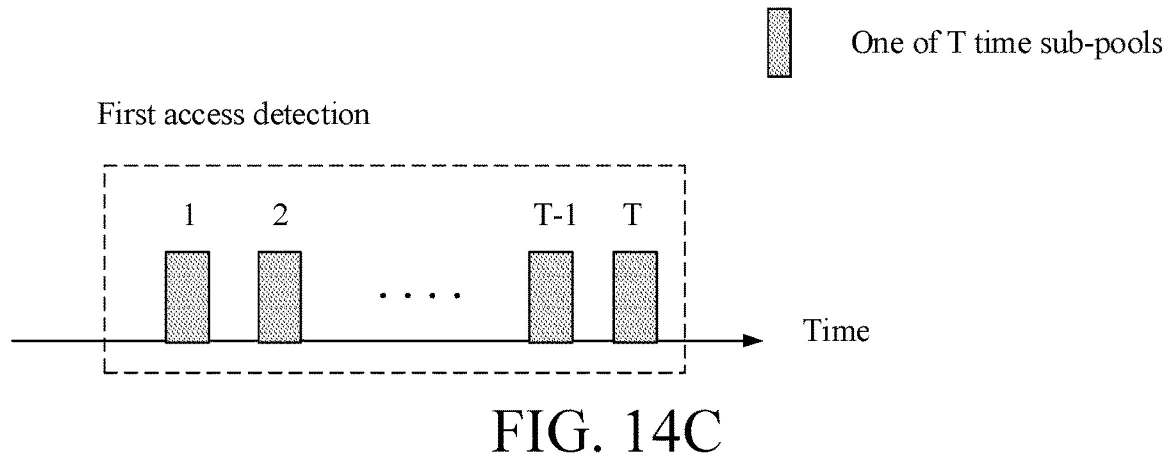
Figures 15A, 15B, 15C:
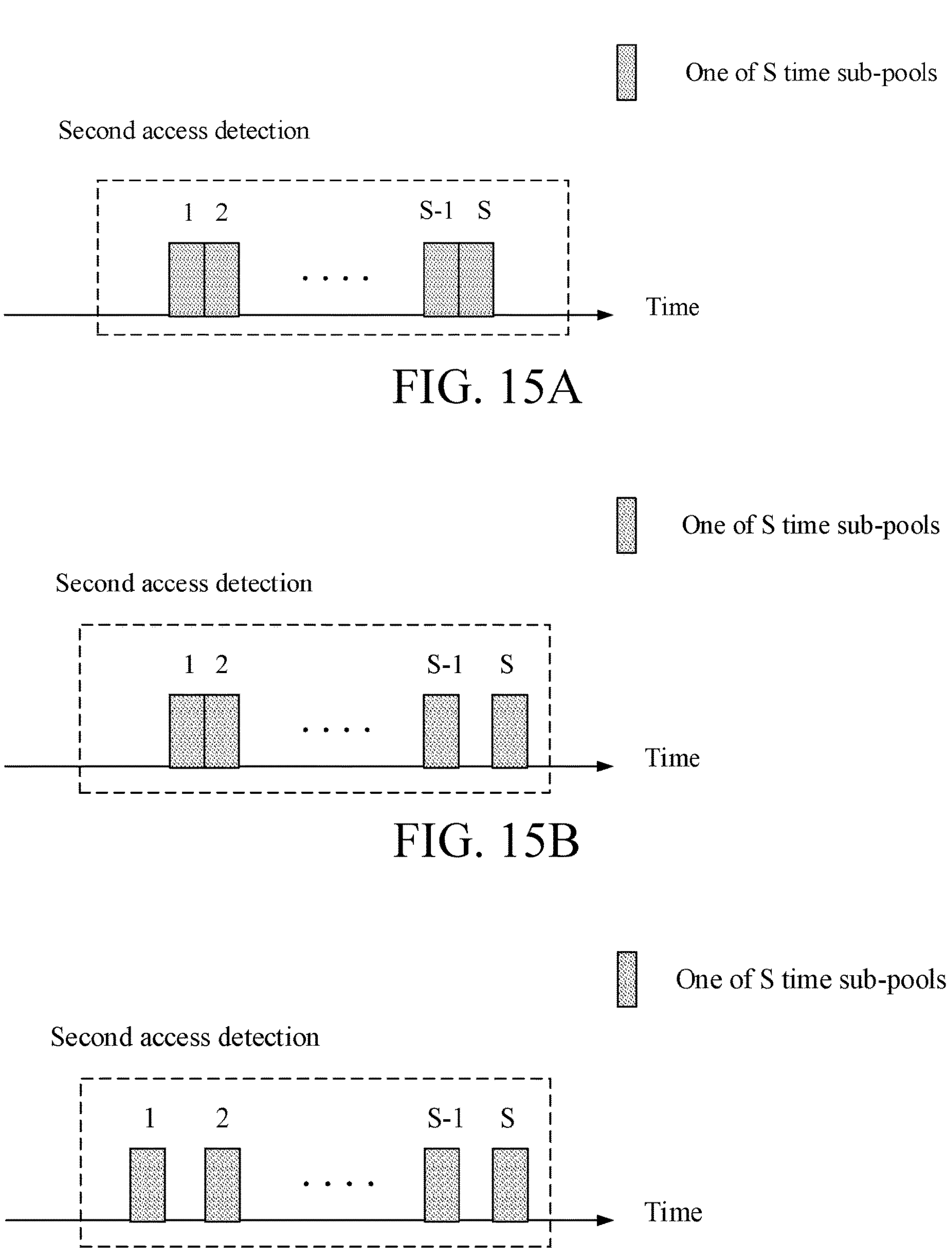
FIG. 15A-15C respectively illustrate a schematic diagram of a second access detection according to one embodiment of the present disclosure.

Embodiment 11A-11B respectively illustrate a schematic diagram of relations among first control information, a first resource element set and first target configuration information, as shown in FIG. 11.

In Embodiment 11, the first control information of the present disclosure is transmitted in a resource element subset of a first resource element set, the first resource element set comprises multiple of resource element subsets, each of the resource element subsets is composed of a positive integer number of resource element(s); the N groups of first configuration information are respectively used for determining N resource element sets and the first resource element set is a resource element set out of the N resource element sets corresponding to the first target configuration information, or, the N groups of first configuration information all correspond to the first resource element set; the resource element occupies a multicarrier symbol in time domain and a subcarrier in frequency domain.

In one embodiment, the first antenna port group set corresponds to the first resource element set.

In one embodiment, the number of antenna port groups comprised in the first antenna port group set is equal to the number of resource element subsets comprised in the first resource element set.

In one embodiment, the first antenna port group set comprises P antenna port group(s), while the first resource element set comprises P resource element subset(s), the P is a positive integer; measurement(s) on the P antenna port group(s) is(are) respectively used for receiving radio signal(s) transmitted on the P resource element subset(s).

In one embodiment, the first resource element set is composed of a positive integer number of CORESET(s).

In one subembodiment, a CORESET comprises a positive integer number of search space(s).

In one embodiment, the first resource element set is composed of a positive integer number of search space(s).

In one embodiment, the resource element subset belongs to a CORESET.

In one subembodiment, a CORESET comprises a positive integer number of search space(s).

In one embodiment, the resource element subset belongs to a search space.

In one embodiment, the resource element subset is a PDCCH candidate in a search space.

In one embodiment, the resource element subset is an NR-PDCCH candidate in a search space.

In one embodiment, the N groups of first configuration information explicitly indicate N antenna port group sets respectively, the N antenna port group sets all correspond to the first resource element set.

In one embodiment, the N groups of first configuration information implicitly indicate N antenna port group sets respectively, the N antenna port group sets all correspond to the first resource element set.

In one subembodiment, the N groups of first configuration information respectively indicate N sets of indexes of radio signals transmitted on the N antenna port group sets.

In one embodiment, the N groups of first configuration information respectively indicate N time-frequency resource pools that periodically occur, and the N resource element sets are respectively N single occurrences of the time-frequency resource pools that periodically occur.

In one embodiment, the N groups of first configuration information respectively correspond to N antenna port group sets, measurements on the N antenna port group sets are respectively used for receiving radio signals transmitted on the N resource element sets.

In one embodiment, the N groups of first configuration information comprise configuration information of the N resource element sets and N period configuration parameters, where the configuration information of any of the N resource element sets comprises at least one of a number of resource element subsets comprised therein or configuration parameters of each resource element subset; the configuration parameters of the each resource element subset comprise at least one of time-domain resources occupied, frequency-domain resources occupied, mapping of CCE to REG, REG bundle size or antenna port identifier; and any of the N period configuration parameters comprises either period and time offset or a time-domain position of occurrence, in which the time-domain position of occurrence indicates time-domain resources occupied by each period.

In one subembodiment, the antenna port identifier indicates an antenna port group in one of the N antenna port group sets.

In one subembodiment, the antenna port identifier indicates an index of a radio signal transmitted on an antenna port group in one of the N antenna port group sets.

In one embodiment, the N resource element sets respectively correspond to N CORESET sets, and any of the N CORESET sets is composed of one or more CORESETs.

In one subembodiment, a CORESET comprises a positive integer number of search space(s).

In one embodiment, the N resource element sets respectively correspond to N search space sets, and any of the N search space sets is composed of one or more search spaces.

In one embodiment, the N resource element sets respectively correspond to N CORESET sets, and at least two of the N CORESET sets comprise different numbers of CORESETs.

In one subembodiment, a CORESET comprises a positive integer number of search space(s).

In one embodiment, the N resource element sets respectively correspond to N search space sets, and at least two of the N search space sets comprise different numbers of search spaces.

In one embodiment, the N resource element sets respectively correspond to N CORESET sets, and the N CORESET sets respectively comprise equal numbers of CORESETs.

In one subembodiment, a CORESET comprises a positive integer number of search space(s).

In one embodiment, the N resource element sets respectively correspond to N search space sets, and the N search space sets respectively comprise equal numbers of search spaces.

In one embodiment, at least two resource elements among the N resource element sets correspond to different subcarrier spacings.

In one embodiment, at least two of the N resource element sets correspond to different subcarrier spacings.

In one embodiment, the Embodiment 11A corresponds to a schematic diagram illustrating that the N groups of first configuration information are respectively used for determining N resource element sets and the first resource element set is one of the N resource element sets corresponding to the first target configuration information.

In one embodiment, the Embodiment 11B corresponds to a schematic diagram illustrating that the N groups of first configuration information all correspond to the first resource element set.

Embodiment 12

Embodiment 12A-12C respectively illustrate a schematic diagram of relations among Q indication information group(s), Q piece(s) of indication information and Q downlink burst(s).

In Embodiment 12, among the Q indication information group(s) of the present disclosure each indication information group comprises a positive integer number of piece(s) of indication information; the Q piece(s) of indication information respectively belongs(belong) to the Q indication information group(s), each multicarrier symbol between any adjacent two pieces of indication information in each of the Q indication information group(s) is occupied.

In one embodiment, the Q indication information group(s) respectively correspond to Q downlink burst(s).

In one embodiment, the Q indication information group(s) are respectively transmitted in Q downlink burst(s).

In one subembodiment, any downlink burst of the Q downlink bursts is composed of a group of contiguous multicarrier symbols.

In one subembodiment, any two downlink bursts of the Q downlink bursts are orthogonal in time domain.

In one subembodiment, at least two consecutive downlink bursts of the Q downlink bursts are orthogonal in time domain.

In one subembodiment, at least two consecutive downlink bursts of the Q downlink bursts have overlapping multicarrier symbols in time domain.

In one embodiment, the Embodiment 12A corresponds to a schematic diagram illustrating that any two of the Q downlink bursts are orthogonal in time domain.

In one embodiment, the Embodiment 12B corresponds to a schematic diagram illustrating that at least two consecutive downlink bursts of the Q downlink bursts are orthogonal in time domain, and that at least two of the Q downlink bursts have overlapping multicarrier symbols in time domain.

In one embodiment, the Embodiment 12C corresponds to a schematic diagram illustrating that at least two consecutive downlink bursts of the Q downlink bursts have overlapping multicarrier symbols in time domain.

Embodiment 13

Embodiment 13A-13D respectively illustrate a schematic diagram of first information.

In Embodiment 13, the first information of the present disclosure is used for determining first target configuration information out of the N groups of first configuration information, the first information is also used for determining second target configuration information out of M groups of second configuration information; the first information is one of the Q piece(s) of indication information; the Q piece(s) of indication information respectively indicates (indicate) that Q multicarrier symbol group(s) is(are) occupied, any of the Q multicarrier symbol group(s) comprises a positive integer number of multicarrier symbol(s).

In one embodiment, the M is equal to the N.

In one embodiment, the M is unequal to the N.

In one embodiment, the Embodiment 13A corresponds to a schematic diagram illustrating that the first information comprises a first field, the first field is used for determining the first target configuration information out of the N groups of first configuration information, and the first field is used for determining the second target configuration information out of the M groups of second configuration information.

In one embodiment, the Embodiment 13B corresponds to a schematic diagram illustrating that the first information comprises a first field and a second field, of which the first field is used for determining the first target configuration information out of the N groups of first configuration information and the second field is used for determining the second target configuration information out of the M groups of second configuration information.

In one embodiment, the Embodiment 13C corresponds to a schematic diagram illustrating that the first information comprises a first field and a second field, of which the first field is used for determining the first target configuration information out of the N groups of first configuration information and for determining the second target configuration information out of the M groups of second configuration information, while the second field indicates that one of Q multicarrier symbol group(s) is occupied.

In one embodiment, the Embodiment 13D corresponds to a schematic diagram illustrating that the first information comprises a first field, a second field and a third field, of which the first field is used for determining the first target configuration information out of the N groups of first configuration information, the second field is used for determining the second target configuration information out of the M groups of second configuration information and the third field indicates that one of Q multicarrier symbol group(s) is occupied.

Embodiment 14

Embodiment 14A-14C respectively illustrate a schematic diagram of a first access detection.

In Embodiment 14, the performing of the first access detection of the present disclosure is prior to transmission of the first radio signal; the first access detection comprises: performing T energy detection(s) respectively in T time sub-pool(s) to obtain T detection value(s); wherein each of T1 detection value(s) out of the T detection value(s) is lower than a first threshold, the T is a positive integer, the T1 is a positive integer no greater than the T.

In one embodiment, an end time of the first access detection is before a starting transmission time of the first radio signal.

In one embodiment, the first access detection is LBT, the specific meaning and mode of implementation of the LBT can be found in 3GPP TR36.889.

In one embodiment, the first access detection is Clear Channel Assessment (CCA), the specific meaning and mode of implementation of the CCA can be found in 3GPP TR36.889.

In one embodiment, the first access detection is used for determining whether a frequency-domain resource block to which the first frequency-domain resource belongs is idle.

In one embodiment, the frequency-domain resource block to which the first frequency-domain resource belongs is the first frequency-domain resource.

In one embodiment, the frequency-domain resource block to which the first frequency-domain resource belongs is a BWP.

In one embodiment, the frequency-domain resource block to which the first frequency-domain resource belongs is a Carrier.

In one embodiment, the frequency-domain resource block to which the first frequency-domain resource belongs comprises a group of contiguous RBs.

In one embodiment, the frequency-domain resource block to which the first frequency-domain resource belongs comprises a group of contiguous PRBs.

In one embodiment, the frequency-domain resource block to which the first frequency-domain resource belongs comprises a group of contiguous subcarriers.

In one embodiment, the first access detection is an uplink access detection.

In one embodiment, the first access detection is used for determining whether the frequency-domain resource block to which the first frequency-domain resource belongs can be used by the UE for uplink transmission.

In one embodiment, the first access detection is implemented in a way defined in 3GPP TS36.213, section 15.2.

In one embodiment, the T1 is equal to the T.

In one embodiment, the T1 is less than the T.

In one embodiment, each of the T detection value(s) and the first threshold is measured by dBm.

In one embodiment, each of the T detection value(s) and the first threshold is measured by mW.

In one embodiment, each of the T detection value(s) and the first threshold is measured by J.

In one embodiment, the first threshold is equal to or less than −72 dBm.

In one embodiment, the first threshold is any value equal to or less than a first given value.

In one subembodiment, the first given value is predefined.

In one subembodiment, the first given value is configured by a higher-layer signaling.

In one embodiment, the first threshold is selected by the UE liberally on the condition that the first threshold is equal to or less than the first given value.

In one subembodiment, the first given value is predefined.

In one subembodiment, the first given value is configured by a higher-layer signaling.

In one embodiment, among detection value(s) of the T detection value(s) not belonging to the T1 detection value(s) there is at least one detection value lower than the first threshold.

In one embodiment, the T detection value(s) is(are) respectively T received power(s) acquired by the UE in T time unit(s) by first sensing the power of all radio signals on a frequency-domain resource block to which the first frequency-domain resource belongs and then averaging in time; the T time unit(s) is(are) respectively T consecutive time duration(s) in the T time sub-pool(s).

In one subembodiment, any time unit of the T time unit(s) lasts no shorter than 4 μs.

In one embodiment, the T detection value(s) is(are) respectively T received energy(energies) acquired by the UE in T time unit(s) by first sensing the energy of all radio signals on a frequency-domain resource block to which the first frequency-domain resource belongs and then averaging in time; the T time unit(s) is(are) respectively T consecutive time duration(s) in the T time sub-pool(s).

In one embodiment, the T detection value(s) is(are) respectively T received power(s) or received energy(energies) acquired by the UE in T time unit(s) by first sensing all radio signals on a frequency-domain resource block to which the first frequency-domain resource belongs with first multi-antenna related reception and then averaging in time; a measurement on the first information or the first reference antenna port group or the second reference antenna port group is used for determining the first multi-antenna related reception; the T time unit(s) is(are) respectively T consecutive time duration(s) in the T time sub-pool(s).

In one embodiment, the phrase that a measurement on a piece of given information or a given antenna port group is used for determining a given multi-antenna related reception means that the given multi-antenna related reception is multi-antenna related reception of the given information or a radio signal transmitted on the given antenna port group, the given information or the radio signal transmitted on the given antenna port group is received by the UE.

In one embodiment, the phrase that a measurement on a piece of given information or a given antenna port group is used for determining a given multi-antenna related reception means that the given multi-antenna related reception is multi-antenna related transmission of the given information or a radio signal transmitted on the given antenna port group, the given information or the radio signal transmitted on the given antenna port group is transmitted by the UE.

In one embodiment, any given energy detection of the T energy detection(s) means that the UE monitors a received power in a given time unit, the given time unit is a consecutive time duration in a time sub-pool corresponding to the given energy detection among the T time sub-pool(s).

In one embodiment, any given energy detection of the T energy detection(s) means that the UE monitors a received energy in a given time unit, the given time unit is a consecutive time duration in a time sub-pool corresponding to the given energy detection among the T time sub-pool(s).

In one embodiment, any given energy detection of the T energy detection(s) means that the UE senses all radio signals on a frequency-domain resource block to which the first frequency-domain resource belongs in a given time unit so as to acquire a given power; the given time unit is a consecutive time duration in a time sub-pool corresponding to the given energy detection among the T time sub-pool(s).

In one subembodiment, a detection value of the T detection value(s) that corresponds to the given energy detection is the given power.

In one embodiment, any given energy detection of the T energy detection(s) means that the UE senses all radio signals on a frequency-domain resource block to which the first frequency-domain resource belongs in a given time unit so as to acquire a given energy; the given time unit is a consecutive time duration in a time sub-pool corresponding to the given energy detection among the T time sub-pool(s).

In one embodiment, any energy detection of the T energy detection(s) is implemented in a way defined in 3GPP TS36.213, section 15.

In one embodiment, any energy detection of the T energy detection(s) is implemented through a mode of energy detection in LTE LAA.

In one embodiment, any energy detection of the T energy detection(s) is energy detection in LBT process.

In one embodiment, any energy detection of the T energy detection(s) is energy detection in CCA process.

In one embodiment, any energy detection of the T energy detection(s) is implemented through a mode of energy detection in WiFi.

In one embodiment, any energy detection of the T energy detection(s) is implemented through measuring Received Signal Strength Indication (RSSI).

In one embodiment, time-domain resources occupied by any time sub-pool of the T time sub-pool(s) are contiguous.

In one embodiment, the T time sub-pools are mutually orthogonal (non-overlapped) in time domain.

In one embodiment, a time duration of any time sub-pool of the T time sub-pool(s) is either 16 μs or 9 μs.

In one embodiment, at least two of the T time sub-pools are of unequal time durations.

In one embodiment, any two of the T time sub-pools are of equal time duration.

In one embodiment, time-domain resources occupied by the T time sub-pool(s) are contiguous.

In one embodiment, among the T time sub-pools there are at least two time sub-pools by which time-domain resources occupied are not contiguous.

In one embodiment, time-domain resources occupied by any two time sub-pools of the T time sub-pools are not contiguous.

In one embodiment, any time sub-pool of the T time sub-pool(s) is a slot.

In one embodiment, any of the T time sub-pool(s) is a $T_{sl}$, the $T_{sl}$ is a slot duration and the specific meaning of the $T_{sl}$ can be found in 3GPP TS36.213, section 15.2.

In one embodiment, any time sub-pool among the T time sub-pools other than an earliest time sub-pool is a slot.

In one embodiment, any time sub-pool among the T time sub-pools other than an earliest time sub-pool is a $T_{sl}$, the $T_{sl}$ is a slot duration and the specific meaning of the $T_{sl}$ can be found in 3GPP TS36.213, section 15.2.

In one embodiment, among the T time sub-pool(s) there is at least one time sub-pool that lasts 16 μs.

In one embodiment, among the T time sub-pool(s) there is at least one time sub-pool that lasts 9 μs.

In one embodiment, an earliest time sub-pool of the T time sub-pool(s) lasts 16 μs in duration.

In one embodiment, a latest time sub-pool of the T time sub-pool(s) lasts 9 μs in duration.

In one embodiment, the T time sub-pool(s) comprises (comprise) listening time in Cat 4 LBT.

In one embodiment, the T time sub-pool(s) comprises (comprise) slot(s) in a defer duration and in a Back-off Time in Cat 4 LBT.

In one embodiment, the T time sub-pool(s) comprises (comprise) listening time in Cat 2 LBT.

In one embodiment, the T time sub-pool(s) comprises (comprise) slot(s) in a defer duration and in a Back-off Time within a Type 1 UL channel access procedure.

In one embodiment, the T time sub-pool(s) comprises (comprise) slot(s) in a sensing interval within a Type 2 UL channel access procedure, the specific meaning of the sensing interval can be found in 3GPP TS36.213, section 15.2.

In one subembodiment, the sensing interval lasts 25 μs.

In one embodiment, the T time sub-pools comprise $T_f$ and $T_{sl}$ in a sensing interval within a Type 2 UL channel access procedure, the $T_f$ and the $T_{sl}$ are two time intervals and the specific meaning of the $T_f$ and the $T_{sl}$ can be found in 3GPP TS36.213, section 15.2.

In one subembodiment, the $T_f$ lasts 16 μs.

In one subembodiment, the $T_{sl}$ lasts 9 μs.

In one embodiment, the T time sub-pools comprise slots in an initial CCA and an Enhanced Clear Channel Assessment (eCCA).

In one embodiment, any two of the T1 time sub-pools are of equal time duration, the T1 time sub-pools are time sub-pools of the T time sub-pools that correspond to the T1 detection values respectively.

In one embodiment, at least two time sub-pools of the T1 time sub-pools are of unequal time durations, the T1 time sub-pools are time sub-pools of the T time sub-pools that correspond to the T1 detection values respectively.

In one embodiment, time-domain resources occupied by the T1 time sub-pool(s) are contiguous, the T1 time sub-pool(s) is(are) time sub-pool(s) of the T time sub-pool(s) respectively corresponding to the T1 detection value(s).

In one embodiment, among the T1 time sub-pools there are at least two time sub-pools by which time-domain resources occupied are not contiguous, the T1 time sub-pools are time sub-pools of the T time sub-pools respectively corresponding to the T1 detection values.

In one embodiment, time-domain resources occupied by any two time sub-pools of the T1 time sub-pools are not contiguous, the T1 time sub-pools are time sub-pools of the T time sub-pools respectively corresponding to the T1 detection values.

In one embodiment, the T1 time sub-pool(s) comprises (comprise) a latest time sub-pool among the T time sub-pools, the T1 time sub-pool(s) is(are) time sub-pool(s) of the T time sub-pools respectively corresponding to the T1 detection value(s).

In one embodiment, the T1 time sub-pool(s) only comprises(comprise) slots in eCCA, the T1 time sub-pool(s) is(are) time sub-pool(s) of the T time sub-pool(s) respectively corresponding to the T1 detection value(s).

In one embodiment, the T time sub-pools comprise T1 time sub-pool(s) and T2 time sub-pool(s), the T1 time sub-pool(s) is(are) time sub-pool(s) of the T time sub-pools respectively corresponding to the T1 detection value(s), while any of the T2 time sub-pool(s) does not belong to the T1 time sub-pool(s); the T2 is a positive integer no greater than a difference between the T and the T1.

In one subembodiment, positions of the T2 time sub-pools among the T time sub-pools are consecutive.

In one subembodiment, the T2 time sub-pool(s) comprises(comprise) slot(s) in initial CCA.

In one embodiment, the T1 time sub-pool(s) is(are) time sub-pool(s) of the T time sub-pools respectively corresponding to the T1 detection value(s), the T1 time sub-pool(s) respectively belongs(belong) to T1 sub-pool set(s), and any sub-pool set of the T1 sub-pool set(s) comprises a positive integer number of time sub-pool(s) comprised in the T time sub-pools; a detection value corresponding to any time sub-pool in the T1 sub-pool set(s) is less than the first threshold.

In one subembodiment, among the T1 sub-pool set(s) there is at least one sub-pool set by which the number of time sub-pools comprised is equal to 1.

In one subembodiment, among the T1 sub-pool set(s) there is at least one sub-pool set by which the number of time sub-pools comprised is greater than 1.

In one subembodiment, among the T1 sub-pool sets there are at least two sub-pool sets that comprise unequal numbers of time sub-pools.

In one subembodiment, among the T time sub-pools there isn't any time sub-pool belonging to two of the T1 sub-pool sets simultaneously.

In one subembodiment, among the T1 sub-pool sets there is at least one sub-pool set in which all time sub-pools comprised belong to a same defer duration.

In one reference embodiment of the above subembodiment, the time duration of a defer duration is 16 μs plus a positive integral multiple of 9 μs.

In one subembodiment, among time sub-pool(s) of the T time sub-pools not belonging to the T1 sub-pool set(s) there is at least one time sub-pool that corresponds to a detection value lower than the first threshold.

In one embodiment, the Embodiment 14A corresponds to a schematic diagram illustrating that time-domain resources occupied by the T time sub-pools are consecutive.

In one embodiment, the Embodiment 14B corresponds to a schematic diagram illustrating that among the T time sub-pools there are at least two time sub-pools by which time-domain resources occupied are non-consecutive.

In one embodiment, the Embodiment 14C corresponds to a schematic diagram illustrating that time-domain resources occupied by any two of the T time sub-pools are non-consecutive.

Embodiment 15

Embodiment 15A-15C respectively illustrate a schematic diagram of a second access detection.

In Embodiment 15, the performing of the second access detection of the present disclosure is prior to transmission of the first radio signal, the second operating is transmitting, the second access detection comprises: performing S energy detection(s) respectively in S time sub-pool(s) to obtain S detection value(s); herein, each of S1 detection value(s) out of the S detection value(s) is lower than a second threshold, the S is a positive integer, the S1 is a positive integer no greater than the S.

In one embodiment, the second access detection is one of Q access detection(s), the Q access detection(s) respectively corresponds(correspond) to the Q piece(s) of indication information.

In one subembodiment, time-domain resources respectively occupied by the Q access detections are mutually orthogonal.

In one subembodiment, time-domain resources respectively occupied by at least two of the Q access detections are mutually orthogonal.

In one subembodiment, time-domain resources respectively occupied by at least two of the Q access detections are overlapped.

In one subembodiment, the performing of any of the Q access detection(s) is prior to transmission of a corresponding piece of indication information among the Q piece(s) of indication information.

In one subembodiment, an end time of any of the Q access detection(s) is prior to a starting transmission time of a corresponding piece of indication information among the Q piece(s) of indication information.

In one subembodiment, the Q access detections respectively comprise different numbers of time-domain resources.

In one subembodiment, the Q access detections respectively comprise same numbers of time-domain resources.

In one subembodiment, receive beamforming matrixes respectively employed by the Q access detections are different from one another.

In one subembodiment, receiving beams respectively employed by the Q access detections are different from one another.

In one subembodiment, receive beamforming matrixes respectively employed by at least two of the Q access detections are different.

In one subembodiment, receiving beams respectively employed by at least two of the Q access detections are different.

In one embodiment, an end time of the second access detection is prior to a starting transmission time of the first radio signal.

In one embodiment, the performing of the second access detection is prior to transmission of the Q piece(s) of indication information.

In one embodiment, an end time of the second access detection is prior to a starting transmission time of the Q piece(s) of indication information.

In one embodiment, the performing of the second access detection is prior to transmission of the first information.

In one embodiment, an end time of the second access detection is prior to a starting transmission time of the first information.

In one embodiment, the performing of the second access detection is prior to transmission of the first control information.

In one embodiment, an end time of the second access detection is prior to a starting transmission time of the first control information.

In one embodiment, the second access detection is LBT, the specific definition and mode of implementation of the LBT can be found in 3GPP TR36.889.

In one embodiment, the second access detection is CCA, the specific definition and mode of implementation of the CCA can be found in 3GPP TR36.889.

In one embodiment, the second access detection is used for determining whether a frequency-domain resource block to which the first frequency-domain resource belongs is idle.

In one embodiment, the second access detection is a downlink access detection.

In one embodiment, the second access detection is used for determining whether a frequency-domain resource block to which the first frequency-domain resource belongs can be used by the base station for downlink transmission.

In one embodiment, the second access detection is implemented in a way defined in 3GPP TS36.213, section 15.1.

In one embodiment, the S1 is equal to the S.

In one embodiment, the S1 is less than the S.

In one embodiment, each of the S detection value(s) and the second threshold is measured by dBm.

In one embodiment, each of the S detection value(s) and the second threshold is measured by mW.

In one embodiment, each of the S detection value(s) and the second threshold is measured by J.

In one embodiment, the second threshold is equal to or less than −72 dBm.

In one embodiment, the second threshold is any value equal to or less than a second given value.

In one subembodiment, the second given value is predefined.

In one subembodiment, the second given value is configured by a higher-layer signaling.

In one embodiment, the second threshold is selected by the base station liberally on the condition that the second threshold is equal to or less than the second given value.

In one subembodiment, the second given value is predefined.

In one subembodiment, the second given value is configured by a higher-layer signaling.

In one embodiment, among detection value(s) of the S detection values not belonging to the S1 detection value(s) there is at least one detection value lower than the second threshold.

In one embodiment, the S detection value(s) is(are) respectively S received power(s) acquired by the base station in S time unit(s) by first sensing the power of all radio signals on a frequency-domain resource block to which the first frequency-domain resource belongs and then averaging in time; the S time unit(s) is(are) respectively S consecutive time duration(s) in the S time sub-pool(s).

In one subembodiment, any time unit of the S time unit(s) lasts no shorter than 4 μs.

In one embodiment, the S detection value(s) is(are) respectively S received energy(energies) acquired by the base station in S time unit(s) by first sensing the energy of all radio signals on a frequency-domain resource block to which the first frequency-domain resource belongs and then averaging in time; the S time unit(s) is(are) respectively S consecutive time duration(s) in the S time sub-pool(s).

In one embodiment, the S detection value(s) is(are) respectively S received power(s) or received energy(energies) acquired by the base station in S time unit(s) by first sensing all radio signals on a frequency-domain resource block to which the first frequency-domain resource belongs with second multi-antenna related reception and then averaging in time; a measurement on the first information or the first reference antenna port group or the second reference antenna port group is used for determining the second multi-antenna related reception; the S time unit(s) is(are) respectively S consecutive time duration(s) in the S time sub-pool(s).

In one embodiment, any given energy detection of the S energy detection(s) means that the base station monitors a received power in a given time unit, the given time unit is a consecutive time duration in a time sub-pool corresponding to the given energy detection among the S time sub-pool(s).

In one embodiment, any given energy detection of the S energy detection(s) means that the base station monitors a received energy in a given time unit, the given time unit is a consecutive time duration in a time sub-pool corresponding to the given energy detection among the S time sub-pool(s).

In one embodiment, any given energy detection of the S energy detection(s) means that the base station senses all radio signals on a frequency-domain resource block to which the first frequency-domain resource belongs in a given time unit so as to acquire a given power; the given time unit is a consecutive time duration in a time sub-pool corresponding to the given energy detection among the S time sub-pool(s).

In one subembodiment, a detection value of the S detection value(s) that corresponds to the given energy detection is the given power.

In one embodiment, any given energy detection of the S energy detection(s) means that the base station senses all radio signals on a frequency-domain resource block to which the first frequency-domain resource belongs in a given time unit so as to acquire a given energy; the given time unit is a consecutive time duration in a time sub-pool corresponding to the given energy detection among the S time sub-pool(s).

In one embodiment, any energy detection of the S energy detection(s) is implemented in a way defined in 3GPP TS36.213, section 15.

In one embodiment, any energy detection of the S energy detection(s) is implemented through a mode of energy detection in LTE LAA.

In one embodiment, any energy detection of the S energy detection(s) is energy detection in LBT process.

In one embodiment, any energy detection of the S energy detection(s) is energy detection in CCA process.

In one embodiment, any energy detection of the S energy detection(s) is implemented through a mode of energy detection in WiFi.

In one embodiment, any energy detection of the S energy detection(s) is implemented through measuring RSSI.

In one embodiment, time-domain resources occupied by any time sub-pool of the S time sub-pool(s) are contiguous.

In one embodiment, the S time sub-pools are mutually orthogonal (non-overlapped) in time domain.

In one embodiment, a time duration of any time sub-pool of the S time sub-pool(s) is either 16 μs or 9 μs.

In one embodiment, at least two time sub-pools of the S time sub-pools are of unequal time durations.

In one embodiment, any two of the S time sub-pools are of equal time duration.

In one embodiment, time-domain resources occupied by the S time sub-pool(s) are contiguous.

In one embodiment, among the S time sub-pools there are at least two time sub-pools by which time-domain resources occupied are not contiguous.

In one embodiment, time-domain resources occupied by any two time sub-pools of the S time sub-pools are not contiguous.

In one embodiment, any time sub-pool of the S time sub-pool(s) is a slot.

In one embodiment, any of the S time sub-pool(s) is a $T_{sl}$, the $T_{sl}$ is a slot duration and the specific meaning of the $T_{sl}$ can be found in 3GPP TS36.213, section 15.1.

In one embodiment, any time sub-pool among the S time sub-pools other than an earliest time sub-pool is a slot.

In one embodiment, any time sub-pool among the S time sub-pools other than an earliest time sub-pool is a $T_{sl}$, the $T_{sl}$ is a slot duration and the specific meaning of the $T_{sl}$ can be found in 3GPP TS36.213, section 15.1.

In one embodiment, among the S time sub-pool(s) there is at least one time sub-pool that lasts 16 μs.

In one embodiment, among the S time sub-pool(s) there is at least one time sub-pool that lasts 9 μs.

In one embodiment, an earliest time sub-pool of the S time sub-pool(s) lasts 16 μs in duration.

In one embodiment, a latest time sub-pool of the S time sub-pool(s) lasts 9 μs in duration.

In one embodiment, the S time sub-pool(s) comprises (comprise) listening time in Cat 4 LBT.

In one embodiment, the S time sub-pool(s) comprises (comprise) slot(s) in a defer duration and in a Back-off Time in Cat 4 LBT.

In one embodiment, the S time sub-pool(s) comprises (comprise) listening time in Cat 2 LBT.

In one embodiment, the S time sub-pool(s) comprises (comprise) slot(s) in an initial CCA and an eCCA.

In one embodiment, any two of the S1 time sub-pools are of equal time duration, the S1 time sub-pools are time sub-pools of the S time sub-pools that correspond to the S1 detection values respectively.

In one embodiment, at least two time sub-pools of the S1 time sub-pools are of unequal time durations, the S1 time sub-pools are time sub-pools of the S time sub-pools that correspond to the S1 detection values respectively.

In one embodiment, time-domain resources occupied by the S1 time sub-pool(s) are contiguous, the S1 time sub-pool(s) is(are) time sub-pool(s) of the S time sub-pools respectively corresponding to the S1 detection value(s).

In one embodiment, among the S1 time sub-pools there are at least two time sub-pools by which time-domain resources occupied are not contiguous, the S1 time sub-pools are time sub-pools of the S time sub-pools respectively corresponding to the S1 detection values.

In one embodiment, time-domain resources occupied by any two time sub-pools of the S1 time sub-pools are not contiguous, the S1 time sub-pools are time sub-pools of the S time sub-pools respectively corresponding to the S1 detection values.

In one embodiment, the S1 time sub-pool(s) comprises (comprise) a latest time sub-pool among the S time sub-pools, the S1 time sub-pool(s) is(are) time sub-pool(s) of the S time sub-pools respectively corresponding to the S1 detection value(s).

In one embodiment, the S1 time sub-pool(s) only comprises(comprise) slot(s) in eCCA, the S1 time sub-pool(s) is(are) time sub-pool(s) of the S time sub-pools respectively corresponding to the S1 detection value(s).

In one embodiment, the S time sub-pools comprise S1 time sub-pool(s) and S2 time sub-pool(s), the S1 time sub-pool(s) is(are) time sub-pool(s) of the S time sub-pools respectively corresponding to the S1 detection value(s), while any of the S2 time sub-pool(s) does not belong to the S1 time sub-pool(s); the S2 is a positive integer no greater than a difference between the S and the S1.

In one subembodiment, positions of the S2 time sub-pools among the S time sub-pools are consecutive.

In one subembodiment, the S2 time sub-pool(s) comprises (comprise) slot(s) in initial CCA.

In one embodiment, the S1 time sub-pool(s) is(are) time sub-pool(s) of the S time sub-pools respectively corresponding to the S1 detection value(s), the S1 time sub-pool(s) respectively belongs(belong) to S1 sub-pool set(s), and any sub-pool set of the S1 sub-pool set(s) comprises a positive integer number of time sub-pool(s) comprised in the S time sub-pools; a detection value corresponding to any time sub-pool in the S1 sub-pool set(s) is less than the second threshold.

In one subembodiment, among the S1 sub-pool set(s) there is at least one sub-pool set by which the number of time sub-pools comprised is equal to 1.

In one subembodiment, among the S1 sub-pool set(s) there is at least one sub-pool set by which the number of time sub-pools comprised is greater than 1.

In one subembodiment, among the S1 sub-pool sets there are at least two sub-pool sets that comprise unequal numbers of time sub-pools.

In one subembodiment, among the S time sub-pools there isn't any time sub-pool belonging to two of the S1 sub-pool sets simultaneously.

In one subembodiment, among the S1 sub-pool sets there is at least one sub-pool set in which all time sub-pools comprised belong to a same defer duration.

In one reference embodiment of the above subembodiment, the time duration of a defer duration is 16 μs plus a positive integral multiple of 9 μs.

In one subembodiment, among time sub-pool(s) of the S time sub-pools not belonging to the S1 sub-pool set(s) there is at least one time sub-pool that corresponds to a detection value lower than the second threshold.

In one embodiment, the Embodiment 15A corresponds to a schematic diagram illustrating that time-domain resources occupied by the S time sub-pools are consecutive.

In one embodiment, the Embodiment 15B corresponds to a schematic diagram illustrating that among the S time sub-pools there are at least two time sub-pools by which time-domain resources occupied are non-consecutive.

In one embodiment, the Embodiment 15C corresponds to a schematic diagram illustrating that time-domain resources occupied by any two of the S time sub-pools are non-consecutive.

Embodiment 16

Figure 16:
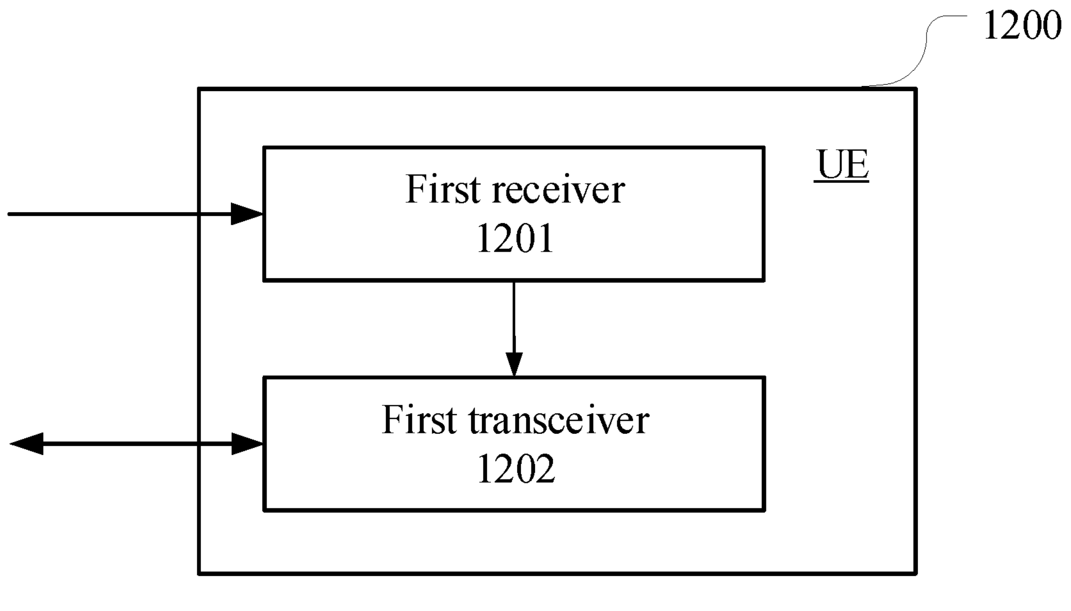
FIG. 16 illustrates a structure block diagram of a processing device in a UE according to one embodiment of the present disclosure.

Embodiment 16 illustrates a structure block diagram of a processing device in a UE, as shown in FIG. 16. In FIG. 16, a UE processing device 1200 comprises a first receiver 1201 and a first transceiver 1202.

The first receiver 1201 receives N groups of first configuration information, each group of the N groups of first configuration information being used for determining a corresponding antenna port group set, N being a positive integer greater than 1; receives Q piece(s) of indication information, Q being a positive integer; and receives first control information, the first control information being associated with first information, the first information being one of the Q piece(s) of indication information.

In Embodiment 16, the first information is used for determining first target configuration information out of the N groups of first configuration information; the first target configuration information is one group of the N groups of first configuration information; the first target configuration information is used for determining a first antenna port group set, the first antenna port group set is composed of one or more antenna port groups, of which each antenna port group is composed of one or more antenna ports; a first reference antenna port group is an antenna port group in the first antenna port group set, a measurement on the first reference antenna port group is used for receiving the first control information.

In one embodiment, the Q piece(s) of indication information respectively indicates(indicate) that Q multicarrier symbol group(s) is(are) occupied, any multicarrier symbol group of the Q multicarrier symbol group(s) comprises a positive integer number of multicarrier symbol(s).

In one embodiment, the UE processing device also comprises:

A first transceiver 1202, first operating a first radio signal in a first frequency-domain resource.

Herein, the first control information comprises scheduling information of the first radio signal, the Q is a positive integer greater than 1; the scheduling information of the first radio signal is used for determining a second reference antenna port group out of a second antenna port group set, the second antenna port group set is composed of at least two antenna port groups, each of the antenna port groups is composed of one or more antenna ports; a measurement on the second reference antenna port group is used for first operating the first radio signal; the first operating is receiving, or, the first operating is transmitting.

In one embodiment, the first receiver 1201 also receives M groups of second configuration information, each group of the M groups of second configuration information is used for determining a corresponding antenna port group set, the M is a positive integer greater than 1; herein, the first information is also used for determining second target configuration information out of the M groups of second configuration information, the second target configuration information is one group of the M groups of second configuration information; the second target configuration information is used for determining the second antenna port group set.

In one embodiment, the first receiver 1201 also performs a first access detection; the first operating is transmitting, the performing of the first access detection is prior to transmission of the first radio signal, the first access detection comprises:

performing T energy detection(s) respectively in T time sub-pool(s) to obtain T detection value(s);

herein, each of T1 detection value(s) out of the T detection value(s) is lower than a first threshold, the T is a positive integer, the T1 is a positive integer no greater than the T.

In one embodiment, the Q is a positive integer greater than 1, time-domain resources occupied by any two of the Q pieces of indication information are orthogonal, or, time-domain resources occupied by at least two of the Q pieces of indication information are overlapped; each multicarrier symbol between time-domain resources occupied by the first information and time-domain resources occupied by the first control information is occupied.

In one embodiment, the first control information and the first information belong to a same time slice in time domain, the time slice comprises a positive integer number of contiguous multicarrier symbols.

In one embodiment, the first control information is transmitted in a resource element subset of a first resource element set, the first resource element set comprises multiple of resource element subsets, each of the resource element subsets is composed of a positive integer number of resource element(s); the N groups of first configuration information are respectively used for determining N resource element sets and the first resource element set is a resource element set out of the N resource element sets corresponding to the first target configuration information, or, the N groups of first configuration information all correspond to the first resource element set; the resource element occupies a multicarrier symbol in time domain and a subcarrier in frequency domain.

In one embodiment, the first receiver 1201 also receives second information; the second information is used for determining the first resource element set, and each of the N groups of first configuration information corresponds to the first resource element set.

In one embodiment, the first receiver 1201 also receives Q indication information group(s), each of the Q indication information group(s) comprises a positive integer number of piece(s) of indication information; the Q piece(s) of indication information respectively belongs(belong) to the Q indication information group(s), each multicarrier symbol between any adjacent two pieces of information out of each of the Q indication information group(s) is occupied.

In one embodiment, the first receiver 1201 comprises at least the first two of the receiver 456, the receiving processor 452 and the controller/processor 490 in Embodiment 4.

In one embodiment, the first transceiver 1202 comprises the receiver/transmitter 456, the receiving processor 452, the transmitting processor 455 and the controller/processor 490 in Embodiment 4.

In one embodiment, the first transceiver 1202 comprises at least the first three of the receiver/transmitter 456, the receiving processor 452, the transmitting processor 455 and the controller/processor 490 in Embodiment 4.

Embodiment 17

Figure 17:
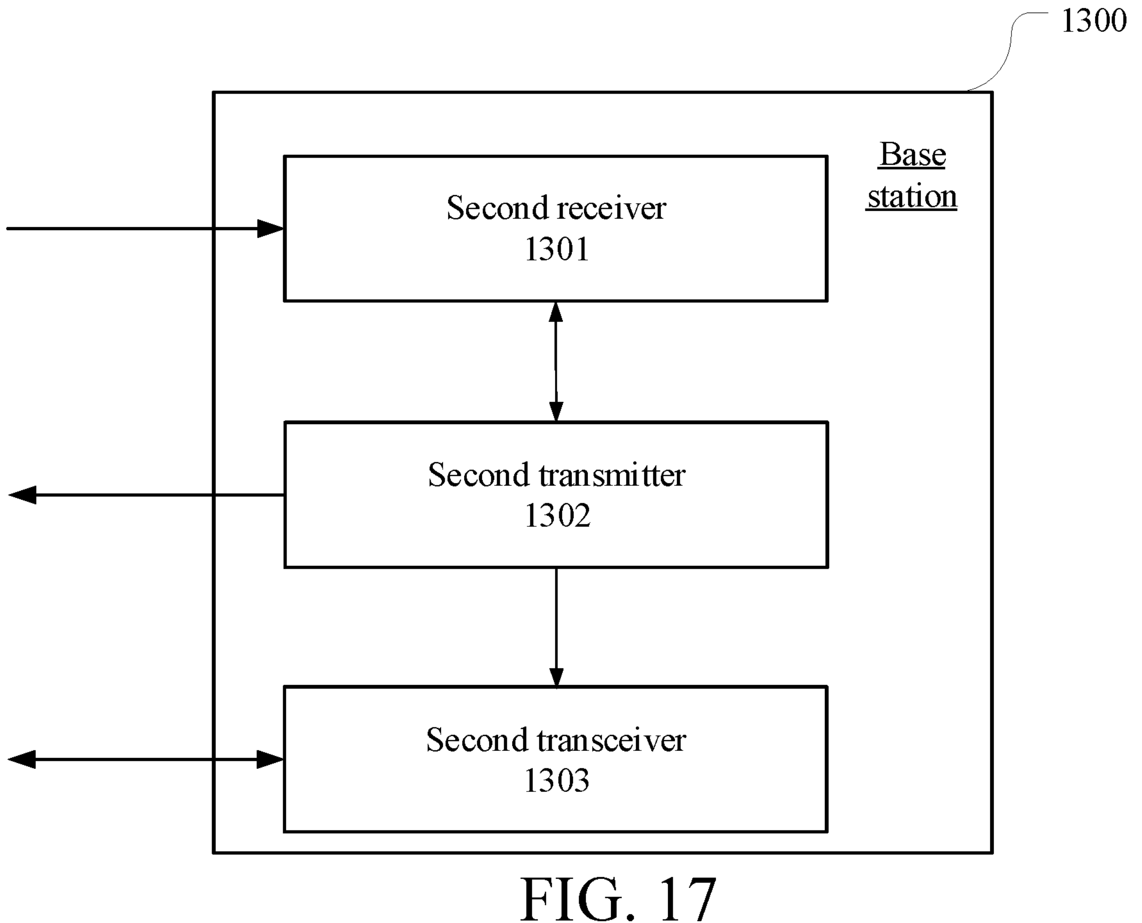
FIG. 17 illustrates a structure block diagram of a processing device in a base station according to one embodiment of the present disclosure.
Figures 18A, 18B:
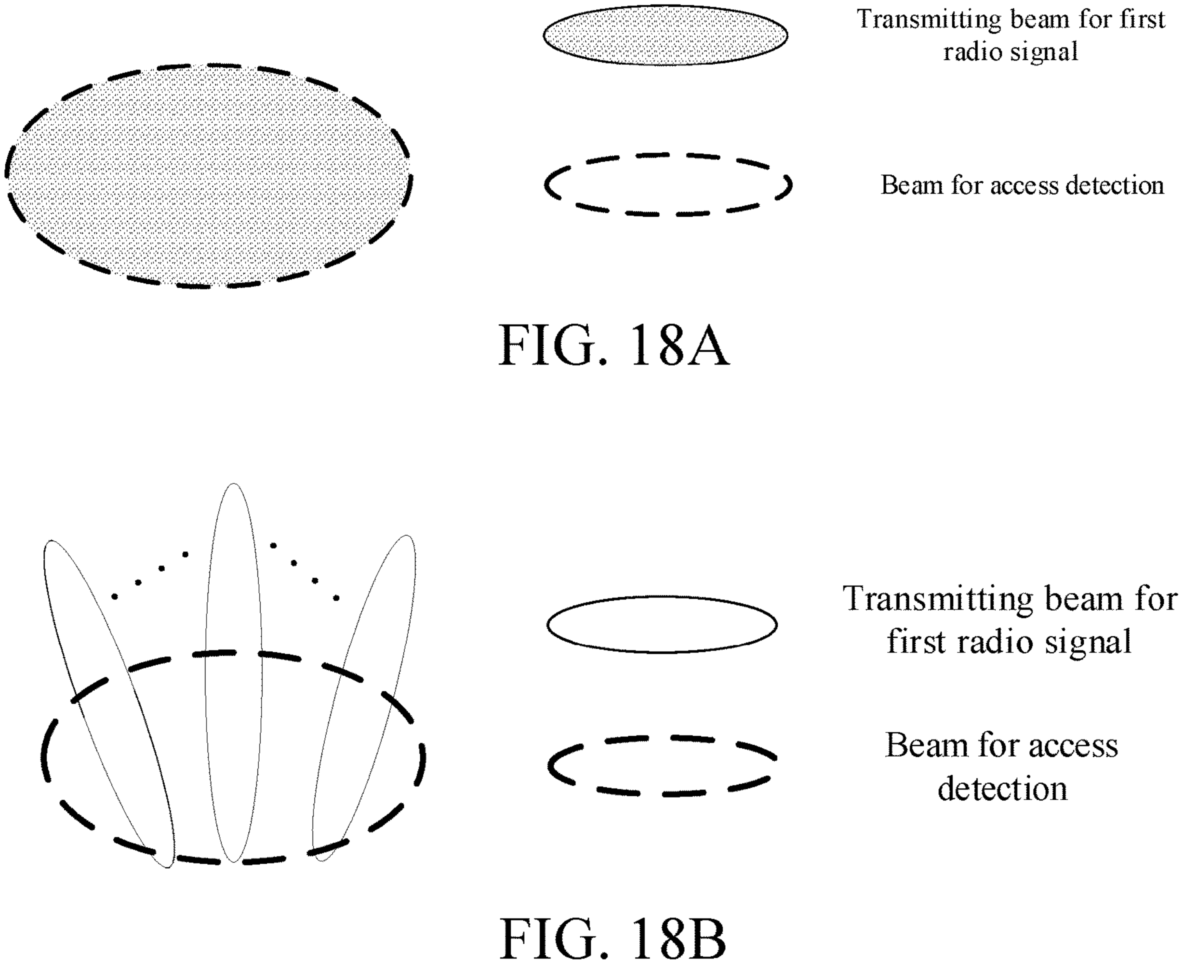
FIG. 18A-18B respectively illustrate a schematic diagram of how a given access detection is spatially related to a given piece of information or a given radio signal according to one embodiment of the present disclosure.
Figure 19A:
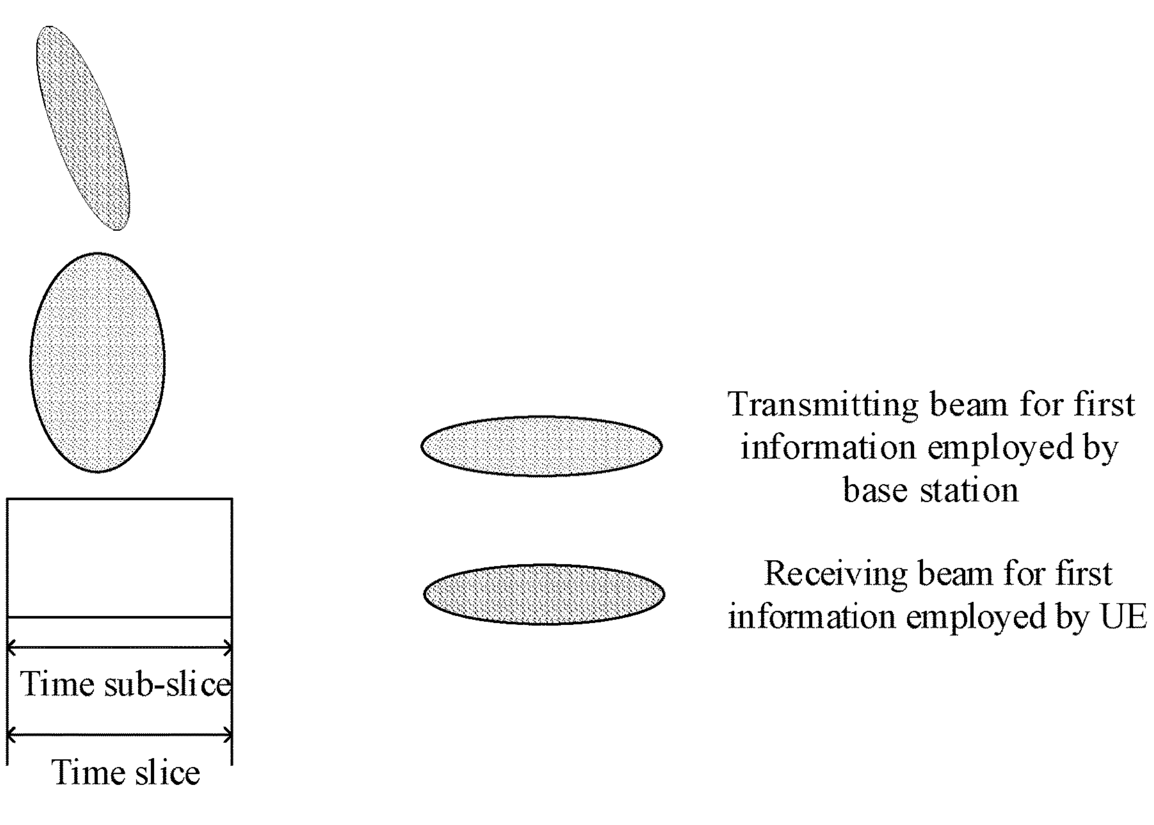
FIG. 19A-19B respectively illustrate a schematic diagram of transmission of first information according to one embodiment of the present disclosure.
Figure 19B:
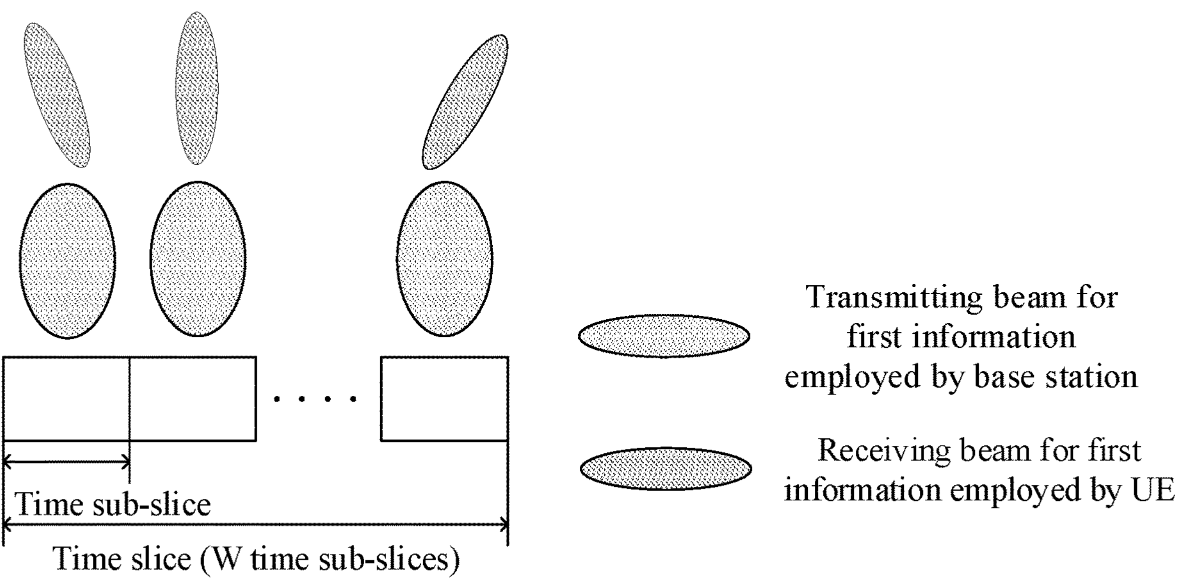

Embodiment 17 illustrates a structure block diagram of a processing device in a base station, as shown in FIG. 17. In FIG. 17, a processing device 1300 in a base station comprises a second receiver 1301, a second transmitter 1302 and a second transceiver 1303.

The second transmitter 1302 transmits N groups of first configuration information, each group of the N groups of first configuration information being used for determining a corresponding antenna port group set, N being a positive integer greater than 1; transmits Q piece(s) of indication information, Q being a positive integer; and transmits first control information, the first control information being associated with first information, the first information being one of the Q piece(s) of indication information.

In Embodiment 17, the first information is used for determining first target configuration information out of the N groups of first configuration information; the first target configuration information is one group of the N groups of first configuration information; the first target configuration information is used for determining a first antenna port group set, the first antenna port group set is composed of one or more antenna port groups, of which each antenna port group is composed of one or more antenna ports; a first reference antenna port group is an antenna port group in the first antenna port group set, a measurement on the first reference antenna port group is used for receiving the first control information.

In one embodiment, the Q piece(s) of indication information respectively indicates(indicate) that Q multicarrier symbol group(s) is(are) occupied, any multicarrier symbol group of the Q multicarrier symbol group(s) comprises a positive integer number of multicarrier symbol(s).

In one embodiment, the base station also comprises:

A second transceiver 1303, second operating a first radio signal in a first frequency-domain resource;

herein, the first control information comprises scheduling information of the first radio signal, the Q is a positive integer greater than 1; the scheduling information of the first radio signal is used for determining a second reference antenna port group out of a second antenna port group set, the second antenna port group set is composed of at least two antenna port groups, each of the antenna port groups is composed of one or more antenna ports; a measurement on the second reference antenna port group is used for first operating the first radio signal; the first operating is transmitting and the second operating is receiving, or, the first operating is receiving and the second operating is transmitting.

In one embodiment, the second transmitter 1302 also transmits M groups of second configuration information, each group of the M groups of second configuration information is used for determining a corresponding antenna port group set, the M is a positive integer greater than 1; the first information is also used for determining second target configuration information out of the M groups of second configuration information, the second target configuration information is one group of the M groups of second configuration information; the second target configuration information is used for determining the second antenna port group set.

In one embodiment, the base station also comprises:

A second receiver 1301, performing a second access detection;

herein, the performing of the second access detection is prior to transmission of the first radio signal, the second operating is transmitting, the second access detection comprises:

performing S energy detection(s) respectively in S time sub-pool(s) to obtain S detection value(s);

herein, each of S1 detection value(s) out of the S detection value(s) is lower than a second threshold, the S is a positive integer, the S1 is a positive integer no greater than the S.

In one embodiment, time-domain resources occupied by any two of the Q pieces of indication information are orthogonal, or, time-domain resources occupied by at least two of the Q pieces of indication information are overlapped; each multicarrier symbol between time-domain resources occupied by the first information and time-domain resources occupied by the first control information is occupied.

In one embodiment, the first control information and the first information belong to a same time slice in time domain, the time slice comprises a positive integer number of contiguous multicarrier symbols.

In one embodiment, the first control information is transmitted in a resource element subset of a first resource element set, the first resource element set comprises multiple of resource element subsets, each of the resource element subsets is composed of a positive integer number of resource element(s); the N groups of first configuration information are respectively used for determining N resource element sets and the first resource element set is a resource element set out of the N resource element sets corresponding to the first target configuration information, or, the N groups of first configuration information all correspond to the first resource element set; the resource element occupies a multicarrier symbol in time domain and a subcarrier in frequency domain.

In one embodiment, the second transmitter 1302 also transmits second information, the second information is used for determining the first resource element set, and each of the N groups of first configuration information corresponds to the first resource element set.

In one embodiment, the second transmitter 1302 also transmits Q indication information group(s), each of the Q indication information group(s) comprises a positive integer number of piece(s) of indication information; herein, the Q piece(s) of indication information respectively belongs(belong) to the Q indication information group(s), each multicarrier symbol between any adjacent two pieces of information out of each of the Q indication information group(s) is occupied.

In one subembodiment, the second transmitter 1302 comprises at least the first two of the transmitter 416, the transmitting processor 415 and the controller/processor 440 in Embodiment 4.

In one subembodiment, the second receiver 1301 comprises the receiver/transmitter 416, the receiving processor 412, the transmitting processor 415 and the controller/processor 440 in Embodiment 4.

In one subembodiment, the second transceiver 1303 comprises the receiver/transmitter 416, the receiving processor 412, the transmitting processor 415 and the controller/processor 440 in Embodiment 4.

In one subembodiment, the second transceiver 1303 comprises at least the first three of the receiver/transmitter 416, the receiving processor 412, the transmitting processor 415 and the controller/processor 440 in Embodiment 4.

Embodiment 18

Embodiment 18A-18B respectively illustrate a schematic diagram of how a given access detection is spatially related to a given piece of information or a given radio signal.

In Embodiment 18, the given access detection corresponds to the first access detection or the second access detection in the present disclosure, the given information corresponds to the first information in the present disclosure, and the given radio signal corresponds to the first radio signal in the present disclosure. The first operating in the present disclosure is transmitting, the second operating is receiving, and the performing of the first access detection is prior to the transmission of the first radio signal; or, the first operating is receiving, the second operating is transmitting, and the performing of the second access detection is prior to the transmission of the first radio signal.

In one embodiment, multi-antenna related reception employed in the given access detection can be used to infer multi-antenna related transmission of the given information or the given radio signal.

In one embodiment, multi-antenna related reception employed in the given access detection is the same as multi-antenna related transmission of the given information or the given radio signal.

In one embodiment, multi-antenna related reception employed in the given access detection is different from multi-antenna related transmission of the given information or the given radio signal.

In one embodiment, a beam width corresponding to a receive beamforming matrix employed in the given access detection is larger than a beam width corresponding to a transmit beamforming matrix of the given information or the given radio signal.

In one embodiment, a beam direction corresponding to a receive beamforming matrix employed in the given access detection includes a beam direction corresponding to a transmit beamforming matrix of the given information or the given radio signal.

In one embodiment, a beam width corresponding to a receiving beam employed in the given access detection is larger than a beam width corresponding to a transmitting beam for the given information or the given radio signal.

In one embodiment, the receiving beam employed in the given access detection includes the transmitting beam for the given information or the given radio signal.

In one embodiment, a number of antennas employed in the given access detection is smaller than a number of transmitting antennas for the given information or the given radio signal.

In one embodiment, the number of antennas employed in the given access detection is greater than 1.

In one embodiment, the number of antennas employed in the given access detection is equal to 1.

In one embodiment, the number of transmitting antennas for the given radio signal is greater than 1.

In one embodiment, the number of transmitting antennas for transmitting a radio signal of the given information is greater than 1.

In one embodiment, the Embodiment 18A corresponds to a schematic diagram illustrating that the receiving beam employed in the given access detection is the same as the transmitting beam for the given information or the given radio signal.

In one embodiment, the Embodiment 18B corresponds to a schematic diagram illustrating that the receiving beam employed in the given access detection includes the transmitting beam for the given information or the given radio signal.

Embodiment 19

Embodiment 19A-19B respectively illustrate a schematic diagram of transmission of first information.

In Embodiment 19, the first control information and the first information of the present disclosure belong to a same time slice in time domain, the time slice comprises a positive integer number of contiguous multicarrier symbols. The time slice comprises W time sub-slice(s), the W being a positive integer. The base station of the present disclosure transmits the first information for W time(s) respectively in the W time sub-slice(s); the UE detects the first information in each of the W time sub-slice(s).

In one embodiment, the W is equal to 1.

In one embodiment, the W is greater than 1.

In one embodiment, the W is greater than 1; the base station transmits the first information with a same transmit beamforming matrix in each of the W time sub-slices.

In one embodiment, the W is greater than 1; the base station transmits the first information with a same transmit analog beamforming matrix in each of the W time sub-slices.

In one embodiment, the W is greater than 1; the base station transmits the first information with a same transmitting beam in each of the W time sub-slices.

In one embodiment, the W is greater than 1; the UE employs W receive beamforming matrixes respectively in the W time sub-slices to receive the first information.

In one embodiment, the W is greater than 1; the UE employs W receive analog beamforming matrixes respectively in the W time sub-slices to receive the first information.

In one embodiment, the W is greater than 1; the UE employs W receiving beams respectively in W time sub-slices to receive the first information.

In one embodiment, the W is greater than 1; the UE detects the first information through sweeping respectively in the W time sub-slices.

In one embodiment, any time sub-slice of the W time sub-slices comprises a positive integer number of multicarrier symbol(s).

In one embodiment, the W is greater than 1; the W time sub-slices respectively comprise equal numbers of multicarrier symbols.

In one embodiment, the W is greater than 1; at least two of the W time sub-slices respectively comprise equal numbers of multicarrier symbols.

In one embodiment, the W is greater than 1; at least two of the W time sub-slices respectively comprise unequal numbers of multicarrier symbols.

In one embodiment, the W is greater than 1; the W time sub-slices are mutually orthogonal in time domain.

In one embodiment, the Embodiment 19A corresponds to a schematic diagram illustrating transmission of first information when the W is equal to 1.

In one embodiment, the Embodiment 19B corresponds to a schematic diagram illustrating transmission of first information when the W is greater than 1.

Embodiment 20

Figure 20:
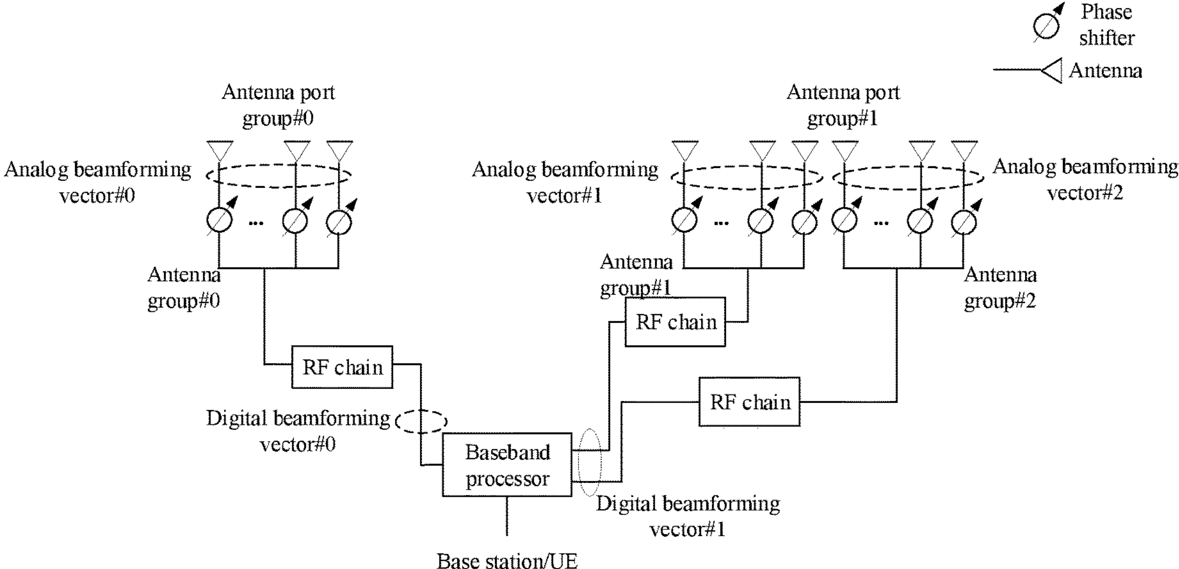
FIG. 20 illustrates a schematic diagram of antennas and antenna port groups according to one embodiment of the present disclosure.

Embodiment 20 illustrates schematic diagram of antennas and antenna port groups, as shown in FIG. 20.

In Embodiment 20, an antenna port group comprises a positive integer number of antenna port(s); an antenna port is formed by superposing antenna(s) comprised by a positive integer number of antenna group(s) through antenna virtualization; an antenna group comprises a positive integer number of antenna(s). An antenna group is connected to a baseband processor via a Radio Frequency (RF) chain, so different antenna groups correspond to different RF chains. Mapping coefficients of all antennas in a positive integer number of antenna group(s) comprised by a given antenna port to the given antenna port constitute a beamforming vector corresponding to the given antenna port. Mapping coefficients of multiple antennas comprised in any one of a positive integer number of antenna groups comprised by the given antenna port to the given antenna port constitute an analog beamforming vector for the given antenna port. Analog beamforming vectors respectively corresponding to the positive integer number of antenna groups are diagonally arranged to form an analog beamforming matrix corresponding to the given antenna port. Mapping coefficients of the positive integer number of antenna groups to the given antenna port constitute a digital beamforming vector corresponding to the given antenna port. A beamforming vector corresponding to the given antenna port is a product of the analog beamforming matrix and the digital beamforming vector respectively corresponding to the given antenna port. Each antenna port in antenna port group is composed of (a) same antenna group(s), and different antenna ports in a same antenna port group correspond to different beamforming vectors.

FIG. 20 illustrates two antenna port groups, which are antenna port group #0 and antenna port group #1. Herein, the antenna port group is composed of antenna group #0, while the antenna port group #1 is composed of antenna group #1 and antenna group #2. Mapping coefficients of multiple antennas comprised in the antenna group #0 to the antenna port group #0 constitute an analog beamforming vector #0; a mapping coefficient of the antenna group #0 to the antenna port group #0 constitute a digital beamforming vector #0. Mapping coefficients of multiple antennas comprised in the antenna group #1 to the antenna port group #1 and mapping coefficients of multiple antennas comprised in the antenna group #2 to the antenna port group #1 respectively constitute an analog beamforming vector #1 and an analog beamforming vector #2; respective mapping coefficients of the antenna group #1 and the antenna group #2 to the antenna port group #1 constitute a digital beamforming vector #1. A beamforming vector corresponding to any antenna port comprised by the antenna port group #0 is a product of the analog beamforming vector #0 and the digital beamforming vector #0. A beamforming vector corresponding to any antenna port comprised by the antenna port group #1 is a product of the digital beamforming vector #1 and an analog beamforming matrix formed by diagonally arrangement of the analog beamforming vector #1 and the analog beamforming vector #2.

In one embodiment, an antenna port group comprises one antenna port. For example, the antenna port group #0 in FIG. 20 comprises one antenna port.

In one subembodiment, an analog beamforming matrix corresponding to the one antenna port is dimensionally reduced to an analog beamforming vector, while a digital beamforming vector corresponding to the one antenna port is dimensionally reduced to a scaler, a beamforming vector corresponding to the one antenna port is equivalent to an analog beamforming vector corresponding to the one antenna port. For example, the digital beamforming vector #0 in FIG. 20 is dimensionally reduced to a scaler, a beamforming vector corresponding to the antenna port in the antenna port group #0 is the analog beamforming vector #0.

In one embodiment, antenna port group comprises a plurality of antenna ports. For example, the antenna port group #1 in FIG. 20 comprises a plurality of antenna ports.

In one subembodiment, the plurality of antenna ports correspond to a same analog beamforming matrix.

In one subembodiment, at least two antenna ports among the plurality of antenna ports correspond to a same analog beamforming matrix.

In one subembodiment, at least two antenna ports among the plurality of antenna ports correspond to different analog beamforming matrixes.

In one subembodiment, the plurality of antenna ports correspond to different digital beamforming vectors.

In one subembodiment, at least two antenna ports among the plurality of antenna ports correspond to a same digital beamforming vector.

In one subembodiment, at least two antenna ports among the plurality of antenna ports correspond to different digital beamforming vectors.

In one embodiment, any two antenna ports respectively comprised in different antenna port groups correspond to different analog beamforming matrixes.

In one embodiment, at least two antenna ports comprised in different antenna port groups correspond to different analog beamforming matrixes.

In one embodiment, at least two antenna ports comprised in different antenna port groups correspond to a same analog beamforming matrix.

In one embodiment, two different antenna port groups are QCL.

In one embodiment, two different antenna port groups are non-QCL.

In one embodiment, any two antenna ports in an antenna port group are QCL.

In one embodiment, any two antenna ports in an antenna port group are non-QCL.

In one embodiment, at least two antenna ports in an antenna port group are QCL.

In one embodiment, at least two antenna ports in an antenna port group are non-QCL.

In one embodiment, any two antenna ports in an antenna port group are spatial QCL.

In one embodiment, any two antenna ports in an antenna port group are not spatial QCL.

In one embodiment, at least two antenna ports in an antenna port group are spatial QCL.

In one embodiment, at least two antenna ports in an antenna port group are not spatial QCL.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure includes but is not limited to mobile phones, tablet computers, notebooks, network cards, low-consumption equipment, eMTC equipment, vehicle-mounted communication equipment, etc. The base station or network side equipment in the present disclosure includes but is not limited to macro-cellular base stations, micro-cellular base stations, home base stations, relay base station, eNB, gNB, Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a user equipment (UE) for wireless communications, comprising:

receiving N groups of first configuration information, each N group used for determining a corresponding antenna port group set;

receiving Q piece(s) of indication information specific to the UE or the Q piece(s) of indication information being common to a cell; and receiving first control information being associated with first information, wherein the first information is one of the Q piece(s) of indication information specific to the UE in downlink control information (DCI) carried by a PDCCH (Physical Downlink Control Channel); the first information and the first control information respectively belonging to two pieces of DCI;

wherein the first information is used for determining first target configuration information, wherein the first target configuration information the first target configuration information is one group of the N groups of first configuration information and used for determining a first antenna port group set composed of one or more antenna port groups, wherein each antenna port group is composed of one or more antenna ports; the first antenna port group set comprises P antenna port group(s), while the first resource element set comprises P resource element subset(s), the P is a positive integer; measurement(s) on the P antenna port group(s) is(are) respectively used for receiving radio signal(s) transmitted on the P resource element subset(s);

wherein the first control information comprises scheduling information of a radio signal transmitted on a first reference antenna port group of the first antenna port group set, wherein a measurement on the first reference antenna port group is used for receiving the first control information; and wherein the radio signal comprises at least one of a CSI-RS (Channel State Information Reference Signal), an SRS (Sounding Reference Signal), a downlink DMRS (DeModulation Reference Signal), an uplink DMRS, a synchronization signal, a downlink PTRS (Phase-Tracking Reference Signal), an uplink PTRS or a TRS (Tracking Reference Signal).

2. The method according to claim 1, wherein the Q piece(s) of indication information respectively indicates (indicate) that Q multicarrier symbol group(s) is(are) occupied, any multicarrier symbol group of the Q multicarrier symbol group(s) comprises a positive integer number of multicarrier symbol(s).

3. The method according to claim 1, further comprising:

first operating a first radio signal in a first frequency-domain resource;

wherein the first control information comprises scheduling information of the first radio signal, the Q is a positive integer greater than 1; the scheduling information of the first radio signal is used for determining a second reference antenna port group out of a second antenna port group set, the second antenna port group set is composed of at least two antenna port groups, each of the antenna port groups is composed of one or more antenna ports; a radio signal transmitted on any antenna port group of the second antenna port group set comprises at least one of a CSI-RS, an SRS, a downlink DMRS, an uplink DMRS, a synchronization signal, a downlink PTRS, an uplink PTRS or a TRS; wherein a measurement on the second reference antenna port group is used for first operating the first radio signal;

wherein the first operating is receiving; or, the first operating is transmitting, wherein a measurement on a given antenna port group is used for transmitting a given radio signal comprises using any antenna port in a transmission antenna port group for the given radio signal is spatial quasi-collocated (QCL) with at least one antenna port in the given antenna port group, or two antenna ports being spatial QCL for multi-antenna related transmission of a radio signal transmitted on one of the two antenna ports and used to infer multi-antenna related transmission of a radio signal transmitted on the other of the two antenna ports.

4. The method according to claim 3, comprising:

receiving M groups of second configuration information, each group of the M groups of second configuration information is used for determining a corresponding antenna port group set, M is a positive integer greater than 1; herein, the first information is also used for determining second target configuration information out of the M groups of second configuration information, the second target configuration information is one group of the M groups of second configuration information, the second target configuration information is used for determining the second antenna port group set;

or, performing a first access detection, the first access detection being an uplink access detection; wherein the first operating is transmitting, performing the first access detection is prior to transmission of the first radio signal, an end time of the first access detection is before a starting transmission time of the first radio signal; the first access detection comprises: performing T energy detection(s) respectively in T time sub-pool(s) to obtain T detection value(s); wherein each of T1 detection value(s) out of the T detection value(s) is lower than a first threshold, T is a positive integer, T1 is a positive integer no greater than the T.

5. The method according to claim 1, wherein the N groups of first configuration information are respectively used for determining N resource element sets and the first resource element set is a resource element set out of the N resource element sets corresponding to the first target configuration information, or, the N groups of first configuration information all correspond to the first resource element set; the resource element occupies a multicarrier symbol in time domain and a subcarrier in frequency domain.

6. A method in a base station for wireless communications, comprising:

transmitting N groups of first configuration information, each group being used for determining a corresponding antenna port group set;

transmitting Q piece(s) of indication information specific to a UE group or a common group of UEs; and transmitting first control information associated with first information related to one of the Q piece(s) of indication information in a piece of UE-specific DCI, and carried by a PDCCH (Physical Downlink Control Channel); the first information and the first control information respectively belonging to two pieces of DCI; the first control information being transmitted in a resource element subset of a first resource element set, the first resource element set comprising multiple resource element subsets, each of the resource element subsets being composed of a positive integer number of resource element(s); the first resource element set being composed of a positive integer number of CORESET(s), or the first resource element set is composed of a positive integer number of search space(s);

wherein the first information is used for determining first target configuration information out of the N groups of first configuration information; the first target configuration information is one group of the N groups of first configuration information; the first target configuration information is used for determining a first antenna port group set, the first antenna port group set is composed of one or more antenna port groups, of which each antenna port group is composed of one or more antenna ports; the first antenna port group set comprises P antenna port group(s), while the first resource element set comprises P resource element subset(s), the P is a positive integer; measurement(s) on the P antenna port group(s) is(are) respectively used for receiving radio signal(s) transmitted on the P resource element subset(s);

a first reference antenna port group is an antenna port group in the first antenna port group set, a measurement on the first reference antenna port group is used for receiving the first control information; a radio signal transmitted on the first reference antenna port group comprises at least one of a CSI-RS (Channel State Information Reference Signal), an SRS (Sounding Reference Signal), a downlink DMRS (DeModulation Reference Signal), an uplink DMRS, a synchronization signal, a downlink PTRS (Phase-Tracking Reference Signal), an uplink PTRS or a TRS (Tracking Reference Signal).

7. The method according to claim 6, wherein the phrase that a measurement on a given antenna port group is used for receiving given information or a given radio signal means that the UE is able to infer all or part of large-scale properties of a radio signal of the given information or the given radio signal from all or part of large-scale properties of a radio signal transmitted on the given antenna port group; large-scale properties of the given radio signal comprise one or more of delay spread, Doppler spread, Doppler shift, path loss, average gain, average delay, angle of arrival, angle of departure, spatial correlation, multi-antenna related transmission or multi-antenna related reception; the multi-antenna related reception refers to Spatial Rx parameters;

or, the Q piece(s) of indication information respectively indicates(indicate) that Q multicarrier symbol group(s) is(are) occupied, any multicarrier symbol group of the Q multicarrier symbol group(s) comprises a positive integer number of multicarrier symbol(s); the phrase that the Q multicarrier symbol group(s) is(are) occupied means that the Q multicarrier symbol group(s) is(are) occupied by a transmitter of the Q piece(s) of indication information;

or, the first control information and the first information belong to a same time slice in time domain, the same time slice belongs to a downlink burst, the time slice comprises a positive integer number of contiguous multicarrier symbols.

8. The method according to claim 6, comprising:

second operating a first radio signal in a first frequency-domain resource;

wherein the first control information comprises scheduling information of the first radio signal, the Q is a positive integer greater than 1; the scheduling information of the first radio signal is used for determining a second reference antenna port group out of a second antenna port group set, the second antenna port group set is composed of at least two antenna port groups, each of the antenna port groups is composed of one or more antenna ports; a radio signal transmitted on any antenna port group of the second antenna port group set comprises at least one of a CSI-RS, an SRS, a downlink DMRS, an uplink DMRS, a synchronization signal, a downlink PTRS, an uplink PTRS or a TRS; a measurement on the second reference antenna port group is used for first operating the first radio signal;

the first operating is transmitting and the second operating is receiving, the phrase that a measurement on a given antenna port group is used for transmitting a given radio signal means that any antenna port in a transmission antenna port group for the given radio signal is spatial QCL with at least one antenna port in the given antenna port group, two antenna ports being spatial QCL means that multi-antenna related transmission of a radio signal transmitted on one of the two antenna ports can be used to infer multi-antenna related transmission of a radio signal transmitted on the other of the two antenna ports; or, the first operating is receiving and the second operating is transmitting.

9. The method according to claim 8, comprising:

transmitting M groups of second configuration information, each group of the M groups of second configuration information is used for determining a corresponding antenna port group set, M is a positive integer greater than 1; herein, the first information is also used for determining second target configuration information out of the M groups of second configuration information, the second target configuration information is one group of the M groups of second configuration information, the second target configuration information is used for determining the second antenna port group set;

or, performing a second access detection, the second access detection being a downlink access detection; performing the second access detection is prior to transmission of the first radio signal, the second operating is transmitting, the second access detection comprises: performing S energy detection(s) respectively in S time sub-pool(s) to obtain S detection value(s); wherein each of S1 detection value(s) out of the S detection value(s) is lower than a second threshold, S is a positive integer, S1 is a positive integer no greater than the S.

10. The method according to claim 6, wherein the N groups of first configuration information are respectively used for determining N resource element sets and the first resource element set is a resource element set out of the N resource element sets corresponding to the first target configuration information, or, the N groups of first configuration information all correspond to the first resource element set; the resource element occupies a multicarrier symbol in time domain and a subcarrier in frequency domain.

11. A UE for wireless communications, comprising:

a first receiver, receiving N groups of first configuration information, each group of the N groups of first configuration information is used for determining a corresponding antenna port group set, N is a positive integer greater than 1; the N groups of first configuration information being carried by a Radio Resource Control (RRC) signaling; receiving Q piece(s) of indication information, Q being a positive integer; the Q piece(s) of indication information being terminal group-specific, and the UE being a terminal from the terminal group, or the Q piece(s) of indication information being cell-common; receiving first control information, the first control information being associated with first information, the first information being one of the Q piece(s) of indication information; the first control information being a piece of UE-specific DCI, and the first control information being carried by a PDCCH (Physical Downlink Control Channel); the first information and the first control information respectively belonging to two pieces of DCI; the first control information being transmitted in a resource element subset of a first resource element set, the first resource element set comprising multiple resource element subsets, each of the resource element subsets being composed of a positive integer number of resource element(s); the first resource element set being composed of a positive integer number of CORESET(s), or the first resource element set is composed of a positive integer number of search space(s);

wherein the first information is used for determining first target configuration information out of the N groups of first configuration information; the first target configuration information is one group of the N groups of first configuration information; the first target configuration information is used for determining a first antenna port group set, the first antenna port group set is composed of one or more antenna port groups, of which each antenna port group is composed of one or more antenna ports; the first antenna port group set comprises P antenna port group(s), while the first resource element set comprises P resource element subset(s), the P is a positive integer; measurement(s) on the P antenna port group(s) is(are) respectively used for receiving radio signal(s) transmitted on the P resource element subset(s); a first reference antenna port group is an antenna port group in the first antenna port group set, a measurement on the first reference antenna port group is used for receiving the first control information; a radio signal transmitted on the first reference antenna port group comprises at least one of a CSI-RS (Channel State Information Reference Signal), an SRS (Sounding Reference Signal), a downlink DMRS (DeModulation Reference Signal), an uplink DMRS, a synchronization signal, a downlink PTRS (Phase-Tracking Reference Signal), an uplink PTRS or a TRS (Tracking Reference Signal).

12. The UE according to claim 11, wherein the phrase that a measurement on a given antenna port group is used for receiving given information or a given radio signal means that the UE is able to infer all or part of large-scale properties of a radio signal of the given information or the given radio signal from all or part of large-scale properties of a radio signal transmitted on the given antenna port group; large-scale properties of the given radio signal comprise one or more of delay spread, Doppler spread, Doppler shift, path loss, average gain, average delay, angle of arrival, angle of departure, spatial correlation, multi-antenna related transmission or multi-antenna related reception; the multi-antenna related reception refers to Spatial Rx parameters;

or, the Q piece(s) of indication information respectively indicates(indicate) that Q multicarrier symbol group(s) is(are) occupied, any multicarrier symbol group of the Q multicarrier symbol group(s) comprises a positive integer number of multicarrier symbol(s); the phrase that the Q multicarrier symbol group(s) is(are) occupied means that the Q multicarrier symbol group(s) is(are) occupied by a transmitter of the Q piece(s) of indication information;

or, the first control information and the first information belong to a same time slice in time domain, the same time slice belongs to a downlink burst, the time slice comprises a positive integer number of contiguous multicarrier symbols.

13. The UE according to claim 11, comprising:

a first transceiver, first operating a first radio signal in a first frequency-domain resource;

wherein the first control information comprises scheduling information of the first radio signal, the Q is a positive integer greater than 1; the scheduling information of the first radio signal is used for determining a second reference antenna port group out of a second antenna port group set, the second antenna port group set is composed of at least two antenna port groups, each of the antenna port groups is composed of one or more antenna ports; a radio signal transmitted on any antenna port group of the second antenna port group set comprises at least one of a CSI-RS, an SRS, a downlink DMRS, an uplink DMRS, a synchronization signal, a downlink PTRS, an uplink PTRS or a TRS; a measurement on the second reference antenna port group is used for first operating the first radio signal;

the first operating is receiving; or, the first operating is transmitting, the phrase that a measurement on a given antenna port group is used for transmitting a given radio signal means that any antenna port in a transmission antenna port group for the given radio signal is spatial QCL with at least one antenna port in the given antenna port group, two antenna ports being spatial QCL means that multi-antenna related transmission of a radio signal transmitted on one of the two antenna ports can be used to infer multi-antenna related transmission of a radio signal transmitted on the other of the two antenna ports.

14. The UE according to claim 13, wherein the first receiver also receives M groups of second configuration information, each group of the M groups of second configuration information is used for determining a corresponding antenna port group set, M is a positive integer greater than 1; herein, the first information is also used for determining second target configuration information out of the M groups of second configuration information, the second target configuration information is one group of the M groups of second configuration information, the second target configuration information is used for determining the second antenna port group set;

or, the first receiver also performs a first access detection, the first access detection being an uplink access detection; wherein the first operating is transmitting, performing the first access detection is prior to transmission of the first radio signal, an end time of the first access detection is before a starting transmission time of the first radio signal; the first access detection comprises: performing T energy detection(s) respectively in T time sub-pool(s) to obtain T detection value(s); wherein each of T1 detection value(s) out of the T detection value(s) is lower than a first threshold, T is a positive integer, T1 is a positive integer no greater than the T.

15. The UE according to claim 11, wherein the N groups of first configuration information are respectively used for determining N resource element sets and the first resource element set is a resource element set out of the N resource element sets corresponding to the first target configuration information, or, the N groups of first configuration information all correspond to the first resource element set; the resource element occupies a multicarrier symbol in time domain and a subcarrier in frequency domain.

16. Abase station for wireless communications, comprising:

a second transmitter, transmitting N groups of first configuration information, each group of the N groups of first configuration information being used for determining a corresponding antenna port group set, N being a positive integer greater than 1; the N groups of first configuration information being carried by a Radio Resource Control (RRC) signaling; transmitting Q piece(s) of indication information, Q being a positive integer; the Q piece(s) of indication information being terminal group-specific, and the UE being a terminal from the terminal group, or the Q piece(s) of indication information being cell-common; and transmitting first control information, the first control information being associated with first information, the first information being one of the Q piece(s) of indication information; the first control information being a piece of UE-specific DCI, and the first control information being carried by a PDCCH (Physical Downlink Control Channel); the first information and the first control information respectively belonging to two pieces of DCI; the first control information being transmitted in a resource element subset of a first resource element set, the first resource element set comprising multiple resource element subsets, each of the resource element subsets being composed of a positive integer number of resource element(s); the first resource element set being composed of a positive integer number of CORESET(s), or the first resource element set is composed of a positive integer number of search space(s);

wherein the first information is used for determining first target configuration information out of the N groups of first configuration information; the first target configuration information is one group of the N groups of first configuration information; the first target configuration information is used for determining a first antenna port group set, the first antenna port group set is composed of one or more antenna port groups, of which each antenna port group is composed of one or more antenna ports; the first antenna port group set comprises P antenna port group(s), while the first resource element set comprises P resource element subset(s), the P is a positive integer; measurement(s) on the P antenna port group(s) is(are) respectively used for receiving radio signal(s) transmitted on the P resource element subset(s);

a first reference antenna port group is an antenna port group in the first antenna port group set, a measurement on the first reference antenna port group is used for receiving the first control information; a radio signal transmitted on the first reference antenna port group comprises at least one of a CSI-RS (Channel State Information Reference Signal), an SRS (Sounding Reference Signal), a downlink DMRS (DeModulation Reference Signal), an uplink DMRS, a synchronization signal, a downlink PTRS (Phase-Tracking Reference Signal), an uplink PTRS or a TRS (Tracking Reference Signal).

17. The base station according to claim 16, wherein the phrase that a measurement on a given antenna port group is used for receiving given information or a given radio signal means that the UE is able to infer all or part of large-scale properties of a radio signal of the given information or the given radio signal from all or part of large-scale properties of a radio signal transmitted on the given antenna port group; large-scale properties of the given radio signal comprise one or more of delay spread, Doppler spread, Doppler shift, path loss, average gain, average delay, angle of arrival, angle of departure, spatial correlation, multi-antenna related transmission or multi-antenna related reception; the multi-antenna related reception refers to Spatial Rx parameters;

or, the Q piece(s) of indication information respectively indicates(indicate) that Q multicarrier symbol group(s) is(are) occupied, any multicarrier symbol group of the Q multicarrier symbol group(s) comprises a positive integer number of multicarrier symbol(s); the phrase that the Q multicarrier symbol group(s) is(are) occupied means that the Q multicarrier symbol group(s) is(are) occupied by a transmitter of the Q piece(s) of indication information;

or, the first control information and the first information belong to a same time slice in time domain, the same time slice belongs to a downlink burst, the time slice comprises a positive integer number of contiguous multicarrier symbols.

18. The base station according to claim 16, comprising:

a second transceiver, second operating a first radio signal in a first frequency-domain resource;

wherein the first control information comprises scheduling information of the first radio signal, the Q is a positive integer greater than 1; the scheduling information of the first radio signal is used for determining a second reference antenna port group out of a second antenna port group set, the second antenna port group set is composed of at least two antenna port groups, each of the antenna port groups is composed of one or more antenna ports; a radio signal transmitted on any antenna port group of the second antenna port group set comprises at least one of a CSI-RS, an SRS, a downlink DMRS, an uplink DMRS, a synchronization signal, a downlink PTRS, an uplink PTRS or a TRS; a measurement on the second reference antenna port group is used for first operating the first radio signal;

the first operating is transmitting and the second operating is receiving, the phrase that a measurement on a given antenna port group is used for transmitting a given radio signal means that any antenna port in a transmission antenna port group for the given radio signal is spatial QCL with at least one antenna port in the given antenna port group, two antenna ports being spatial QCL means that multi-antenna related transmission of a radio signal transmitted on one of the two antenna ports can be used to infer multi-antenna related transmission of a radio signal transmitted on the other of the two antenna ports; or, the first operating is receiving and the second operating is transmitting.

19. The base station according to claim 18, wherein the second transmitter also transmits M groups of second configuration information, each group of the M groups of second configuration information is used for determining a corresponding antenna port group set, M is a positive integer greater than 1; herein, the first information is also used for determining second target configuration information out of the M groups of second configuration information, the second target configuration information is one group of the M groups of second configuration information, the second target configuration information is used for determining the second antenna port group set;

or, comprising: a second receiver, performing a second access detection, the second access detection being a downlink access detection; wherein performing the second access detection is prior to transmission of the first radio signal, the second operating is transmitting, the second access detection comprises: performing S energy detection(s) respectively in S time sub-pool(s) to obtain S detection value(s); wherein each of S1 detection value(s) out of the S detection value(s) is lower than a second threshold, S is a positive integer, S1 is a positive integer no greater than the S.

20. The base station according to claim 16, wherein the N groups of first configuration information are respectively used for determining N resource element sets and the first resource element set is a resource element set out of the N resource element sets corresponding to the first target configuration information, or, the N groups of first configuration information all correspond to the first resource element set; the resource element occupies a multicarrier symbol in time domain and a subcarrier in frequency domain.

* * * * *